US008823713B2

(12) United States Patent
Yasuta et al.

(10) Patent No.: US 8,823,713 B2
(45) Date of Patent: Sep. 2, 2014

(54) INFORMATION PROCESSING APPARATUS

(75) Inventors: Akira Yasuta, Osaka (JP); Takashi Kazamaki, Osaka (JP); Ryo Honda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 475 days.

(21) Appl. No.: 13/129,752

(22) PCT Filed: Nov. 16, 2009

(86) PCT No.: PCT/JP2009/069447
§ 371 (c)(1),
(2), (4) Date: May 17, 2011

(87) PCT Pub. No.: WO2010/058757
PCT Pub. Date: May 27, 2010

(65) Prior Publication Data
US 2011/0234601 A1   Sep. 29, 2011

(30) Foreign Application Priority Data

Nov. 18, 2008 (JP) ................................. 2008-294472
Nov. 18, 2008 (JP) ................................. 2008-294477
Nov. 18, 2008 (JP) ................................. 2008-294607
Nov. 12, 2009 (JP) ................................. 2009-258979

(51) Int. Cl.
*G06T 15/00* (2011.01)
*G06T 19/00* (2011.01)

(52) U.S. Cl.
USPC ........................... 345/467; 345/418; 345/642

(58) Field of Classification Search
USPC .......................... 345/467, 173, 157, 642, 418
See application file for complete search history.

(56) References Cited

U.S. PATENT DOCUMENTS

2002/0114654 A1* 8/2002 Abe .............................. 400/486
2008/0136784 A1* 6/2008 Neoh et al. .................... 345/173
(Continued)

FOREIGN PATENT DOCUMENTS

JP    63-289667 A    11/1988
JP    2-297127 A    12/1990
(Continued)

OTHER PUBLICATIONS

International Search Report, dated Feb. 9, 2010, issued in PCT/JP2009/069447.

*Primary Examiner* — Chante Harrison
(74) *Attorney, Agent, or Firm* — Birch, Stewart, Kolasch & Birch, LLP

(57) ABSTRACT

When a function is selected, and then, a character string to which the function is executed, an operation of selecting the character string is facilitated in order to reduce an operation burden of a user.
The present invention is characterized by including a display unit that displays content information including a character string; a memory unit that stores a character type-function correspondence information in which functions and a character type of a character that is a subject to which the corresponding function is executed are associated with each other; a function selection unit that selects a function to be executed; a character selection unit that selects a desired character string in the content information displayed on the display unit, after the function is selected; a character identification unit that refers to the character type-function correspondence information in order to determine whether a character having a valid character type to which the selected function can be executed is present or not in the character string selected by the character selection unit; and a valid character string decision unit that decides a valid character string, which is a subject to which the function is executed, from the selected character string, when the character identification unit determines that the character having the valid character type is present.

12 Claims, 44 Drawing Sheets

(56) References Cited

U.S. PATENT DOCUMENTS

| | | | |
|---|---|---|---|
| 2009/0176533 A1* | 7/2009 | Daioku | 345/467 |
| 2012/0256832 A1* | 10/2012 | Honda et al. | 345/157 |
| 2012/0287067 A1* | 11/2012 | Ikegami | 345/173 |

FOREIGN PATENT DOCUMENTS

| | | |
|---|---|---|
| JP | 5-189149 A | 7/1993 |
| JP | 6-28136 A | 2/1994 |
| JP | 6-110884 A | 4/1994 |
| JP | 8-76729 A | 3/1996 |
| JP | 8-137651 A | 5/1996 |
| JP | 9-190430 A | 7/1997 |
| JP | 9-282318 A | 10/1997 |
| JP | 2001-290811 A | 10/2001 |
| JP | 2004-78509 A | 3/2004 |
| JP | 2005-25302 A | 1/2005 |
| JP | 2005-63064 A | 3/2005 |
| JP | 2006-65768 A | 3/2006 |

* cited by examiner

FIG.2

CHARACTER TYPE-FUNCTION CORRESPONDENCE INFORMATION

| FUNCTION ITEM | VALID CHARACTER TYPE (CHARACTER TYPE TO WHICH FUNCTION CAN BE EXECUTED) |
|---|---|
| VOICE REPRODUCTION FUNCTION | ALPHABET (1 WORD) |
| S JUMP FUNCTION | ALPHABET (1 WORD) KANJI, HIRAGANA, KATAKANA (EXCLUDING COMMA, PERIOD, AND SYMBOL) |
| READING FUNCTION | ALPHABET SYMBOL (COMMA, PERIOD, SPACE) |
| MARKER FUNCTION | ALL CHARACTERS |

FIG.3

(a) SELECTED FUNCTION : S JUMP — 101

【アニメーション】 [animation]
動作や形が少しずつ異なる多くの絵や人形を一こまずつ
撮影し、………………………………………………………
⋮
応用するものもある。アニメ。動画。

(b) SELECTED FUNCTION : S JUMP — 101

【アニメーション】 [animation]
動作や形が少しずつ異なる多くの絵や人形を一こまずつ
撮影し、………………………………………………………
⋮
応用するものもある。ア ニメ。動画。

(c) SELECTED FUNCTION : S JUMP — 101

【アニメーション】 [animation]
動作や形が少しずつ異なる多くの絵や人形を一こまずつ
撮影し、………………………………………………………
⋮
応用するものもある。アニメ。動画。
　　　　　　　　　　　PEN MOVES → POSITION WHERE PEN IS DETACHED (d) SELECTED FUNCTION : S JUMP — 101

【アニメーション】 [animation]
動作や形が少しずつ異なる多くの絵や人形を一こまずつ
撮影し、………………………………………………………
⋮
応用するものもある。アニメ。動画。
　　　　　　　　　　　PEN MOVES → POSITION WHERE PEN IS DETACHED FIG.12
(a) SELECT CHARACTER STRING
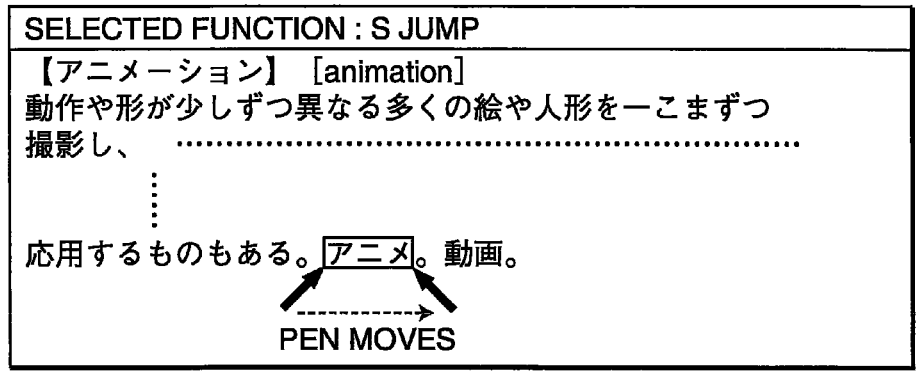
(b) DETACH PEN ON NON-SELECTED CHARACTER STRING
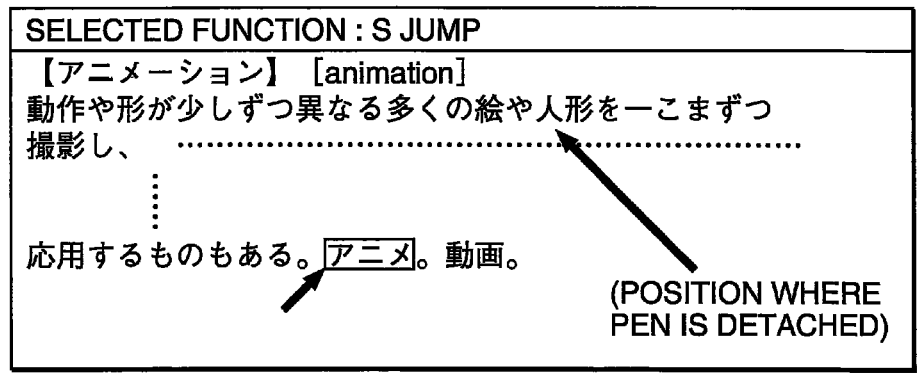
(c) DETACH PEN ON REGION OTHER THAN CHARACTER STRING (NON-DISPLAY REGION)
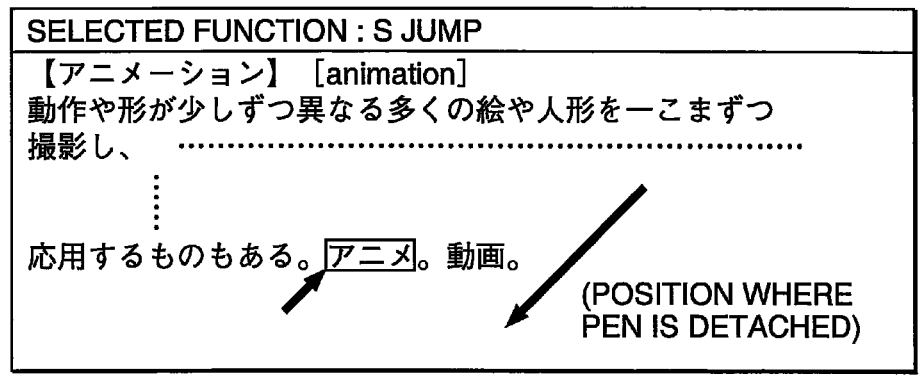

FIG.13
(a) SELECT CHARACTER STRING (HIGHLIGHT SELECTED CHARACTER STRING, INCLUDING CHARACTERS THAT ARE NOT VALID)
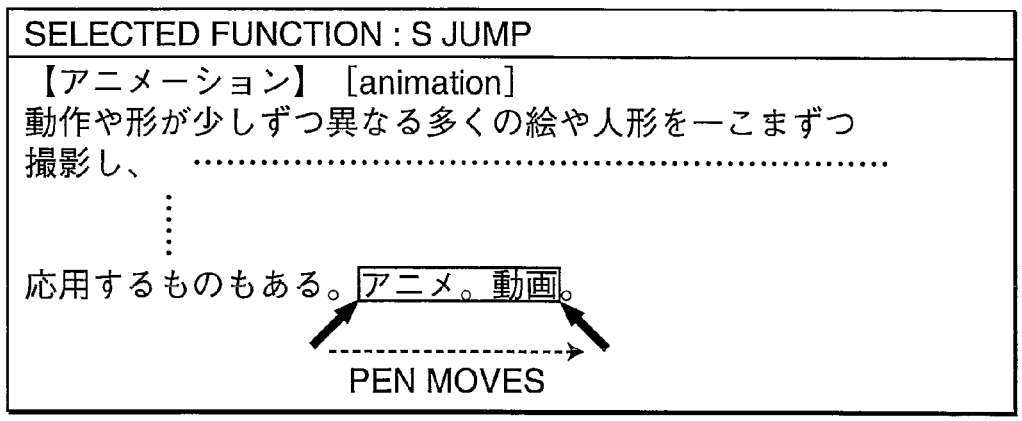
(b) DETACH PEN
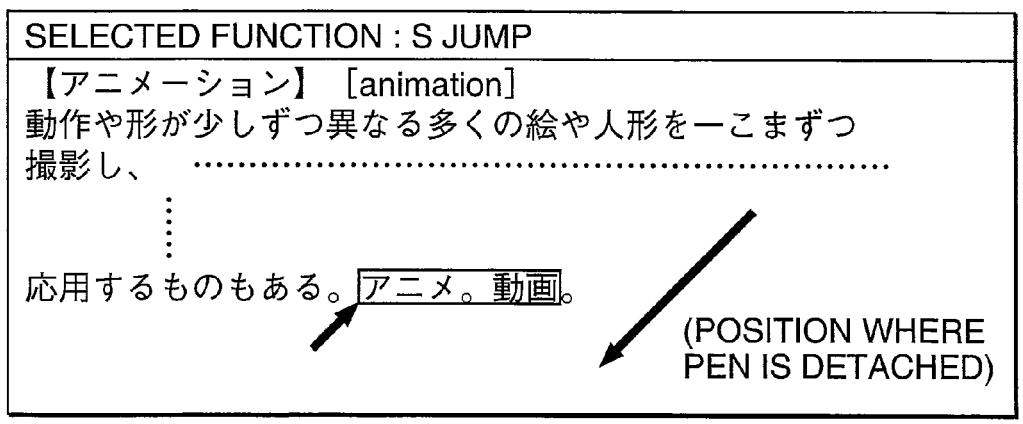
(c) SELECT AND HIGHLIGHT ONLY VALID CHARACTER
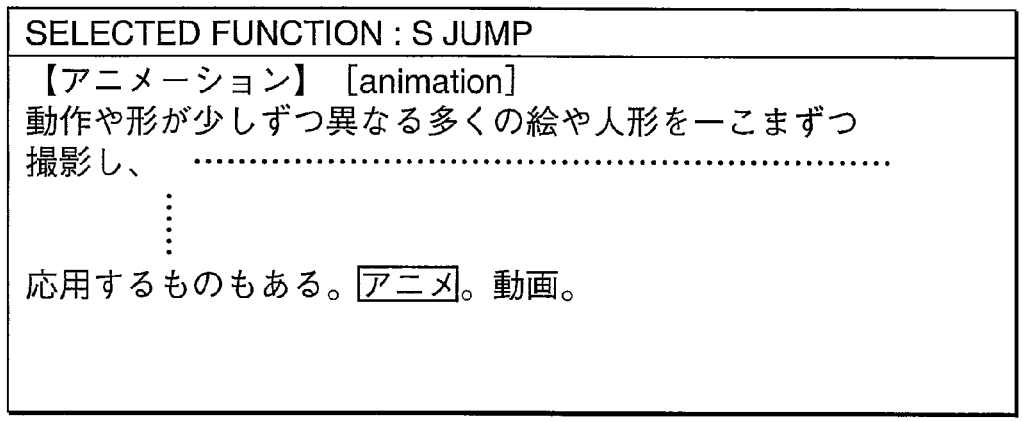

FIG.15

132 CHARACTER TYPE-FUNCTION CORRESPONDENCE INFORMATION

| FUNCTION | VALID CHARACTER TYPE |
|---|---|
| VOICE REPRODUCTION FUNCTION | ALPHABET |
| JUMP FUNCTION | ALPHABET KANJI, HIRAGANA, KATAKANA |
| READING FUNCTION | ALPHABET SYMBOL (COMMA, PERIOD, SPACE) |
| MARKER FUNCTION | ALL CHARACTERS |

FIG.16
(a) DISPLAYED CHARACTER STRING
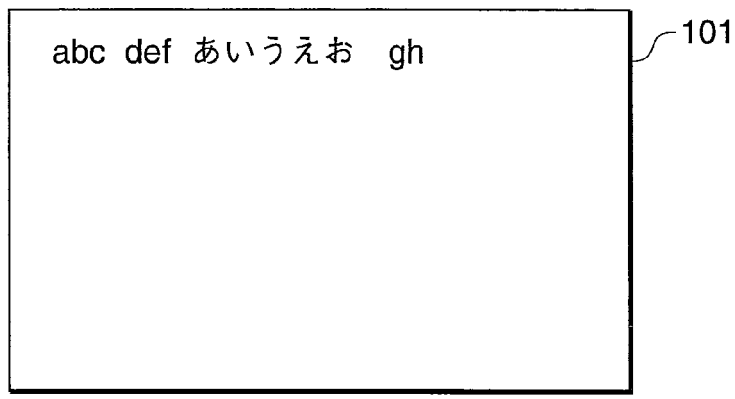
(b) EXAMPLE 1 OF SELECTION OF CHARACTER STRING
(c) EXAMPLE 2 OF SELECTION OF CHARACTER STRING

FIG.23

(a) EXAMPLE OF STATE OF RESPECTIVE MEMORY AREAS
(SELECTED CHARACTER STRING: "abc def あいうえ")

| | VALID FLAG | COPY FLAG | DATA |
|---|---|---|---|
| VOICE REPRODUCTION | ON | ON | |
| S JUMP | ON | ON | |
| READING | ON | ON | |
| MARKER | ON | | 1   12 |

(b) EXAMPLE OF STATE OF RESPECTIVE MEMORY AREAS
(SELECTED CHARACTER STRING: "あいうえ")

| | VALID FLAG | COPY FLAG | DATA |
|---|---|---|---|
| VOICE REPRODUCTION | OFF | ON | |
| S JUMP | ON | ON | |
| READING | OFF | ON | |
| MARKER | ON | | 9   16 |

(c) EXAMPLE OF STATE OF RESPECTIVE MEMORY AREAS UPON COMPLETION
(SELECTED CHARACTER STRING: "あいうえ")

| | VALID FLAG | COPY FLAG | DATA |
|---|---|---|---|
| VOICE REPRODUCTION | ON | OFF | abc |
| S JUMP | ON | OFF | abc |
| READING | ON | OFF | abc def |
| MARKER | ON | | 1   12 |

(d) EXAMPLE OF STATE OF RESPECTIVE MEMORY AREAS UPON COMPLETION
(SELECTED CHARACTER STRING: "あいうえ gh")

| | VALID FLAG | COPY FLAG | DATA |
|---|---|---|---|
| VOICE REPRODUCTION | OFF | OFF | |
| S JUMP | ON | OFF | あいうえお |
| READING | OFF | OFF | |
| MARKER | ON | | 9   16 |

(e) MARKER DATA

| WORD NO | HEAD 1 | LAST 1 | COLOR 1 | HEAD 2 | LAST 2 | COLOR 2 |
|---|---|---|---|---|---|---|
| 10 | 1 | 12 | RED | | | |
| | | | | | | |
| | | | | | | |
| | | | | | | |

FIG.25
(a) DISPLAYED CHARACTER STRING
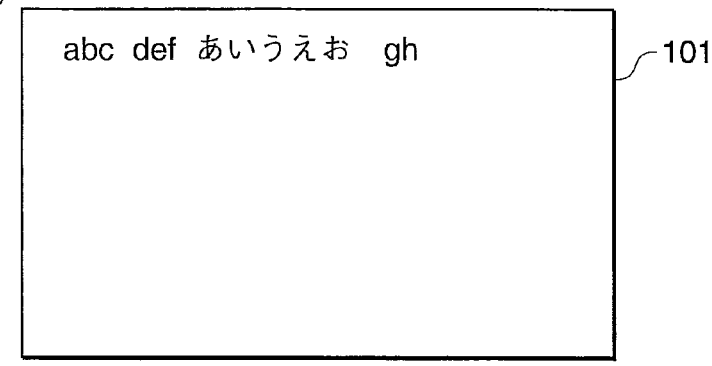
(b) EXAMPLE 1 OF SELECTION OF CHARACTER STRING
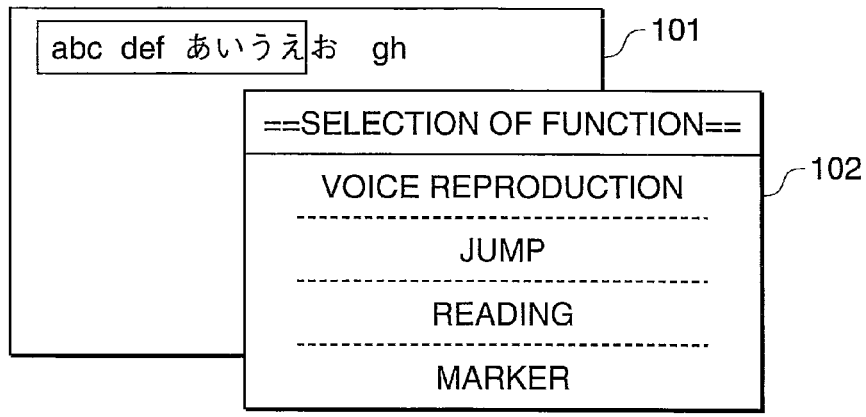
(c)
| VOICE REPRODUCTION | abc | def | |
|---|---|---|---|
| JUMP | abc | def | あいうえ |
| READING | abc def | | |
| MARKER | abc def あいうえ | | |
(d)
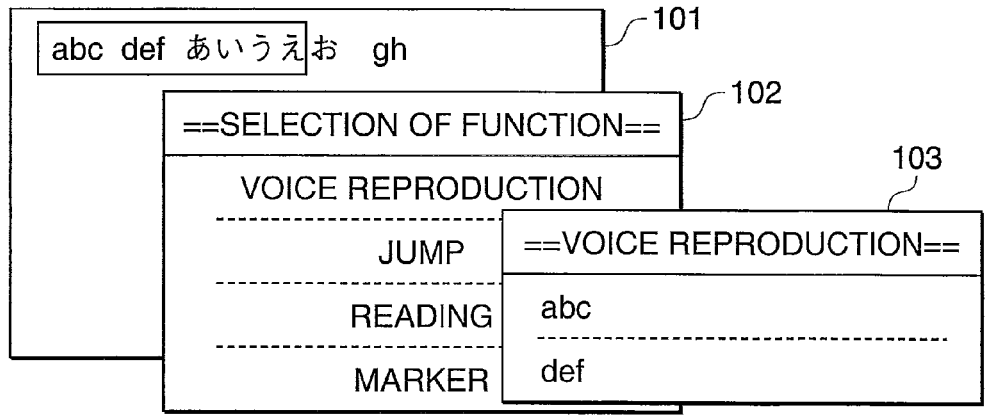

FIG.26
(a) DISPLAYED CHARACTER STRING
```
abc def あいうえお  gh
```
/— 101
(b) EXAMPLE2 OF SELECTION OF CHARACTER STRING
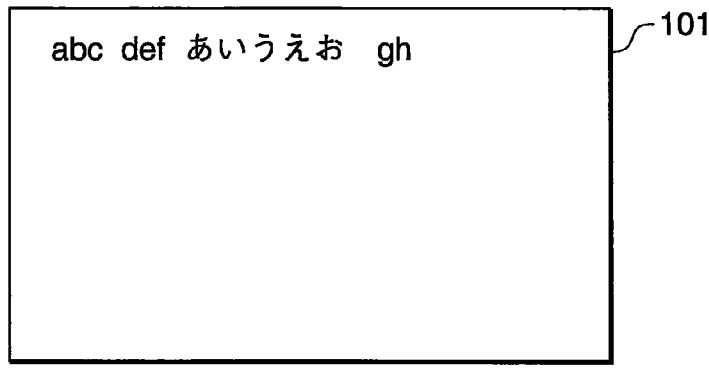
(c)

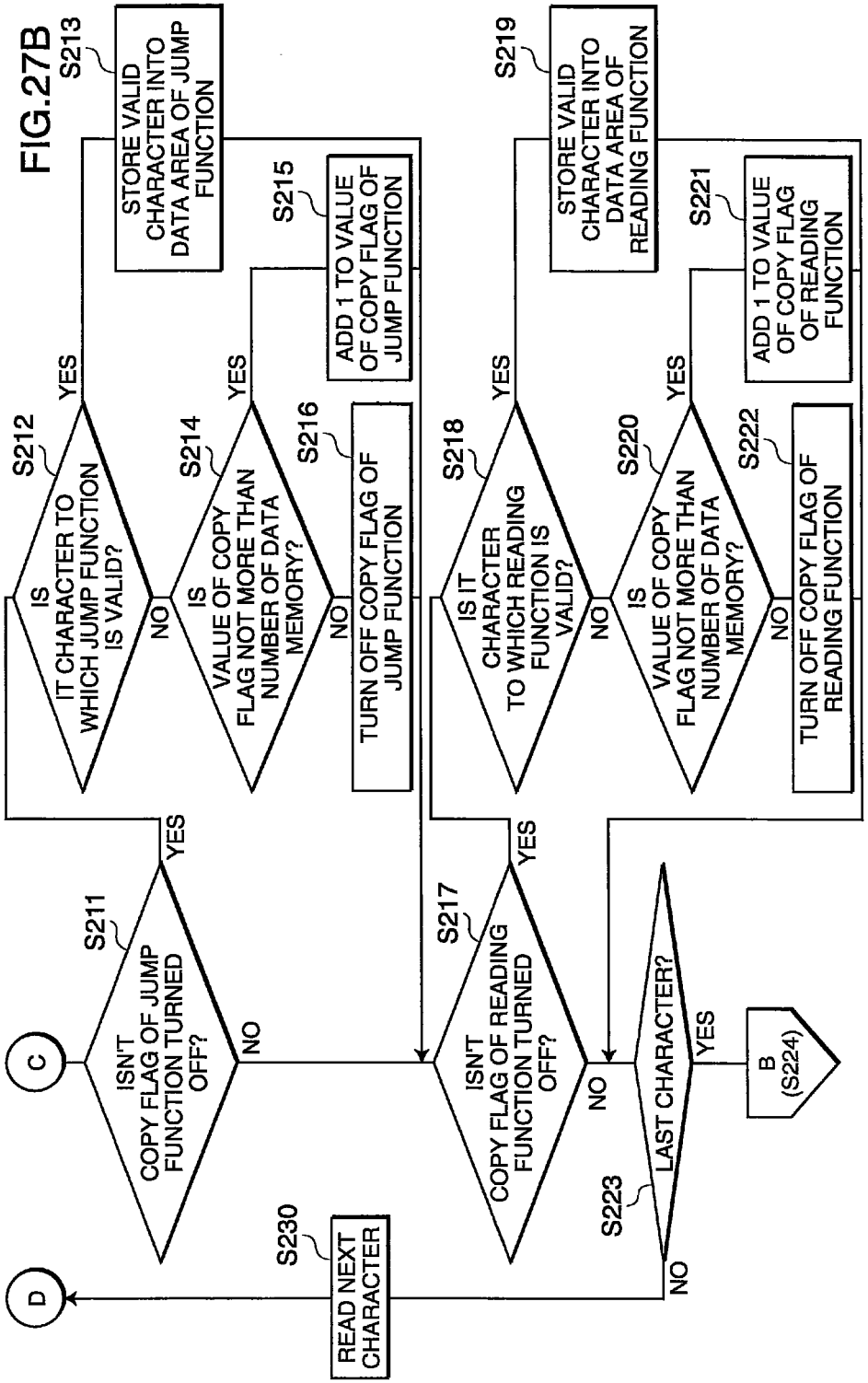

FIG. 29

(a) EXAMPLE OF STATE OF RESPECTIVE MEMORY AREAS
(SELECTED CHARACTER STRING: "abc def あいうえ")

| | VALID FLAG | COPY FLAG | DATA 1 | DATA 2 | DATA 3 | DATA 4 | DATA 5 |
|---|---|---|---|---|---|---|---|
| VOICE REPRODUCTION | ON | 1 | | | | | |
| S JUMP | ON | 1 | | | | | |
| READING | ON | 1 | | | | | |
| MARKER | ON | | 1 | 12 | | | |

(b) EXAMPLE OF STATE OF RESPECTIVE MEMORY AREAS
(SELECTED CHARACTER STRING: "あいうえお")

| | VALID FLAG | COPY FLAG | DATA 1 | DATA 2 | DATA 3 | DATA 4 | DATA 5 |
|---|---|---|---|---|---|---|---|
| VOICE REPRODUCTION | OFF | 1 | | | | | |
| S JUMP | ON | 1 | | | | | |
| READING | OFF | 1 | | | | | |
| MARKER | ON | | 9 | 16 | | | |

(c) EXAMPLE OF STATE OF RESPECTIVE MEMORY AREAS UPON COMPLETION
(SELECTED CHARACTER STRING: "abc def あいうえ")

| | VALID FLAG | COPY FLAG | DATA 1 | DATA 2 | DATA 3 | DATA 4 | DATA 5 |
|---|---|---|---|---|---|---|---|
| VOICE REPRODUCTION | ON | 3 | abc | def | | | |
| S JUMP | ON | 3 | abc | def | あいうえ | | |
| READING | ON | 2 | abc def | | | | |
| MARKER | ON | | 1 | 12 | | | |

(d) EXAMPLE OF STATE OF RESPECTIVE MEMORY AREAS UPON COMPLETION
(SELECTED CHARACTER STRING: "あいうえお gh")

| | VALID FLAG | COPY FLAG | DATA 1 | DATA 2 | DATA 3 | DATA 4 | DATA 5 |
|---|---|---|---|---|---|---|---|
| VOICE REPRODUCTION | ON | 1 | gh | | | | |
| S JUMP | ON | 2 | あいうえお | gh | | | |
| READING | ON | 1 | gh | | | | |
| MARKER | ON | | 9 | 16 | | | |

(e) MARKER DATA

| WORD NO | HEAD 1 | LAST 1 | COLOR 1 | HEAD 2 | LAST 2 | COLOR 2 |
|---|---|---|---|---|---|---|
| 10 | 1 | 12 | RED | | | |

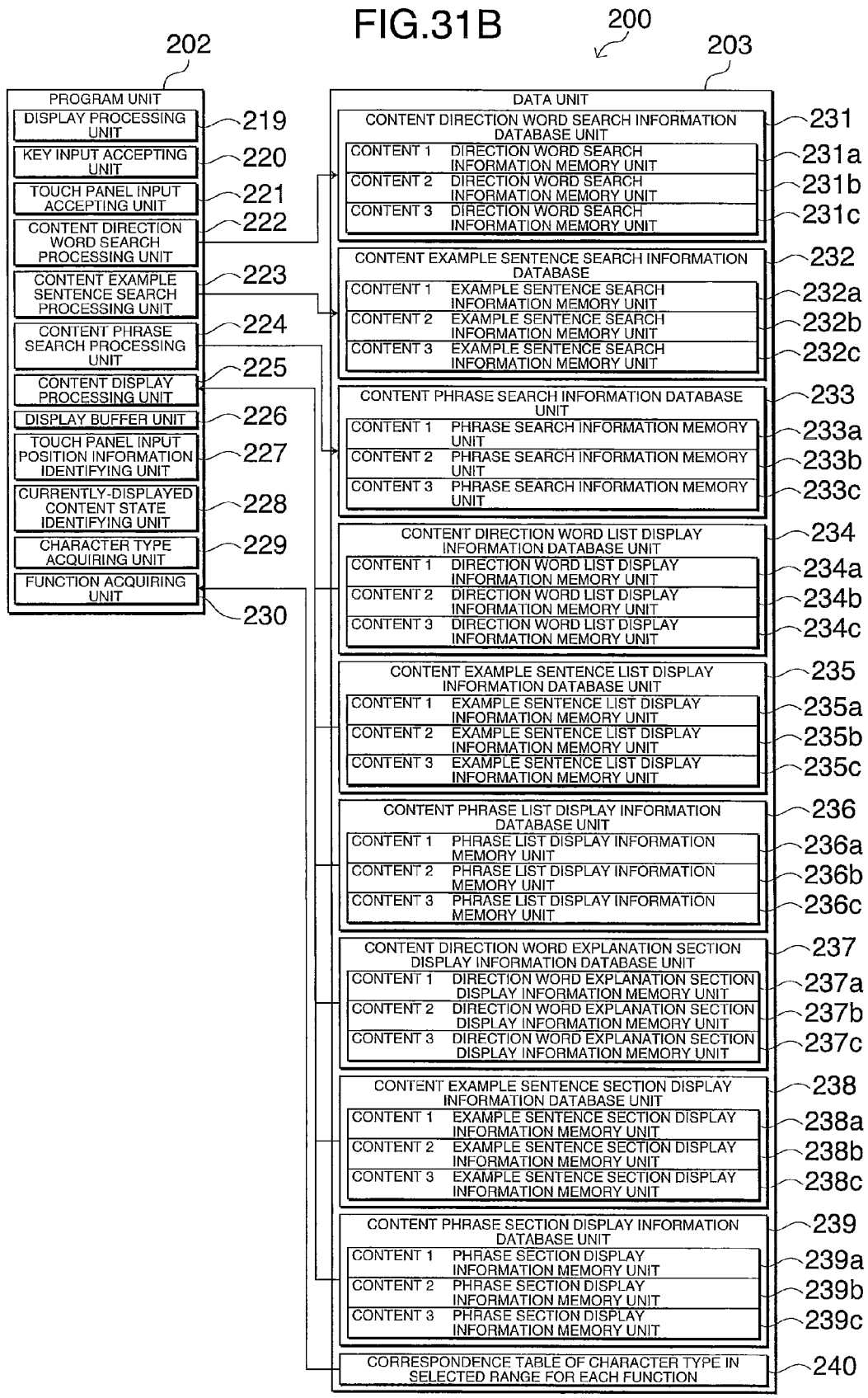

FIG.32A (a)

| 231a<br>CONTENT 1 EXAMPLE OF INFORMATION IN DIRECTION WORD SEARCH INFORMATION MEMORY UNIT | 234a<br>CONTENT 1 EXAMPLE OF INFORMATION IN DIRECTION WORD LIST DISPLAY INFORMATION MEMORY UNIT | 237a<br>CONTENT 1 EXAMPLE OF INFORMATION IN DIRECTION WORD EXPLANATION SECTION DISPLAY INFORMATION MEMORY UNIT | 233a<br>CONTENT 1 EXAMPLE OF INFORMATION IN PHRASE SEARCH INFORMATION MEMORY UNIT | 236a<br>CONTENT 1 EXAMPLE OF INFORMATION IN PHRASE LIST DISPLAY INFORMATION MEMORY UNIT | 239a<br>CONTENT 1 EXAMPLE OF INFORMATION IN PHRASE SECTION DISPLAY INFORMATION MEMORY UNIT |
|---|---|---|---|---|---|
| No1 あ | No1 あ | No1 あ (改行) ①日本語の音節のひとつで、仮名のひとつ。(改行) ②五十音図において第1行第2弾に位置する。 | No1 あい/く ち/あく | No1 あいたくちがふさがらない [開いた口が塞がらない] | No1 あいたくちがふさがらない [開いた口が塞がらない] 相手のしたことなどが… |
| No2 ああ | No2 ああ | No2 ああ (改行) [ああ] (改行) [あのように] という意味の副詞 | No2 いぬ/ぼう | No2 いぬもあるけばぼうにあたる [犬も歩けば棒に当たる] | No2 いぬもあるけばぼうにあたる [犬も歩けば棒に当たる] 何もせずに… |
| No3 あい | No3 あい [愛] | No3 あい [愛] (改行) 相手をいつくしむ心。 | No3 うしろ/かみ | No3 うしろがみをひかれる [後ろ髪を引かれる] | No3 うしろがみをひかれる [後ろ髪を引かれる] 頭の後方の髪の毛… |
| No4 あいあい | No4 アイアイ | No4 アイアイ (改行) イアイ科の小型サル… | No4 えきしゃ /みのうえ | No4 えきしゃ、みのうえしらず [易者、身の上知らず] | No4 えきしゃ、みのうえしらず [易者、身の上知らず] 他人の身の上について… |
| No5 あう [会う] | No5 あう [会う] | No5 あう [会う] (改行) 偶然に出会う。対面する。 | … | … | … |
| … | … | … | | | |

FIG.32B (b)

| 231b CONTENT 2 EXAMPLE OF INFORMATION IN DIRECTION WORD SEARCH INFORMATION MEMORY UNIT | 234b CONTENT 2 EXAMPLE OF INFORMATION IN DIRECTION WORD LIST DISPLAY INFORMATION MEMORY UNIT | 237b CONTENT 2 EXAMPLE OF INFORMATION IN DIRECTION WORD EXPLANATION SECTION DISPLAY INFORMATION MEMORY UNIT | 233b CONTENT 2 EXAMPLE OF INFORMATION IN PHRASE SEARCH INFORMATION MEMORY UNIT | 236b CONTENT 2 EXAMPLE OF INFORMATION IN PHRASE LIST DISPLAY INFORMATION MEMORY UNIT | 239b CONTENT 2 EXAMPLE OF INFORMATION IN PHRASE SECTION DISPLAY INFORMATION MEMORY UNIT | 232b CONTENT 2 EXAMPLE OF INFORMATION IN EXAMPLE SENTENCE SEARCH INFORMATION MEMORY UNIT | 235b CONTENT 2 EXAMPLE OF INFORMATION IN EXAMPLE SENTENCE LIST DISPLAY INFORMATION MEMORY UNIT | 238b CONTENT 2 EXAMPLE SENTENCE IN EXAMPLE SENTENCE SECTION DISPLAY INFORMATION MEMORY UNIT |
|---|---|---|---|---|---|---|---|---|
| No1 a | No1 a,A | No1 a,A (改行) 英語アルファベットの第1番目の文字。 | No1 a/b/t /of | No1 a lot of | No1 a lot of たくさんの | No1 this/is/a/pe n/that/is a/book | No1 this is a pen. that is a book. | No1 this is a pen. (改行) that is a book |
| No2 ab | No2 AB | No2 AB (改行) 2文字。AB型。 | No2 be/ together | No2 be together | No2 be together 一緒に | No2 the/ABC/of /driving | No2 the ABC of driving | No2 the ABC of driving |
| No3 abc | No3 abc | No3 abc (改行) アルファベットのこと。(改行) 物事の基礎。 | No3 from/a /to/z | No3 from a to z | No3 from a to z 最初から最後まで | ... | ... | ... |
| No4 ai ... | No4 A-I ... | No4 A-I Artificial intelligence。人工知能。 | No4 look/at ... | No4 look at ... | No4 look at… …を眺める。…を調べる。 | | | |

FIG.33

CORRESPONDENCE TABLE OF CHARACTER TYPE IN SELECTED RANGE FOR EACH FUNCTION

| CHARACTER TYPE IN SELECTED RANGE / FUNCTION | MP3 VOICE | TTS | S JUMP | MARKER |
|---|---|---|---|---|
| ENGLISH WORD (1 WORD IS SELECTED) | ○ | ○ | ○(WORD SEARCH) | ○ |
| PLURAL ENGLISH WORDS (ENGLISH WORD INCLUDING PLURAL WORDS IS SELECTED) | × | ○ | ○(PHRASE SEARCH) | ○ |
| JAPANESE | × | × | ○ | ○ |
| SENTENCE INCLUDING BOTH JAPANESE AND ENGLISH IS SELECTED | × | × | × | ○ |
| SENTENCE INCLUDING SYMBOLS OTHER THAN JAPANESE AND ENGLISH IS SELECTED | × | × | × | ○ |

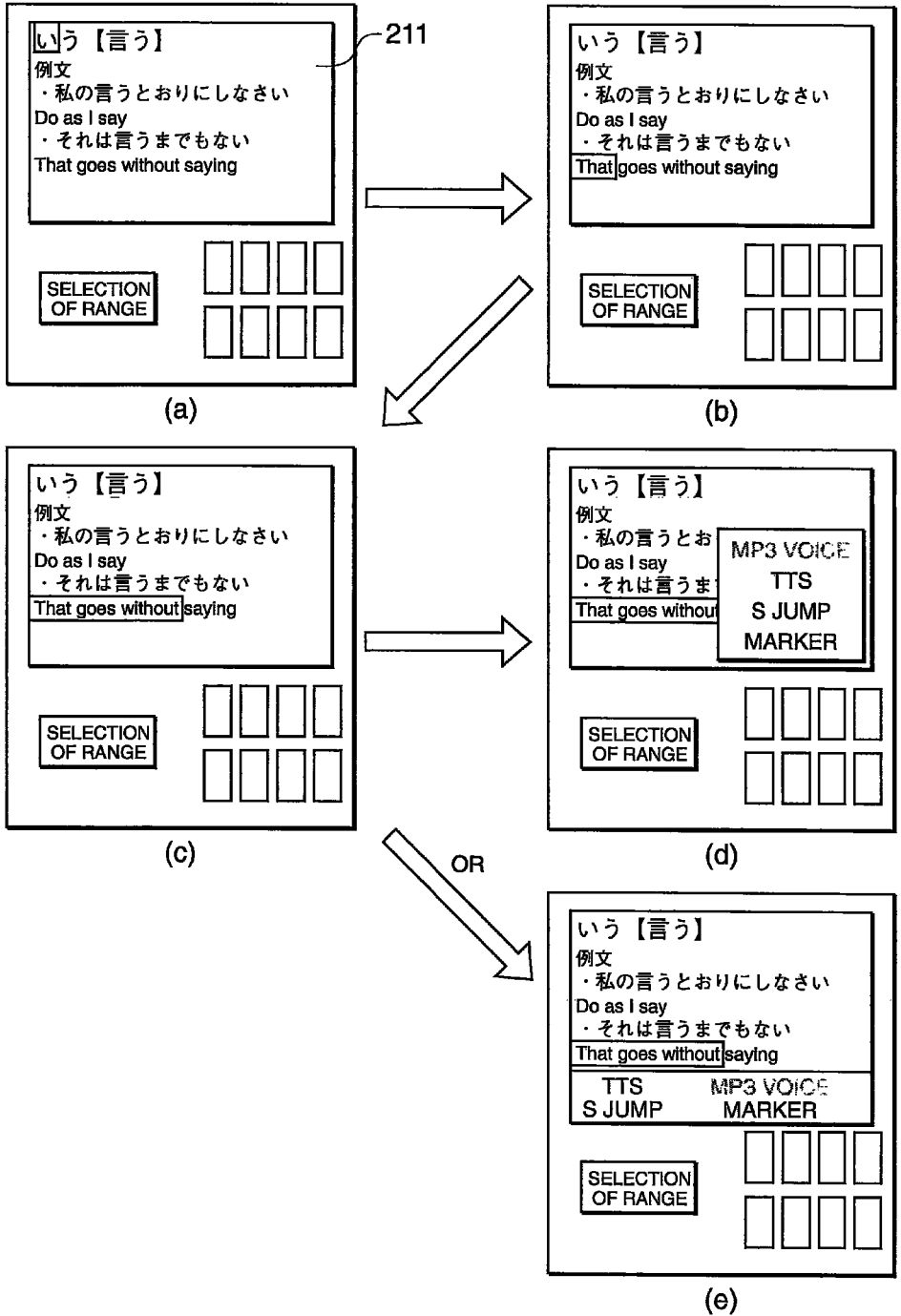
FIG.34 FLOW OF OPERATION WHEN FUNCTION IS STARTED FROM SELECTION OF RANGE

FIG.35

(a)
```
[English][Direction Word]                    [return] ↑ ↓
【PAY ATTENTION】
3~ (at sth) to pay attention to sth
◦ [V] Look at the time! We're going to be
late.
◦ [V wh-] Can't you look where you're going?
【APPEAR/SEEM】
4 linking verb ~ (to sb) like sb/sth to
seem ; to appear
◦ [V-ADJ] to look pale / happy / tired
◦ That book looks interesting.
```

(b)
```
[English][Direction Word]                    [return] ↑ ↓
【PAY ATTENTION】
3~ (at sth) to pay attention to sth
◦ [V] Look at the time! We're going to be
late.
◦ [V wh-] Can't you look where yo  | MP3 VOICE
【APPEAR/SEEM】                      | TTS
4 linking verb ~ (to sb) like sb/st | S JUMP
seem ; to appear                    | MARKER
◦ [V-ADJ] to look pale / happy / ti
◦ That book looks interesting.
```

(c)
```
[English][Direction Word]                    [return] ↑ ↓
【PAY ATTENTION】
3~ (at sth) to pay attention to sth
◦ [V] Look at the time! We're going to be
┌────────────────────────────────────────┐
│ S JUMP 【look】                         │
│ 1 look at sth                           │
├────────────────────────────────────────┤
│ 2 look down your nose at sb/sth         │
│ 3 steal a glance / look (at sb/sth)     │
│                                         │
└────────────────────────────────────────┘
```

FIG.36

(a)
```
| English | Direction Word |          | return | ↑ ↓ |
```
【PAY ATTENTION】
3～ (at sth) to pay attention to sth
○ [V] Look at the time! We're going to be late.
○ [V wh—] Can't you look where you're going?
【APPEAR/SEEM】
4 linking verb ～ (to sb) like sb/sth to seem ; to appear
○ [V—ADJ] to look pale / happy / tired
○ That book looks interesting.

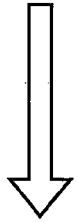

(b)
```
| English | Direction Word |          | return | ↑ ↓ |
```
LOOK /LUK/
　　verd.noun.exclamation
■ verd S JUMP 【look】
1ENGLISH:look
2ENGLISH-JAPANESE:look
3BASIC ENGLISH-JAPANESE:look
4ENGLISH THESAURUS:look1 【ようだ】
5ENGLISH THESAURUS:look2 【様子】

FIG.37

(a)
```
[English] [Direction Word]                    [return] ↑ ↓
【PAY ATTENTION】
3~ (at sth) to pay attention to sth
○ [V] |Look at| the time! We're going to be
late.
○ [V wh−] Can't you look where you're going?
【APPEAR/SEEM】
4 linking verb ~ (to sb) like sb/sth to
seem ; to appear
○ [V−ADJ] to look pale / happy / tired
○ That book looks interesting.
```

(b)
```
[English] [Direction Word]                    [return] ↑ ↓
【PAY ATTENTION】
3~ (at sth) to pay attention to sth
○ [V] |Look at|the time! We're going to be
late.
─────────────────────────────────────────
S JUMP 【look】
1 look at sth
─────────────────────────────────────────
2 look down your nose at sb/sth
3 steal a glance/look (at sb/sth)
```

INFORMATION PROCESSING APPARATUS

TECHNICAL FIELD

The present invention relates to an information processing apparatus, and more particularly to an information processing apparatus having a function of selecting a function to be executed to a displayed character string, and then, selecting a range of a character string to which this function is applied.

The present invention also relates to an information processing apparatus, and more particularly to an information processing apparatus having a character string selecting function in which a character string displayed on a screen is selected, and then, only a function that is applicable to the selected character string can be selected from the plural functions.

The present invention also relates to an electronic apparatus and a control method of an electronic apparatus, and more particularly to a control device and a control method of an electronic apparatus that can select plural functions.

BACKGROUND

Conventionally, in an electronic apparatus provided with an information searching function, such as an electronic dictionary or a PDA, not only a keyboard but also a pointing device such as a touch panel, a mouse, or a pen is used as an input device.

Further, plural functions that can be executed to a character string displayed on a screen for an information search are installed beforehand. For example, some electronic apparatuses have a "jump" function in which, when a user intends to find a meaning of a specific character string in a sentence displayed on a screen, the meaning corresponding to the specific character string is searched and displayed from dictionary data installed to an electronic dictionary.

Conventionally, in order to execute the "jump" function, a specific key for executing the "jump" function is depressed to determine a function to be executed, then, a user designates a start and end position of a desired character string with a pen, and finally, the user depresses a decision (enter) key indicating the execution of the function.

Patent Document 1 describes an information processing apparatus that specifies a character string, which is a subject to be processed, from a positional relationship between the character string and a pen used for tracing the character string or a speed of the pen, when a user makes an operation of tracing the displayed character string with the pen, and reads a character operation (character decoration, etc.) to be executed by referring to a character operation table in which many functions for a character operation are set beforehand.

In an electronic dictionary, many functions that can be used by a user are prepared beforehand, such as a voice reproduction function, and a marker function for coloring a specific character string, in addition to the above-mentioned "jump" function.

In general, a type of a character string to which a corresponding function can be executed is determined beforehand for each function, so that an executable function to the character string designated by a user is restricted. For example, a character string to which the "jump" function can be executed is restricted to an English character such as an alphabet or Japanese character such as hiragana or katakana. When a symbol such as a comma or period is designated, the jump function is not executed.

A character string including an English word to which the voice reproduction function can be executed is restricted to a single English word including alphabet. When the other character string (e.g., a character string including hiragana) is designated, the voice reproduction function is not executed.

When a function is selected first, and then, a character to which this function is executed is designated, an operation of designating a start position of the character string, an operation of selecting a range of the character string, and an operation of depressing a function execution key are generally made in a designated order so as to execute the function to all character strings within the selected range.

If the function is always executed to all selected character strings, regardless of whether a character type to which a certain function cannot be executed is included or not, a result that is not expected by the user might be produced through the execution of the function.

When many operations to a certain character string and many functions executed by the operations are determined as in the Patent Document 1, the user has to know to some degree which process is executed by which operation, which increases a burden of the user for the operation.

When there are a great number of functions to be executed, it is difficult to know a character type to which a function can be executed for each function. Further, it is troublesome that a character type to which a function can be executed is checked by a manual in each case, and this process increases an operation burden of the user.

It is supposed that the user erroneously selects a character string including many character types such as alphabet, hiragana, or symbol. In this case, the character string includes the character type to which a function intended by the user cannot be executed, so that the function might not be executed. A user who is not used to an information processing apparatus cannot understand why the function cannot be executed, and he/she has to select again a character string.

Specifically, the user has to know, as much as possible, what is the character type of the character to which the function selected previously can be executed, as well as the user has to select a character string with care not to select a character string including a character to which a function cannot be executed, which increases an operation burden of the user.

Patent Document 2 describes an information processing apparatus in which, after a user makes an operation of designating a desired character string that the user intends to make an editing operation, the character string is highlighted, and a pop-up menu is displayed in the vicinity of the highlighted character string, separate from a fixed edition function menu, wherein the user intentionally makes an operation of selecting a desired function from many functions displayed on the pop-up menu in order to execute the function.

A computer has plural functions, and after an operation function is selected, it generally designates to which section the function is executed. For example, an electronic dictionary has a word voice reproduction function, a sentence voice reproduction function, an S jump function, or a marker function. It starts one of these functions, and a character range to which this function is to be executed is designated. Then, the selected function is executed to the character in the selected range.

The "word voice reproduction function" is a function of outputting a voice reading a single English word, including a single word of alphabet (alphabetical character). The "sentence voice reproduction function" is a function of outputting plural English words with synthesized voice, when the selected character string includes plural English words. The "S jump function" is a function of specifying the selected English word or selected Japanese (e.g., a character string including kanji, hiragana, or katakana) as a direction word, and searching information corresponding to the direction word from an English dictionary or Japanese dictionary installed to the electronic dictionary. The selected character string is not limited to an English word or Japanese, but a language other than English or Japanese can be selected, if it is a displayed character string. In this case, content information corresponding to this language is searched. The "marker function" is a function of coloring all of the selected character strings and symbols with a color different from the character display color. It may be a function of adding an underline, instead of a colored display.

Specifically, as illustrated in FIG. 39, a hard key for designating an operation function is mounted to an electronic apparatus, and when the hard key is selected, a function corresponding to the key is started. For example, an electronic dictionary includes the word voice reproduction function, the sentence reading function, the S jump function, or the marker function. When a key for designating each operation function is operated, the designated function is started. Next, a character range to which the selected function is executed is designated. In the electronic dictionary, an operation of selecting a range has to be performed for a character type corresponding to the selected function. Specifically, when the operation of selecting a range is performed, a character type whose range can be selected corresponding to the started function has to be selected, i.e., a range has to be selected considering whether a word can be selected or not, whether plural continuous words can be selected or not, whether English or Japanese can be selected or not, or whether a selection having English and Japanese mixed therein is possible or not. When the selection of the range is completed as described above, the selected function is executed to the character whose range is selected. Specifically, after a function is selected, a selection of a range is executed to this function.

An electronic dictionary illustrated in FIG. 39(a) includes an S jump function button 251, an MP3 voice reproduction function button 252, a TTS sentence reading function button 253, and a marker function button 254. When the S jump function is executed, a character range "い" is designated after the S jump function button 251 is depressed as illustrated in FIG. 39(b). When the MP3 voice reproduction function is executed, a character range "That" is designated after the MP3 voice reproduction function button 252 is depressed as illustrated in FIG. 39(c). When the TTS sentence reading function is executed, a character range "That goes" is designated after the TTS sentence reading function button 253 is depressed as illustrated in FIG. 39(d). When the marker function is executed, a character range "私の言うとおりにしなさい" is designated after the marker function button 254 is depressed as illustrated in FIG. 39(e).

As described above, an operation function and a character type to which the operation function can be executed are different for each operation function. Therefore, it is necessary to select the operation function first, and then, select a character range including a character type to which the selected operation function can be executed. This is because, since the selectable character type included in the character range is different for each operation function, the selectable character type is determined by selecting the operation function first. However, when the selected character range includes a character type to which the operation function cannot be executed, the character range has to be selected again, since the operation function is selected first. Therefore, a user has to remember the selectable character type for each operation function. If the user makes an error, the operation function cannot be executed, so that the user has to select again the character range to which the operation function can be executed. Since the operation to be started is different for each operation function, the number of the hard keys increases as illustrated in FIG. 39, which makes it difficult for the user to use.

An information processing apparatus has conventionally been designed to provide a simple operation.

For example, Patent Document 1 discloses an information terminal apparatus provided with a touch panel, wherein a character operation can easily be made with a simple procedure. Specifically, a display device and a tablet are overlaid, and when an input is made from the tablet with a pen operation, its stroke is analyzed to analyze the positional relationship between the stroke and the displayed character. A character that is a subject to be operated is specified from the analysis result, and reads a type of the executable character operation from a table. When a same character decoration is made to the read character operation and the subject character, the character decoration is deleted from the subject character. If the same character decoration is not made, the character decoration is made to the subject character.

Patent Document 3 describes an apparatus in which a menu display is controlled according to an inputted character, wherein a function menu of a scientific electric calculator has a convenient operation specification. Specifically, combination information of each operation character used for an input equation is stored, and an operation character that has a possibility of being used for the input equation that is currently inputted is displayed on a menu as a candidate operation character based upon an operation character inputted according to an operation input by a user and usage combination information, whereby any one of the candidate operation characters displayed on the menu is selected to input the operation character.

Patent Document 2 describes an information processing apparatus provided with an integral display/input device, wherein an operation range when an operation is changed from an operation of designating a range of a character string that is a subject to be processed to an operation of selecting a processed function is reduced, and an operation amount is reduced, whereby operability is enhanced. Specifically, a part of a document displayed on the display device is designated as a range to be processed from coordinate data inputted from a coordinate input device, and a display position variable menu, which includes plural menu items for selecting a process to the designated range, is displayed in the vicinity of the designated range according to the designation of the range. When the menu item in the display position variable menu is selected, the process defined in the menu item is executed to the designated range.

Patent Document 4 describes the one in which an effective function is selected by utilizing a coordinate when a mouse button is clicked in order to prevent plural functions from being operated. Specifically, when a right button of a mouse is clicked, a control unit identifies a coordinate position of a mouse cursor at this point. When it is within an effective range of creating an external character, the display device deletes the display of an external dot at the coordinate position, and an external character editing unit deletes the corresponding dot from an external-character creating memory. When it is without the effective range of creating an external character, an external character editing menu window is displayed so as to enable a menu selection.

CITATION LIST

Patent Document

Patent Document 1: JP-A No. 2004-78509
Patent Document 2: JP-A No. H05-189149
Patent Document 3: JP-A No. 2006-65768
Patent Document 4: JP-A No. H08-76729

SUMMARY OF INVENTION

Technical Problem

When a function is selected first, and then, a character string to which the function is executed is designated as described above, many operations, such as the operation of designating the start position of the character string, the operation of selecting the range of the character string, and the operation of depressing the function execution key, have to be performed in the designated order, which makes the operation complicated. From the viewpoint of enhancing operability of a user, it is considered that the designation of a character string is desirably made before the selection of a function.

However, in the apparatus described in Patent Document 2, the designation of a character string is performed before the selection of a function, but all functions set beforehand are displayed on the pop-up menu, so that the function that can be executed to the designated character string is not always selected.

Specifically, the pop-up menu displays the functions that cannot be executed to the designated character string, so that the user might erroneously select the non-executable function. This might provide poor operability to the user.

There may be the case in which, even when the user designates a character string including many character types such as an alphabet, hiragana or symbol, and then, makes an operation of selecting a desired function, this function cannot be executed since the character string includes a character type that is not a subject of the execution. The user who is not used to the apparatus does not understand why the function cannot be executed. Further, the user has to select again a character string.

In the electronic dictionary illustrated in FIG. 39, an operation function is selected first, and then, a character to which the selected operation function is executed is designated. Therefore, when the user erroneously selects a character type that can be selected for each operation function, the operation function is not executed, resulting in that the user has to select again a character range to which the operation function can be executed.

The apparatus in Patent Document 1 facilitates the character operation such as the character decoration, Patent Document 3 relates to an input aid for the scientific electric calculator, and Patent Document 4 prevents the plural operations from being operated, and does not aim to select the operation function.

In Patent Document 2, all functions set beforehand are displayed on the display position variable menu, and the operation is selected from the displayed functions to be executed. However, since the display position variable menu displays all functions set beforehand, a function that cannot be executed to the designated character might be included, whereby the user might select the non-executable function. Accordingly, the operability might be poor for the user.

The present invention is accomplished in view of the foregoing problems, and aims to provide a control device and a control method of an electronic apparatus having enhanced operability by displaying an operation function that can be executed to a character string whose range is selected.

Solution to Problem

The present invention provides an information processing apparatus including: a display unit that displays content information including a character string; a memory unit that stores a character type-function correspondence information in which one or plural functions and a character type of a character that is a subject to which the corresponding function is executed are associated with each other; a function selection unit that selects a function that should be executed; a character selection unit that selects a desired character string in the content information displayed on the display unit, after the function is selected; a character identification unit that refers to the character type-function correspondence information in order to determine whether a character having a valid character type to which the function selected by the function selection unit can be executed is present or not in the character string selected by the character selection unit; and a valid character string decision unit that decides a valid character string, which is a subject to which the function is executed, from the selected character string selected by the character selection unit, when the character identification unit determines that the character having the valid character type is present.

This configuration facilitates a character string selecting operation by a user after a selection of a function, whereby a re-selection of a character string to which a function is executed is reduced to decrease an operation burden of the user.

The present invention also provides an information processing apparatus including: a character string display unit that displays content information including a character string; a memory unit that stores a character type-function correspondence information in which executable functions and a character type of a character that is a subject to which the corresponding function is executed are associated with each other; a character selection unit that selects a desired character string in the content information displayed on the character string display unit; a character type acquiring unit that acquires a character type of a first character of the selected character string; a function acquiring unit that acquires an executable function associated with the acquired character type from the character type-function correspondence information, after a character string is selected by the character selection unit; a valid character string decision unit that decides a valid character string, to which the function is executed, from the selected character string selected by the character selection unit, for each of the acquired executable functions; and a function selection unit that selects the executable function from the acquired executable functions.

With this configuration, after the selected character string is selected, the executable function is acquired, and further, the valid character string to which the function is executed is decided. Therefore, an operation of a user is made simple and easy-to-understand, an erroneous operation can be reduced, and operability of the user can be enhanced.

In order to solve the foregoing problems, an electronic apparatus according to the present invention includes: a memory unit that stores plural executable operation functions and a character type as associated with each other; a display unit that displays the operation function and a character string; a character selection unit that selects a desired character from the character string displayed on the display unit;

a character type acquiring unit that acquires a character type of the character selected by the character selection unit; a function acquiring unit that acquires the operation function corresponding to the character type acquired by the character type acquiring unit from the memory unit; and a control unit that displays the operation function acquired by the function acquiring unit on the display unit.

The electronic apparatus according to the present invention is applied to an electronic dictionary, for example, and a control device of the electronic apparatus is used for a control device that displays which one of a voice reproduction function, a sentence voice reproduction function, an S jump function, and a marker function of the electronic dictionary is an executable operation. The word voice reproduction function is a function of outputting a voice reading a single English word, including a single word of alphabet (alphabetical character). The sentence voice reproduction function is a function of outputting plural English words with synthesized voice. The S jump function is a function of specifying the selected English word (word search), selected plural English words (phrase search), or selected Japanese (e.g., a character string including kanji, hiragana, or katakana) as a direction word, and searching information corresponding to the direction word from an English dictionary or Japanese dictionary installed to the electronic dictionary. The marker function is a function of coloring all of the selected character strings and symbols with a color different from the character display color.

When the electronic dictionary has installed thereto a dictionary of a language (Chinese, etc.) other than Japanese and English, a function that can be executed is determined beforehand not only for Japanese and English word or English sentence but also for a word or sentence of the other language, and a specific function is executed to the selected character string.

In the present invention, the character type means an English word, plural English words, or Japanese included in the character string, a character string of two or more languages, or symbol. The character string of two or more languages means a language used for a dictionary installed to the electronic dictionary.

The control device of the electronic apparatus according to the present invention stores the operation function and the character type in a memory unit as being associated with each other as the character type-function correspondence information in a semiconductor memory device.

For example, when an English word is selected, the control device of the electronic apparatus according to the present invention can execute the word voice reproduction function, the sentence voice reproduction function, the S jump function for searching one word, or the marker function. When plural English words are selected, the sentence voice reproduction function, the S jump function for searching a phrase, or the marker function can be selected. When Japanese is selected, the S jump function or the maker function can be selected. When the character string of two or more languages or symbol is selected, the marker function can be selected. Therefore, a word, plural words, a character string of two or more languages, or symbol may be identified as the character type.

According to another aspect, the present invention is a control method of an electronic apparatus performed by a computer including a memory unit that stores plural executable operation functions and a character type as associated with each other, the control method including: a display step that displays a character string; a character selection step that selects a desired character from the displayed character string; a character type acquiring step that acquires a character type of the selected character; a function acquiring step that acquires the operation function corresponding to the acquired character type from the memory unit; and a display control step that displays the acquired operation function.

Effect of the Invention

According to the control device of an electronic apparatus, an operation function that can be executed to a character string whose range is selected is displayed, so that the present invention can provide a control device and a control method of an electronic apparatus having enhanced operability.

In the present invention, when a character to which a desired operation function is executed is selected, a function that can be operated is displayed, whereby an erroneous operation by a user is reduced, and operability of an electronic apparatus is enhanced.

BRIEF DESCRIPTION OF THE DRAWINGS

FIG. 2 is an explanatory view of character type-function correspondence information according to one embodiment of the present invention.

FIG. 3 is an explanatory view of a character string selecting operation according to one embodiment of the present invention.

FIG. 12 is an explanatory view illustrating the character string selecting operation and a position where a pen is detached according to one embodiment of the present invention.

FIG. 13 is an explanatory view illustrating a character string selecting operation corresponding to the process in FIG. 11 according to one embodiment of the present invention.

FIG. 15 is an explanatory view of character type-function correspondence information according to one embodiment of the present invention.

FIG. 16 is a schematic explanatory view of a character string selection and function selection according to an embodiment 1 of the present invention.

FIG. 25 is a schematic explanatory view of a character string selection and function selection according to an embodiment 2 of the present invention.

FIG. 26 is a schematic explanatory view of a character string selection and function selection according to an embodiment 2 of the present invention.

FIG. 29 is an explanatory view illustrating function selecting analysis information according to the embodiment 2 of the present invention.

FIG. 32 is a block diagram illustrating a data unit in the electronic apparatus according to the present invention.

FIG. 33 illustrates a correspondence table of character type in selected range for each function used for the electronic apparatus according to the present invention.

FIG. 34 is an operation explanatory view of an electronic dictionary to which the electronic apparatus according to the present invention is applied.

FIG. 35 is an operation explanatory view of an S jump function in the electronic dictionary to which the electronic apparatus according to the present invention is applied.

FIG. 36 is another operation explanatory view of an S jump function in the electronic dictionary to which the electronic apparatus according to the present invention is applied.

FIG. 37 is still another operation explanatory view of an S jump function in the electronic dictionary to which the electronic apparatus according to the present invention is applied.

PREFERRED EMBODIMENTS OF THE INVENTION

Figure 1:
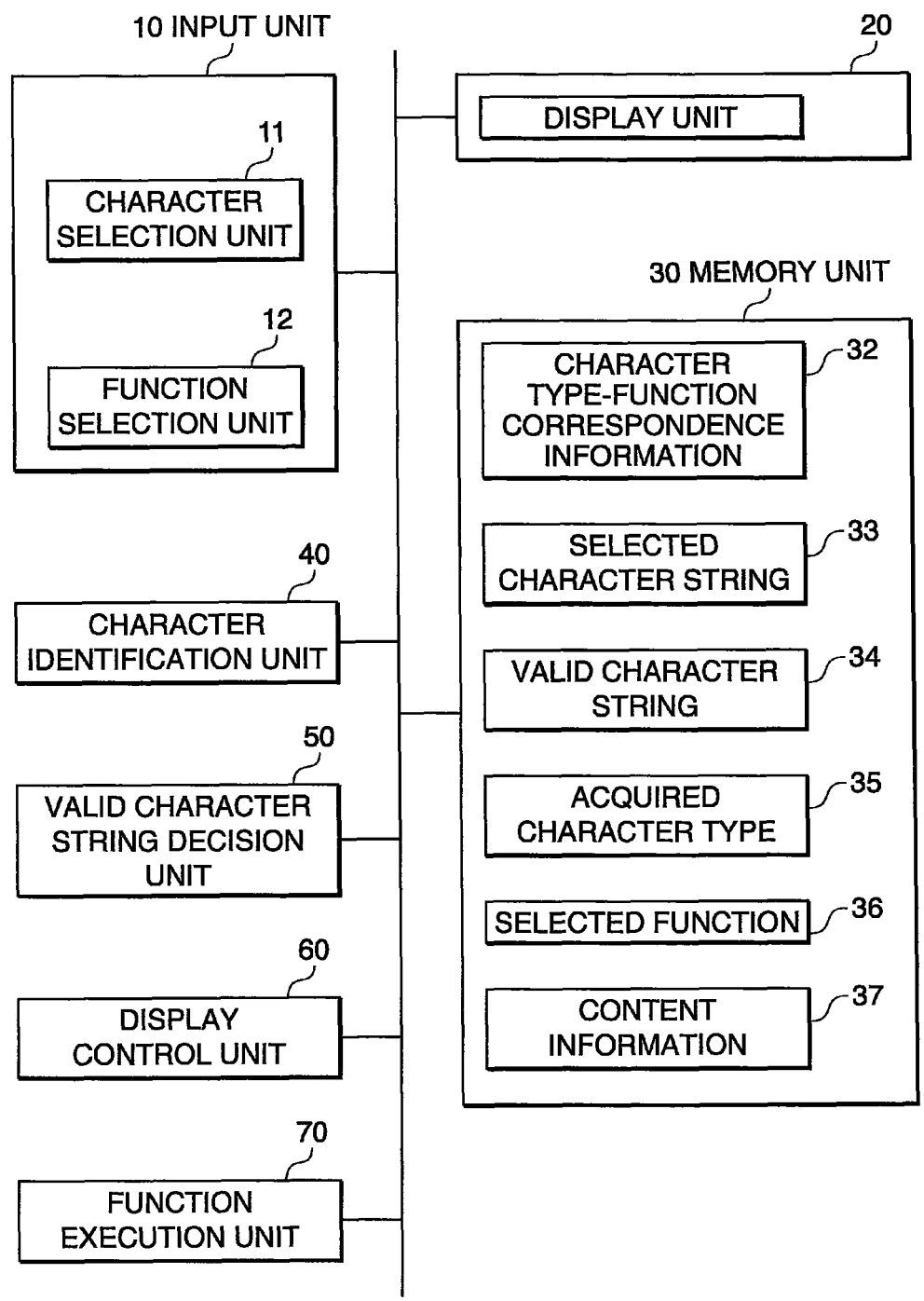
FIG. 1 is a structural block diagram illustrating one example of an information processing apparatus according to the present invention.

Information processing apparatus when a function is selected first.

Here, an information processing apparatus will be described, wherein a desired operation is selected first, and only a portion of a character string to which the function can be executed is decided as a valid character string, in order to reduce an operation burden upon an execution of a user's desired function, and to be capable of enhancing operability.

This invention provides an information processing apparatus including: a display unit that displays content information including a character string; a memory unit that stores a character type-function correspondence information in which one or plural functions and a character type of a character that is a subject to which the corresponding function is executed are associated with each other; a function selection unit that selects a function that should be executed; a character selection unit that selects a desired character string in the content information displayed on the display unit, after the function is selected; a character identification unit that refers to the character type-function correspondence information in order to determine whether a character having a valid character type to which the function selected by the function selection unit can be executed is present or not in the character string selected by the character selection unit; and a valid character string decision unit that decides a valid character string, to which the function is executed, from the selected character string selected by the character selection unit, when the character identification unit determines that the character having the valid character type is present.

This configuration facilitates a character string selecting operation by a user after a selection of a function, whereby a re-selection of a character string to which a function is executed is reduced to decrease an operation burden of the user.

The invention further includes a display control unit, wherein the display control unit displays the character string selected by the character selection unit in a display form different from a display form of a character string that is not selected.

Alternatively, the display control unit may display the valid character string decided by the valid character string decision unit in a display form different from a display form of other characters displayed on the display unit.

With this configuration, the valid character string to which the selected function can be executed is displayed in a display form different from a display form of the other characters, so that the user can easily recognize which is the character string to which the function is to be executed.

The present invention further includes a function execution unit that executes the function, which is selected by the function selection unit and which should be executed, to the valid character string decided by the valid character string decision unit.

In this invention, the valid character string decided by the valid character string decision unit includes a character having the valid character type to which the selected function can be executed, and is a character string included in the selected character string. Here, the valid character string may agree with the selected character string, or may be a part of the selected character string.

With this configuration, the character string including a character having the valid character type can be specified as a subject to which the function is to be executed, from the selected character string. Therefore, when the user selects the character string, the user does not perform an operation of selecting a character string as being conscious of which one is the valid character string to which the selected function can be executed, whereby the burden for the character string selecting operation can be reduced.

The character type in the character type-function correspondence information stored in the memory unit includes an alphabet, and Japanese character, wherein one or plural character types of a character to which the corresponding function is executed are set beforehand for each function.

The function stored in the memory unit includes a voice reproduction function, an S jump function, a reading function, and a marker function.

In the present invention, when the character identification unit determines that the selected character string includes a character having a valid character type to which the function selected by the function selection unit can be executed, the valid character string decision unit decides the character string from a first character having the valid character type to a character continuously having the valid character type as the valid character string.

With this configuration, not only when the first character of the selected character string is the character having the valid character type, but also when the first character is not the valid character, and the selected character string includes the character having the valid character type, the character string subsequent to the character is decided as the valid character string. Therefore, even when the user erroneously selects the character string including a character to which the selected function cannot be executed, the user can execute the function to the character string that the user intends to select, whereby the operation burden of the user can be reduced.

In the information processing apparatus described above, when the last position of the character string selected by the character selection unit is a character having a valid character type, the valid character string decision unit decides a character string including one or plural continuous characters having the valid character type as the valid character string from the selected character string.

With this configuration, only when the position of the last character upon the end of the selection of the character string is a character having a valid character type, the valid character string is decided from the selected character string. Therefore, when the last character is not the character having the valid character type, on the contrary, e.g., when the region where the displayed character string is not present is unintentionally selected as the last character, the selected character string is not decided as the valid character string, but the selecting operation of the character string is determined to be erroneous, and the function is not executed.

In the present invention, the character selection unit is a pen, and when the character string displayed on the display unit is selected through a touch of the pen onto the display screen, the display control unit highlights only the portion of the valid character string from the selected character string in the state in which the character string is selected.

With this configuration, only the portion of the valid character string in the selected character string is highlighted in the state in which the character string is currently selected. Therefore, when the user erroneously selects a character string including a character that is not the valid character, the portion that is not the valid character string is not highlighted, so that the user can easily recognize that he/she is going to select a character to which the selected function cannot be executed.

The character selection unit is a pen, and when the character string displayed on the display unit is selected through a touch of the pen onto the display screen, the display control unit may highlight the whole selected character string in a state in which the character string is selected.

In the state in which the whole selected character string is highlighted, it is determined that the selection of the selected character string is ended when the pen is detached from the display screen, and when the position where the pen is detached from the display screen is the position included in the position of the displayed selected character string, the valid character string decision unit decides the character string having the character type to which the selected function can be executed as the valid character string from the character string included in the selected character string, and the display control unit highlights the portion of the valid character string.

With this configuration, it is determined that the selection of the selected character string is ended when the pen is detached from the display screen, whereby the user does not perform a specific operation for a key input indicating the end of the selection. Further, the operation of detaching the pen is simple and easy-to-understand selecting end operation.

During the selection of the character string, all selected character string is highlighted, and after the pen is detached from the display screen, the valid character string included in the selected character string is highlighted. Therefore, the user can easily recognize which is the character string to which the selected function can be executed.

The present invention also provides a program of an information processing apparatus, the program allowing a computer to execute as: a display unit that displays content information including a character string; a memory unit that stores a character type-function correspondence information in which one or plural functions and a character type of a character that is a subject to which the corresponding function is executed are associated with each other; a function selection unit that selects a function that should be executed; a character selection unit that selects a desired character string in the content information displayed on the display unit; a character identification unit that refers to the character type-function correspondence information in order to determine whether a character having a valid character type to which the function selected by the function selection unit can be executed is present or not in the character string selected by the character selection unit; and a valid character string decision unit that decides a valid character string, which is a subject to which the function is executed, from the selected character string selected by the character selection unit, when the character identification unit determines that the character having the valid character type is present.

The present invention also provides a character string selecting method for an information processing apparatus including a display unit that displays content information including a character string; a memory unit that stores a character type-function correspondence information in which one or plural functions and a character type of a character that is a subject to which the corresponding function is executed are associated with each other; a function selection unit; a character selection unit; a character identification unit; and a valid character string decision unit, wherein the function selection unit selects a function that should be executed, the character selection unit selects a desired character string in the content information displayed on the display unit, the character identification unit refers to the character type-function correspondence information in order to determine whether a character having a valid character type to which the function selected by the function selection unit can be executed is present or not in the character string selected by the character selection unit, and the valid character string decision unit decides a valid character string, which is a subject to which the function is executed, from the selected character string selected by the character selection unit, when the character identification unit determines that that the character having the valid character type is present.

An embodiment of the present invention will be described with reference to the drawings. It is to be noted that the present invention is not limited to the description of the embodiments below.

<Structure of Information Processing Apparatus According to the Present Invention>

FIG. 1 is a block diagram illustrating a structure of an information processing apparatus according to one embodiment of the present invention.

In FIG. 1, the information processing apparatus according to the present invention includes an input unit 10, a display unit 20, a memory unit 30, a character identification unit 40, a valid character string decision unit 50, a display control unit 60, and a function execution unit 70.

Here, the information processing apparatus is realized by a microcomputer including a CPU, a ROM, a RAM, an I/O controller, and a timer, wherein the function of each function block is executed by the CPU that allows various hardware to be operated based upon a control program stored in the ROM. The CPU corresponds to an unillustrated control unit that operates each of the function blocks in FIG. 1, and allows the respective function blocks to execute a process in a flowchart illustrated in FIG. 5.

The information processing apparatus is incorporated into an electronic apparatus such as an electronic dictionary, a PDA, a cellular phone, or a notebook-type personal computer for use.

The input unit 10 is a section for inputting characters, graphics, and symbols, and for selecting a function, wherein a keyboard or a pointing device such as a mouse or a pen is used.

From the viewpoint of an input function, the input unit 10 in the present invention includes a character selection unit 11 for selecting a desired character string from the displayed content information, and a function selection unit 12 for selecting a function, which is to be executed, among executable functions set beforehand.

The functions of both the character selecting unit 11 and the function selection unit 12 are executed with the use of the keyboard or pen. For example, as illustrated in FIG. 3(b), the character selection unit 11 is a function block that selects a portion of "ア" in the character string displayed on a display screen 101 with the use of the pen. The selected character string "ア" is stored in the memory unit 30 as a selected character string 33.

The function selection unit 12 is a function block that, when a dedicated key for selecting a specific function among functions prepared beforehand is depressed, selects the corresponding function. Alternatively, the function selection unit 12 allows the display unit 20 to display a function selecting screen, and to select an item (S jump function, etc.) for the desired function, which should be executed, from function items displayed on this screen with the use of a pen.

The selected function is stored in the memory unit 30 as a selected function 36.

It is to be noted that, in the present invention, a function is selected before a character string is selected, so as to determine the function that is to be executed.

The display unit 20 is a section that displays content information including character strings, graphics, and symbols, wherein an LCD, an organic EL display, a PDP, or a CRT is used.

A touch panel is arranged as being overlaid on the display screen of the display unit 20, and when a pen touches the display screen, the information of a character, for example, displayed at the touched position can be selected.

When a pen is used as the character selection unit 11, a character string displayed on the display unit is selected through a touch of the pen on the display screen. When a character at the displayed position where the pen is touched first is the first character, and a user makes an operation of tracing the character with the pen being touched, one or plural characters following the character are selected. The character string selected as described above is a selected character string.

When this operation is performed at the point when the pen is detached from the display screen, it is determined that the selection of the selected character string is ended.

It is preferable that the selected character string selected by the character selection unit 11 is displayed in a display form different from that of a character string that is not selected, in order that a user is easy to visually recognize. For example, it may be highlighted.

As described above, the character identification unit 40 refers to the character type-function correspondence information so as to determine whether or not there is a character having a valid character type to which the function selected by the function selecting unit can be executed in the character string selected by the character selection unit. In other words, it is a section that determines whether or not there is a character whose type (character type) is valid in the selected character string. Here, the character type means a type of a character, and means an alphabet (alphabetical character), Japanese character (kanji, hiragana, katakana), symbol, and character of other languages, for example.

For example, when "ア" is selected in the display screen illustrated in FIG. 3(b), the character type of the selected character is determined to be katakana through the identification of a value of a character code of the character. Then, the character identification unit refers to the character type-function correspondence information illustrated in FIG. 2 so as to determine whether the character type (katakana) is the character type to which the function (e.g., S jump function) that has already been selected by the function selection unit 12 can be executed or not. In FIG. 3(b), the character type (katakana) is determined to be the character type to which the S jump function can be executed. When it is the character type to which the function can be executed, this character type is stored in the memory unit 30 as the acquired character type 35. The character having the character type to which the function can be executed is referred to as a valid character.

There may be a case in which the selected character string contains plural character types. In the present invention, the character type of the selected first character is acquired, in principle.

For example, when "ア" is selected in FIG. 3(b), "katakana" that is the character type of the first character "ア" is acquired as the acquired character type 35.

In case where the first character has the character type to which the selected function cannot be executed, this character may be excluded, and the character type of the character to which the function can be executed may be acquired from the characters selected afterward.

For example, when it is determined that the first character of the selected character string is not the valid character, and the second character is the character having the valid character type to which the selected function can be executed, the second character may be specified as the first character of the valid character string. In this case, the second character is specified as the first character having the valid character type, and the character string up to the character, which is continuous from this character and has the valid character type, is specified as the valid character string.

Here, the characters having the character type same as that of the second character may be specified as the character continuously having the valid character type. For example, when the valid character type is "katakana" for the selected character string "。アニメ。動", the second character "ア" is specified as the valid character, and the portion of "アニメ" continuously having the valid character type is determined to be the valid character string.

The valid character string decision unit 50 is a section that, when the character identification unit determines that there is a character having the valid character type, decides the valid character string, which is the subject to which the function that has already been selected by the function selection unit 12 is executed, from the selected character string 33 selected by the character selection unit 11. The decided valid character string 34 is stored in the memory unit 30.

The selected function is executed to the decided valid character string 34. The valid character string means the character string having the character type (referred to as the valid character type) to which the selected function can be executed.

For example, when the selected character string is "アニメ", the character type thereof is specified as "katakana" of Japanese character, and is decided to be the valid character string to which the S jump function can be executed, for example.

When the selected function is a "voice reproduction function", and the selected character string is "アニメ", this character string is decided not to be the valid character string, because the character type of the selected character string is the one (katakana) to which the voice reproduction function cannot be executed.

The valid character string 34 decided by the valid character string decision unit 50 may be the same as the selected character string 33, but when the selected character string contains the character to which the function cannot be executed, they are not the same, and some of the selected character string may be specified as the valid character string.

When the selected function is the "S jump function", and the selected character string is "アニメ。動画。", for example, the selected character string 33 contains a period "。" to which the S jump function cannot be executed. Therefore, only the string of "アニメ" is decided to be the valid character string 34. In this case, "。動画。" in the selected character string 33 is excluded from the valid character string 34.

When the selected function is "S jump function", and the selected character string is "。動画。", for example, periods "。" at the head and the last of the character string is excluded from the valid character string, and only "動画" is decided to be the valid character string 34. In this case, the string of "動画" is the characters having the valid character type to which the selected S jump function can be executed.

When the selected function is a "marker function", all characters are subjects to which the function can be executed. Therefore, the whole "アニメ。動画。" is decided to be the valid character string to which the function can be executed.

An electronic dictionary has many functions that can be executed. In embodiments of the present invention below, four functions (voice reproduction function, S jump function, reading function, marker function) are focused for description.

In the present invention, the "voice reproduction function" is a function for outputting a voice reading a single English word that is a selected character string, including only alphabets (alphabetical characters).

The "S jump function" is a function in which a single word containing only selected alphabetical characters or selected Japanese character string (e.g., a character string containing kanji, hiragana, or katakana) is specified as a direction word, and information corresponding to the direction word is searched from an installed Japanese dictionary.

The selected character string is not limited to the Japanese character. The other languages can be selected, so long as they are character strings displayed. In this case, content information corresponding to the language can be searched.

The "reading function" is a function for outputting a synthesized voice reading a selected sentence including plural English words.

The "marker function" is a function for displaying a background of all selected characters or symbols as painting with a color different from a display color for the character.

When a dictionary for a language (e.g., Chinese) other than English is installed in an electronic dictionary, a function that can be executed to not only English words or English sentences but also words or sentences of the other languages is determined beforehand, and a specific function is executed corresponding to the selected character string.

In the embodiments described below, an alphabetical character and Japanese character are focused.

The memory unit 30 is a section for storing various information pieces, wherein a RAM, a ROM, a semiconductor memory such as a flash memory, a memory device such as a hard disk, or a memory medium such as a CD-R can be used for the memory unit 30.

The memory unit 30 stores, for example, the character type-function correspondence information 32, the selected character string 33, the valid character string 34, the acquired character type 35, the selected function 36, and the content information 37.

The content information 37 means information included in Japanese dictionary or English-Japanese dictionary.

The memory unit 30 also stores a control program that allows a computer to function in order to realize the respective blocks in the information processing apparatus. The control program is provided as being stored in various memory devices or memory mediums, or provided as being downloaded through network.

FIG. 2 is an explanatory view of the character type-function correspondence information 32 indicating the valid character types for four functions according to one embodiment. The character type-function correspondence information is the one in which one or plural executable functions and the character type (valid character type) of the character, which is the subject to which the respective functions are executed, are associated with each other.

FIG. 2 illustrates the items of four functions and the corresponding valid character types.

In FIG. 2, when the character type of the portion selected as the valid character string is "alphabetical character (alphabet)", for example, it is found that the voice reproduction function, the S jump function, the reading function, and the marker function are the executable functions.

When the valid character string is "katakana", two functions, which are the S jump function and the marker function, are the executable functions.

Even when a hiragana character is selected in case where the "voice reproduction function" is selected, this character is not specified as the valid character string, but when only alphabetical characters are selected, these characters are specified as the valid character string.

In FIG. 1, the display control unit 60 is a section that sets characters or the like that are to be displayed on the display unit 20, and allows the display unit 20 to display the character or the like based upon a designated display position, display color, and a size of the character.

In the present invention, the display control unit 60 is the section that displays the character string (selected character string) selected by the character selection unit in a display form different from that of the character string that is not selected. Alternatively, it is the section that displays the character string decided to be the valid character string on the display unit in a display form different from that of the other character strings displayed onto the display unit. For example, the display control unit 60 performs a process of highlighting the selected character string 33 or the valid character string 34 in the content information 37 displayed onto the display unit.

The function execution unit 70 is a section that executes the function selected by a user.

Specifically, it is a section that allows the function, which is selected by the function selection unit 12 and which should be executed, to be executed to the valid character string decided by the character string decision unit 50.

For example, when the "S jump" is selected and inputted by the user, and "ア ニ メ" is selected as the selected character string as illustrated in FIG. 3(c), the S jump function is executed to the "ア ニ メ", because the "ア ニ メ" is katakana that is the valid character string to which the S jump function can be executed. In this case, since the valid character string is "ア ニ メ", a dictionary search is performed with the "ア ニ メ" being specified as a direction word, whereby the information stored corresponding to the "ア ニ メ" is displayed.

<Description of Outline of Character String Process after Selection of Function>

FIG. 3 is a schematic explanatory view of a character string selecting process after the selection of the function according to one embodiment of the present invention.

FIG. 3(a) illustrates the state in which the content of the content information 37 involved with "ア ニ メ ー シ ョ ン" is displayed on a display screen 101 of the display unit 20, and the "S jump function" has already been selected as the function to be executed.

The user makes an operation (character string selecting operation) of tracing the display screen 101 with the use of a pen with this state so as to select a character. The selected characters are highlighted, for example, by the display control unit, so that they are displayed as being distinguished from the other non-selected characters.

For example, FIG. 3(b) illustrates the state in which the user makes the character string selecting operation with the pen to select "ア" from the displayed character string, and the selected character "ア" is displayed as being distinguished. In this case, katakana (Japanese character) is acquired as the acquired character type 35.

FIG. 3(c) illustrates the state in which the user puts the pen onto the screen, and with this state, moves the pen from "ア" to "メ" to select "ア ニ メ".

In FIG. 3(c), when the user detach the pen from the screen at the position of "メ" after he/she traces the display screen 101 with the pen to select the character string from "ア" to "メ", a deciding process of the valid character string is performed. Illustrated here is the case in which the character at the last position of the selected character string is the character having the valid character type. In this case, it is determined whether the character type of the selected character string is the valid character string to which the "S jump function" can be executed or not with the use of the character type-function correspondence information 32 illustrated in FIG. 2.

In FIG. 3(c), the character type of the selected character string "ア ニ メ" is the character type (katakana) to which the S jump function can be executed, so that the "ア ニ メ" is determined to be the valid character string. In this case, the selected character string and the valid character string agree with each other. The character at the last position of the selected character string is "メ" that is the character having the valid character type (katakana), which means that the "ア ニ メ" is the character string including three continuous characters having the valid character type. Therefore, it becomes the subject to which the function is executed.

Thereafter, the "S jump function", which has already been selected, is executed to the valid character string "ア ニ メ".

FIG. 3(d) illustrates the state in which the user puts the pen onto the display screen, and with this state, the user traces from the first character "ア" to "画" with the pen.

A period "。" that is the character type to which the S jump function is not executed is included between "ア ニ メ" to "動画". Specifically, the selected character string "ア ニ メ。動画" contains the character (invalid character) to which the function cannot be executed. The string of "ア ニ メ" is a character string containing plural continuous characters having the valid character type (katakana), so that it is the valid character string to which the S jump function can be executed.

In the state in which the character string is selected as described above, only the string of "ア ニ メ" that is the valid character string of the selected character string is highlighted by the display control unit in FIG. 3(d). Even when the pen is put onto "画", the character string "。動画" that is not valid is not highlighted.

When the user detaches the pen from the display screen at the position of "画" afterward, the S jump function is executed to the valid character string "ア ニ メ".

In the case of FIG. 3(c), the function that has already been selected is automatically executed by applying the detachment of the pen after the selection of the valid character string by the user as a trigger, whereby the user's operation for selecting the character string can be made simple and easy-to-understand.

In the case of FIG. 3(d), even when the user selects the character string containing the character to which the S jump function cannot be executed, only the string containing the characters (valid character string) to which the function can be executed is highlighted, and the S jump function is executed to this string. Therefore, even when the user does not know the character type to which the S jump function can be executed, or the user erroneously selects the character, the selected function can automatically be executed, whereby a burden of the user for the character string selecting operation can be reduced.

<Description of User's Input Operation in the Present Invention>

Figure 4:
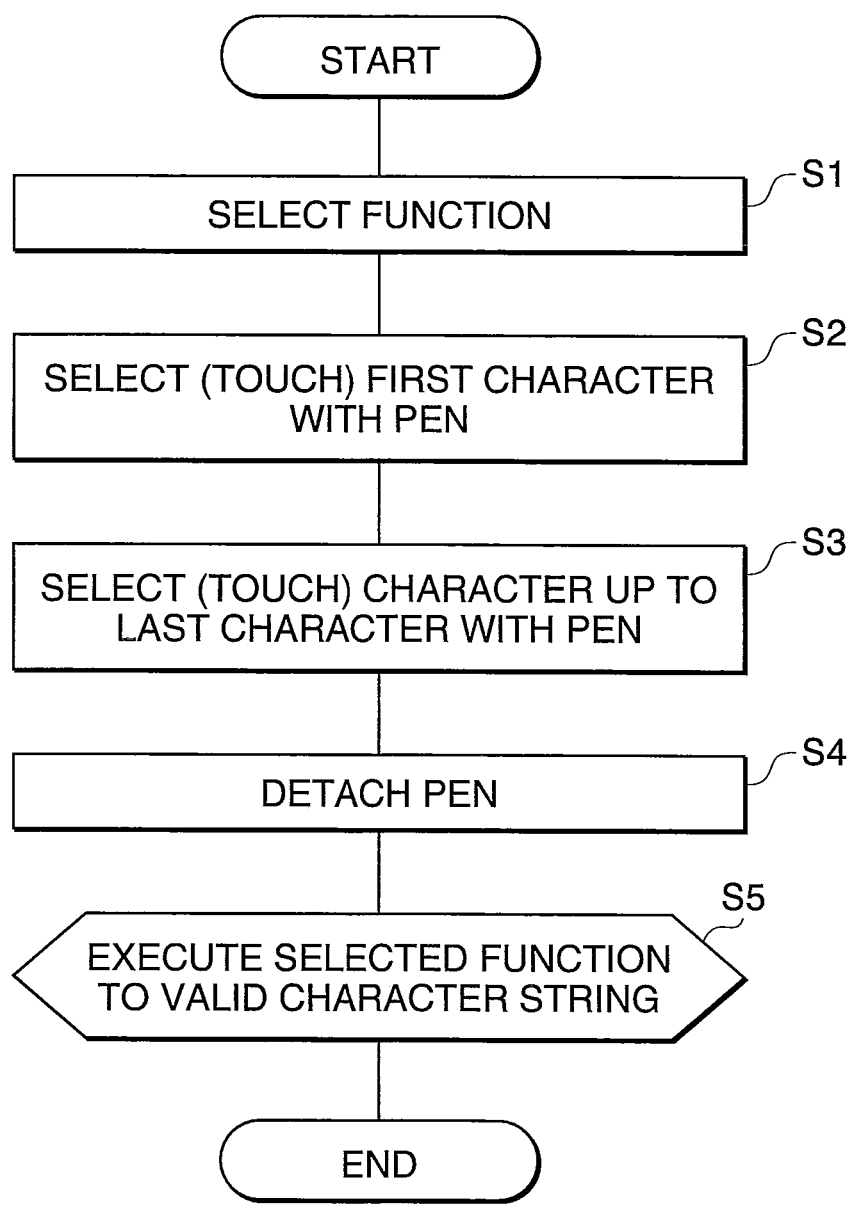
FIG. 4 is a flowchart illustrating a function selection operation and character string selecting operation by a user according to one embodiment of the present invention.

FIG. 4 illustrates a flowchart illustrating an outline of an input operation performed by the user in the information processing apparatus according to the present invention.

It is supposed that the content information 37 intended by the user is displayed onto the display unit 20.

In step S1, the user firstly performs an operation of selecting a function that he/she intends to execute. Here, the user depresses a dedicated key provided for each function. Alternatively, the user depresses a specific key to display a function selecting screen including names of items for many functions, and selects and inputs the item of the desired function among them by using the key or pen.

Here, the dedicated key or pen corresponds to the function selection unit 12. Thus, the function to be executed is determined, and the selected function is stored in the memory unit 30 as the selected function 36.

Next, in step S2, the user performs an operation of selecting the first character in the character string that is the subject to which the selected function is executed. For example, the user touches the desired character with the pen in the character string in the content information 37 displayed on the display screen. In this case, the pen corresponds to the character selection unit 11.

A positional coordinate touched by the pen is detected by a touch panel, and it is determined what the touched and inputted character is from the correspondence relationship between the detected positional coordinate and the display position of the displayed character.

The desired character touched and inputted is stored in the memory unit 30 as one character of the selected character string 33. The first character is determined by the operation in step S2. The character type of the determined first character is acquired as the acquired character type 35. It may be checked whether the selected first character is the valid character or not through the execution of this operation.

Whether the first character is the valid character or not is determined in such a manner that whether the character type of the first character is the character type to which the selected function can be executed or not by referring to the character type-function correspondence information 32. When it is the valid character, its first character is stored in the memory unit 30 as one character of the valid character string 34.

Next, in step S3, the user puts the pen onto the display screen, and with this state, the user performs an operation of tracing the character string, that the user intends to select, up to the last character. Specifically, the user performs an operation of selecting and inputting the character string, which the user intends to select, from the first character to the last character.

Instead of tracing the character string with the pen, the user temporarily detaches the pen to determine the first character, and then, he/she touches to input the last character with the pen, in order to designate the first and last characters of the selected character string, thereby specifying the character string containing the character strings between the first and the last characters as one selected character string. With this operation, the user selects the selected character string on his/her own will.

In this case, the whole character string from the first character to the last character is stored as one selected character string 33. When the selected character string includes the characters having the character type to which the selected function 36 can be executed, this selected character string also corresponds to the valid character string 34.

When the selection of the character string is ended, the user touches the last character with the pen, and then, he/she detaches the pen from the display screen in step S4. The detachment of the pen can be detected since there is no coordinate input due to the pressure contact of the touch panel.

The detachment of the pen from the display screen means the completion of the selection of the selected character string as described above. Specifically, when the detachment of the pen from the display screen is detected, the selected character string 33 and the valid character string 34 are determined.

The selected character string 33 thus selected may visually be distinguished in order to distinguish from the characters not selected. For example, the selected character string may be highlighted.

When the selected character string contains the character that is not the valid character as described later, it is preferable that the character that is not valid is excluded, and then, the valid character string decision unit 50 decides the valid character string, wherein the valid character string 34 is highlighted and the selected function is executed.

Alternatively, when the selected character string contains the character that is not the valid character, or when the pen is detached on the position of the character that is not the valid character or on the region where there is no displayed character, this case may be detected as an erroneous selection, so that the function may not be executed.

The operation from step S1 to step S4 described above is the operation performed by the user.

When the detachment of the pen is detected in step S4, the process of deciding the valid character string is automatically executed by the valid character string decision unit 50 without performing the user's operation afterward, and further, as indicated in step S5, the function execution unit 70 executes the selected function to the valid character string.

The description above is the outline of the input operation by the user, and the function selecting process, the first character selecting process, the character string selecting process, the valid character string deciding process, and the function executing process, those of which are executed as involved with the input operation. The CPU corresponding to the control unit executes the respective processes by operating the various hardware based upon the control program.

<Function Selecting Process>

Figure 5:
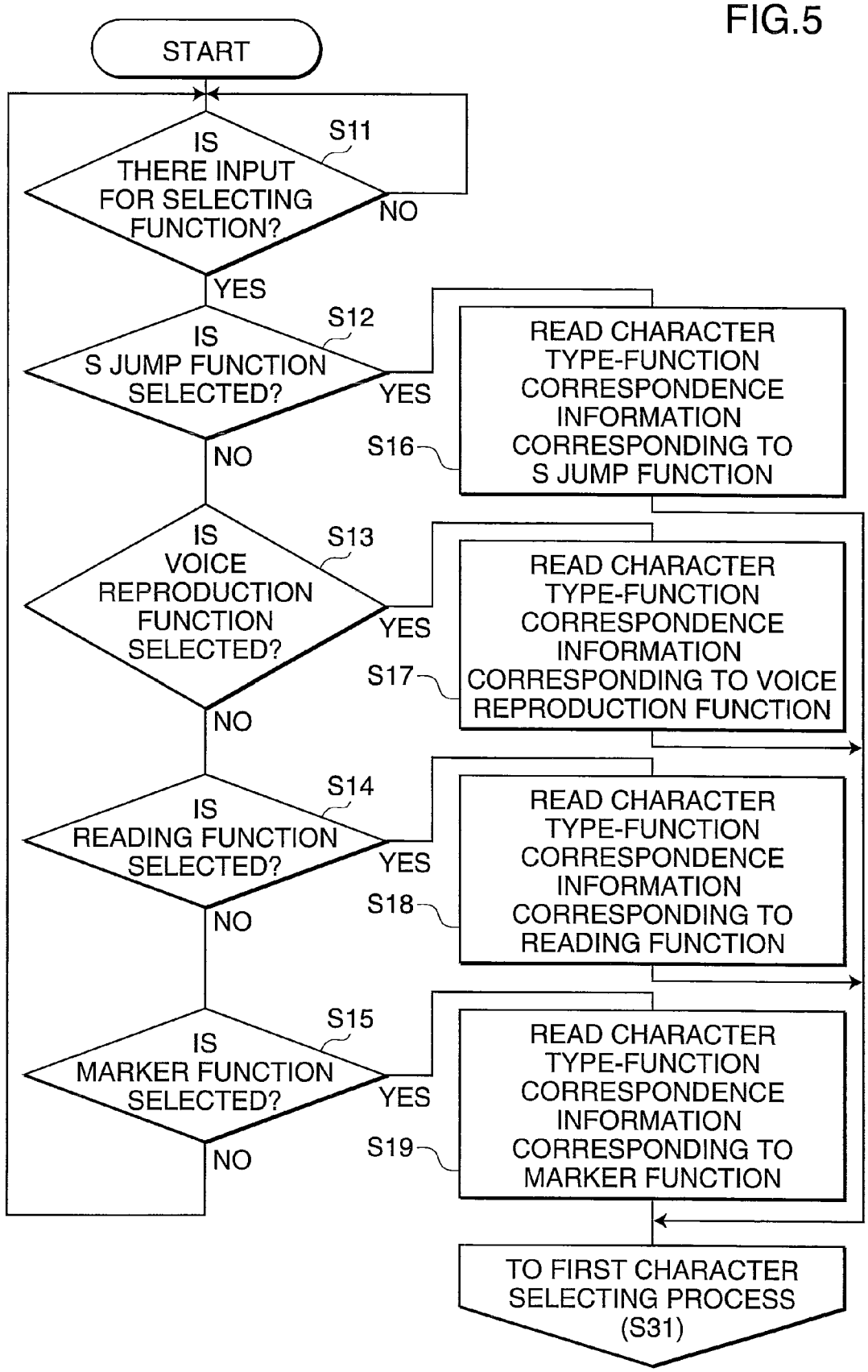
FIG. 5 is a flowchart illustrating a function selecting process according to one embodiment of the present invention.

FIG. 5 illustrates a flowchart of the function selecting process according to one embodiment of the present invention. Here, the above-mentioned four functions are also focused. This process is executed after the function selecting process in step S1.

In step S11, it is checked whether the input for selecting the function is made by the user or not. If there is no input, the process in step S11 is repeated.

On the other hand, when the input for the selection is made, the CPU proceeds to step S12, and checks which function is selected in S12 to S15.

It is checked in step S12 whether the selected and inputted function is the "S jump function" or not. If the selected function is the "S jump function", the CPU proceeds to step S16, and if otherwise, proceeds to step S13.

In step S16, the CPU reads the character type-function correspondence information 32 corresponding to the S jump function. Specifically, the CPU reads the character type (valid character type) to which the S jump function can be executed from the memory unit 30. Here, alphabetical character, kanji, hiragana, and katakana are read as the valid character type according to FIG. 2. In this case, the "S jump function" is stored in the memory unit 30 as the selected function 36.

After step S16, the function selecting process is ended, and the CPU proceeds to the next first character selecting process (step S31).

In step S13, it is checked whether the "voice reproduction function" is selected or not. If it is selected, the CPU proceeds to step S17, and if it is not selected, the CPU proceeds to step S14.

In step S17, the CPU reads the character type-function correspondence information 32 corresponding to the voice reproduction function, and stores the voice reproduction function as the selected function 36. Then, the CPU ends the function selecting process, and then, proceeds to step S31. When the voice reproduction function is selected, alphabetical character is read as the valid character type.

In step S14, it is checked whether the "reading function" is selected or not. If it is selected, the CPU proceeds to step S18, and if it is not selected, the CPU proceeds to step S15.

In step S18, the CPU reads the character type-function correspondence information 32 corresponding to the reading function, and stores the reading function as the selected function 36. Thereafter, the CPU ends the function selecting process, and then, proceeds to step S31.

In step S15, it is checked whether the "marker function" is selected or not. If it is selected, the CPU proceeds to step S19, and if it is not selected, the CPU returns to step S11.

In step S19, the CPU reads the character type-function correspondence information 32 corresponding to the marker function, and stores the marker function as the selected function 36. Thereafter, the CPU ends the function selecting process, and then, proceeds to step S31.

If there are other functions except for these four functions, the CPU may check whether the function is selected or not. If it is selected, the CPU may read the character type-function correspondence information 32 corresponding to this function.

<First Character Selecting Process>

Figure 6:
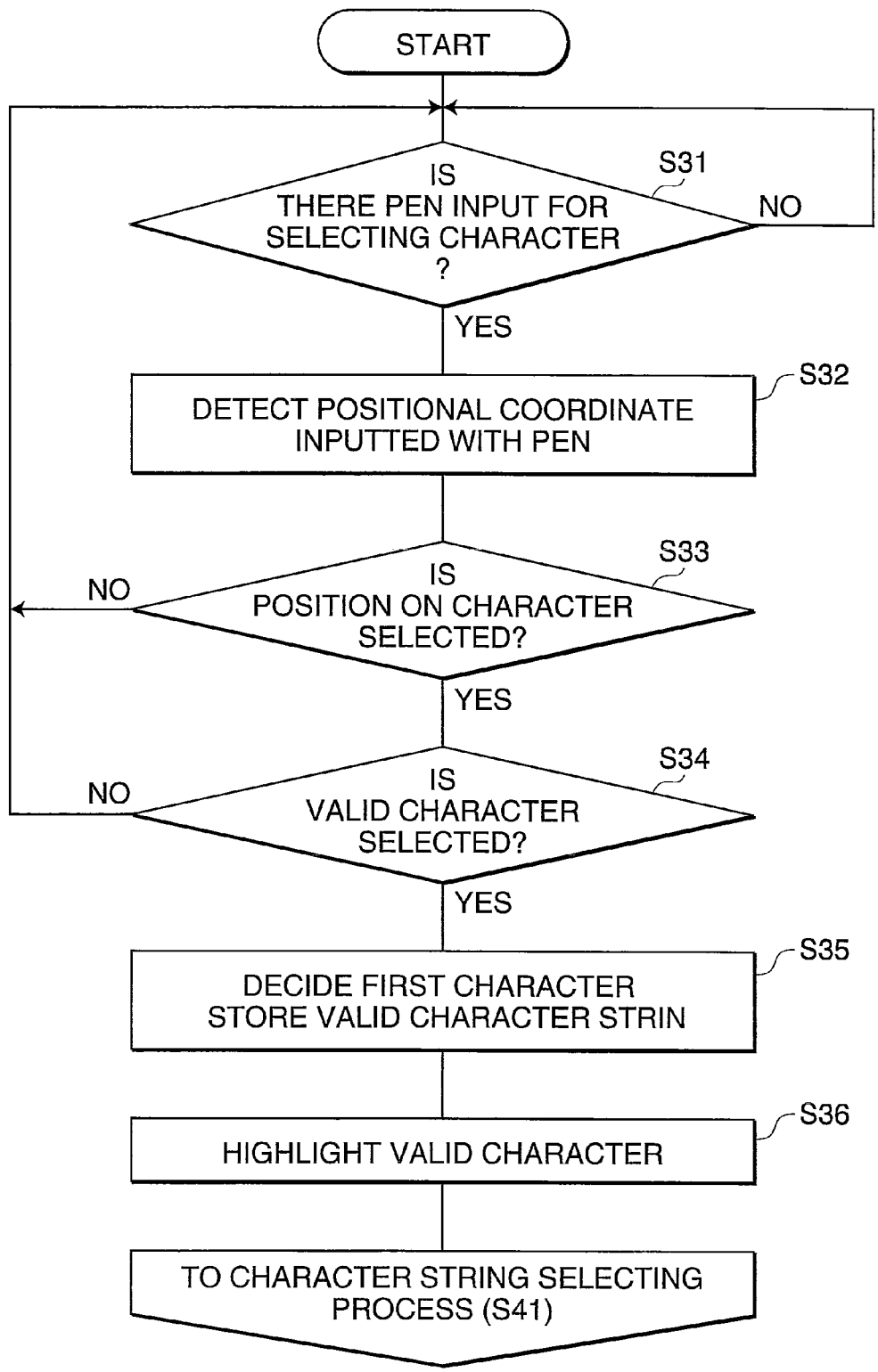
FIG. 6 is a flowchart illustrating a first character selecting process according to one embodiment of the present invention.

FIG. 6 illustrates a flowchart of the first character selecting process according to one embodiment of the present invention.

Here, it is supposed that the content information 37 intended by the user has already been displayed onto the display unit 20. The process in FIG. 6 is executed when the first character selecting operation in step S2 is performed.

In step S31, it is checked whether the user makes the touch-input for selecting the first character with the use of the pen or not. For example, it is checked whether the input of depressing an optional position on the touch panel is made or not. When the touch-input is made, the CPU proceeds to step S32, and when the touch-input is not made, the CPU repeats the process in step S31.

In step S32, the CPU detects the coordinate at the position where the touch-input is made by the pen.

In step S33, it is checked whether or not there is a character on the detected positional coordinate in the character string displayed on the display screen. Specifically, it is checked whether the user selects a character or not. When there is no character on the positional coordinate where the touch-input is made, the CPU returns to step S31.

On the other hand, when there is a character on the touch-inputted positional coordinate, the CPU proceeds to step S34. In this case, the CPU acquires the character type of the selected character, and stores the same as the acquired character type 35.

In step S34, the character identification unit 40 checks whether the character selected by the user is the valid character or not, i.e., whether the character selected by the user is the character having the character type to which the selected function can be executed or not. Whether it is the valid character or not is determined by referring to the read character type-function correspondence information 32 so as to determine whether the acquired character type 35 of the selected character is the character type set in the information 32 or not.

When the voice reproduction function is selected as the selected function 36, for example, the corresponding valid character type is "alphabetical character (alphabet)" with reference to the information 32. Therefore, if the acquired character type 35 of the selected first character is an alphabet, it is determined that the selected first character is the valid character.

When the selected function is the "S jump function", and the selected first character "ア" is katakana as illustrated in FIG. 3(b), the first character "ア" is determined to be the valid character, since the valid character type is "alphabetical character, kanji, hiragana, and katakana" according to the information 32. When it is not the valid character, the CPU returns to step S31, and when it is the valid character, it proceeds to step S35.

Since the first character is the valid character in step S35, the valid character string decision unit 50 decides the first character as one of the valid character string, and stores the first character as the valid character string 34.

In step S36, the display control unit 60 highlights the first character that is the valid character. It is to be noted that the display control unit 60 may display the selected first character so as to be easy to be visually understood. The display control unit 60 may display the selected first character in a form different from the form of the other character string. For example, it may change the display color, or it may display the selected character as flickering.

The CPU ends the first character selecting process in step S36, and then, proceeds to the character string selecting process in step S41.

<First Embodiment of Character String Selecting Process>

Figure 7:
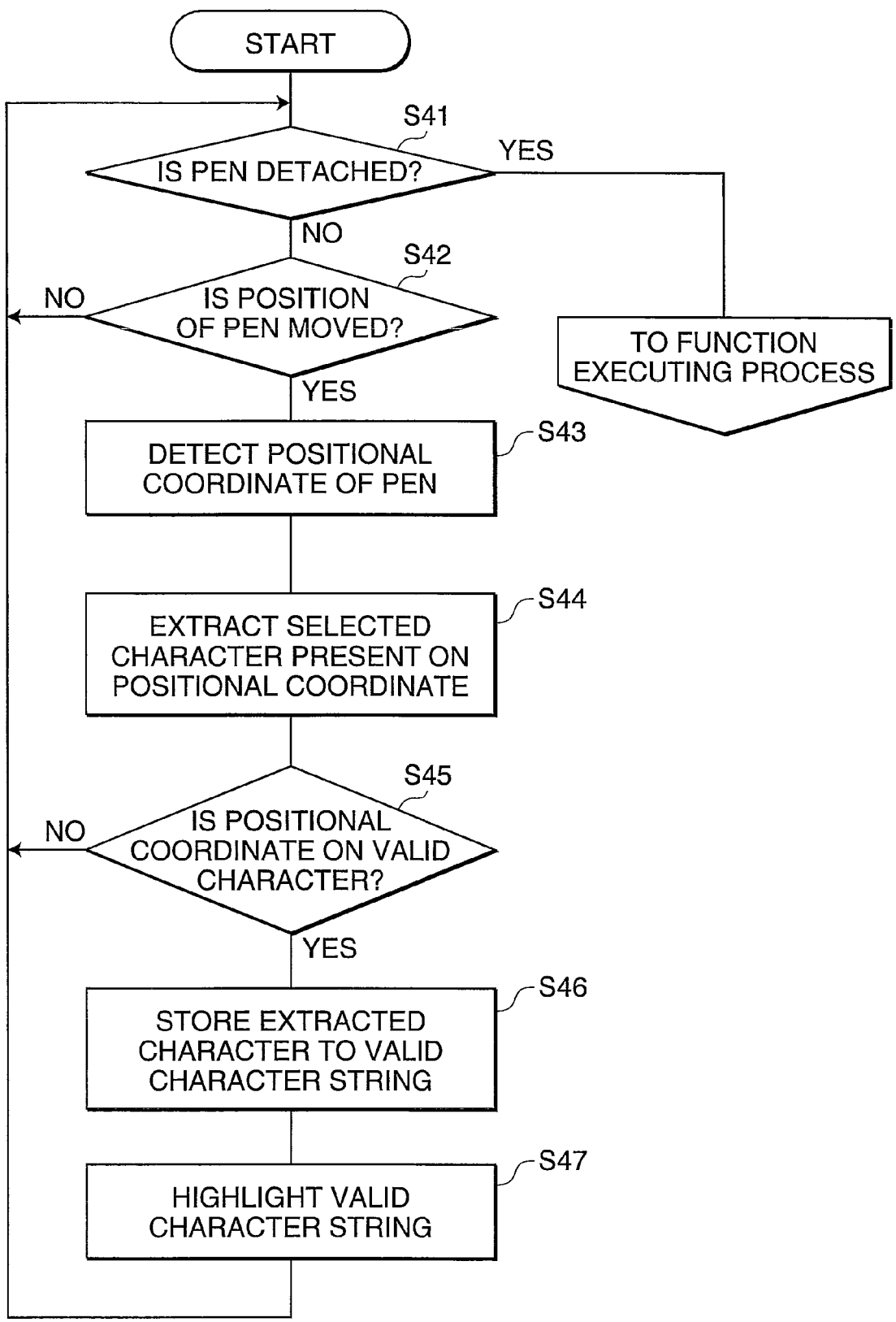
FIG. 7 is a flowchart illustrating a character string selecting process according to a first embodiment of the present invention.

FIG. 7 illustrates a flowchart of the character string selecting process according to one embodiment of the present invention.

Here, the process of deciding and displaying the valid character string when the user traces the display screen on the character string, which the user intends to select, up to the last character will mainly be described.

The process in FIG. 7 is executed when the character string selecting operation in step S3 is performed.

In step S41, it is checked whether the pen is detached from the display screen or not. Here, the detachment of the pen means the end of the input selection.

Figure 8:
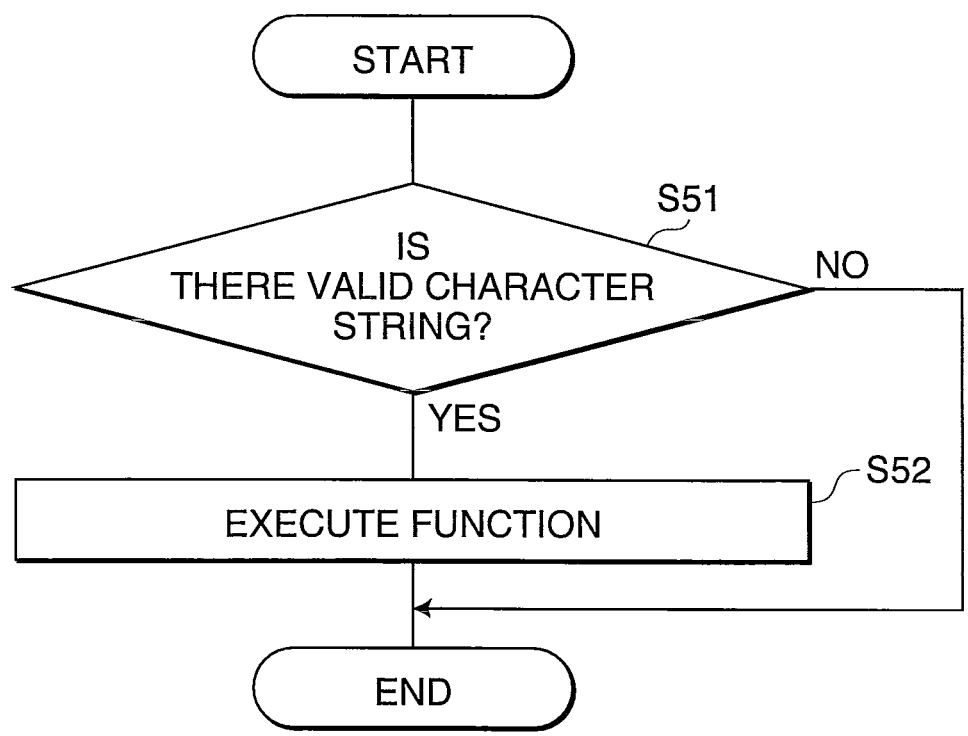
FIG. 8 is a flowchart illustrating a first function executing process according to the present invention.

When the pen is detached from the display screen, the selected character string and the valid character string are determined, and then, the CPU proceeds to the function executing process illustrated in FIG. 8. When the pen is still put on the display screen, the CPU proceeds to step S42.

In step S42, it is checked whether the pen is moved or not. When the pen is not moved, the CPU returns to step S41, and when the movement of the pen is detected, the CPU proceeds to step S43.

In step S43, the positional coordinate of the pen after the movement is detected.

In step S44, a character present on the detected positional coordinate is extracted.

In step S45, the character identification unit 40 checks whether the extracted character on the detected positional coordinate is the valid character or not by using the character type-function correspondence information 32. When it is the valid character, the CPU proceeds to step S46, and when it is not the valid character, the CPU returns to step S41. When there is no character on the detected positional coordinate, the CPU may return to step S41.

In step S46, the valid character string decision unit 50 decides the extracted character as a part of the valid character string, and stores the same in the valid character string 34. When the character has already been stored in the valid character string 34, the character is not overwritten, but added to the stored character for storage.

In step S47, the display control unit 60 highlights the valid character string 34 in order to visually distinguish the selected valid character string. Thereafter, the CPU returns to step S41.

For example, in the case of FIG. 3(c), the processes from step S41 to S47 in FIG. 7 are repeated, whereby the "アニメ" is decided as the valid character string by the valid character decision unit 50, stored in the memory unit 30, and highlighted by the display control unit 60.

When the user moves the pen to the period "。" at the right side of "メ" without detaching the pen from the state in FIG. 3(c), the detected positional coordinate is determined not to be on the valid character in step S45, since the period "。" is not the valid character type to which the S jump function can be executed. Then, the CPU returns to step S41.

<Function Executing Process>

FIG. 8 illustrates a flowchart of the first function executing process according to one embodiment of the present invention.

This process is executed in the process in FIG. 7 after the operation in step S4 in FIG. 4 is performed.

In step S51, it is checked whether the valid character string 34 is stored in the memory unit 30 or not. When the valid character string 34 is not stored, the CPU ends the process, since the character to which the selected function can be executed is not selected.

On the other hand, when the valid character string 34 is stored, the CPU proceeds to step S52 where the function execution unit 70 executes the selected function to the valid character string 34.

The process in FIG. 8 is the process after the pen is detached. However, this process is executed when the pen is detached regardless of the position where the pen is detached. Specifically, the process in FIG. 8 is executed even when the position where the pen is detached is on the displayed character, or on the region where there is no displayed character.

Figure 9:
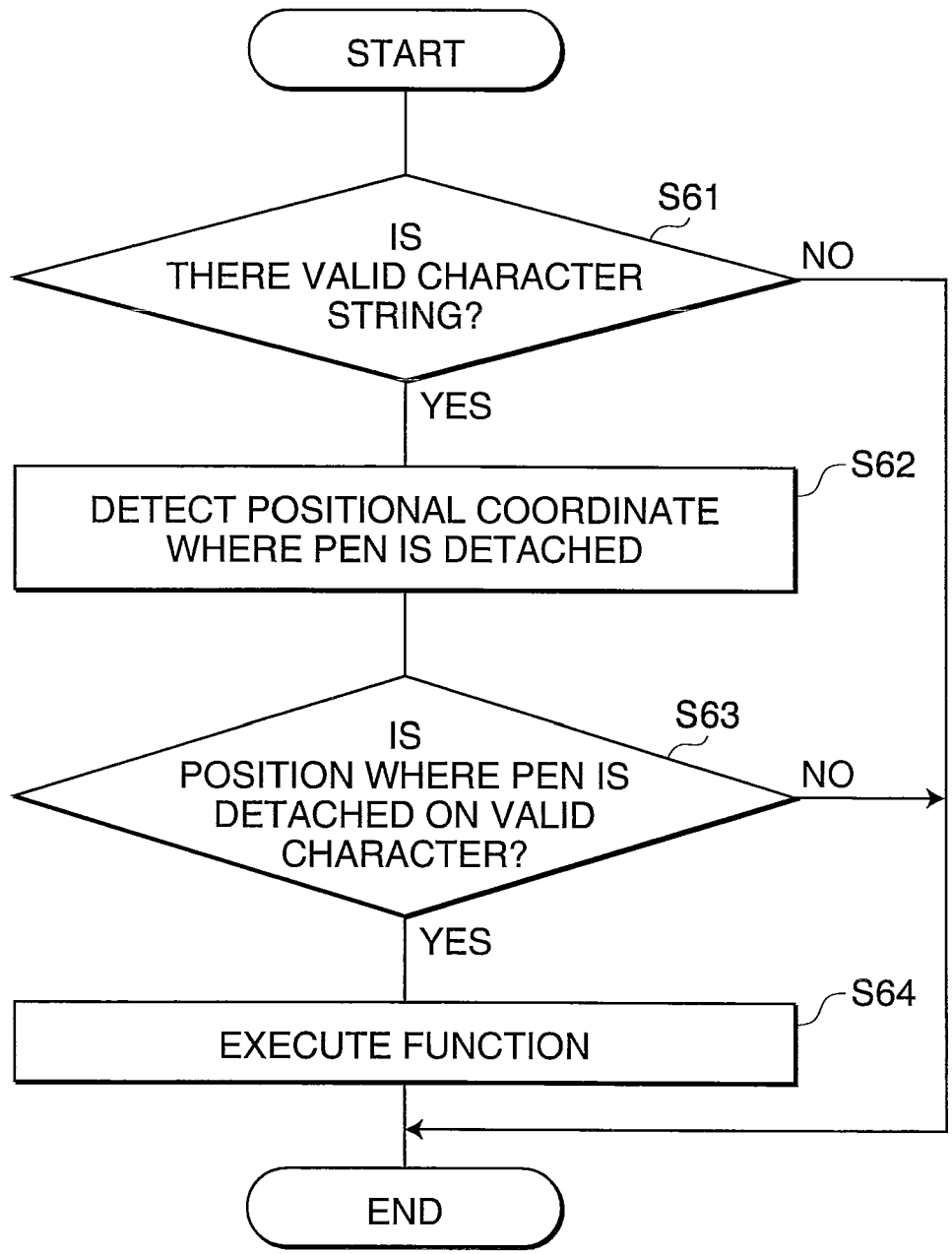
FIG. 9 is a flowchart illustrating a second function executing process according to the present invention.

FIG. 9 illustrates a flowchart of the second function executing process according to the present invention.

Here, different from the process in FIG. 8, the selected function is executed when the position where the pen is detached is on the valid character string. The process in FIG. 9 is also executed after the operation in step S4.

In step S61, it is checked whether the valid character string 34 is stored in the memory unit 30 or not. When the valid character string is not stored, the CPU ends the process, and when it is stored, the CPU proceeds to step S62.

In step S62, the coordinate of the position where the pen is detached is detected.

In step S63, it is checked whether the position where the pen is detached is on the valid character or not.

FIG. 12 is an explanatory view of the position where the pen is detached according to one embodiment.

When the position where the pen is detached is on the valid character "アニメ" as illustrated in FIG. 12(a), the CPU proceeds to step S64 where the function execution unit 70 executes the selected function to the valid character string 34.

On the other hand, when the position where the pen is detached is not on the valid character, e.g., when the position where the pen is detached is on the character totally different from the selected character string "アニメ" as illustrated in FIG. 12(b) or on the region where there is no displayed character as illustrated in FIG. 12(c), the CPU ends the process without executing the function.

It is to be noted that the user may set beforehand such that the selected function is executed even when the position where the pen is detached is not on the valid character string as illustrated in FIG. 12(b) or 12(c).

<Second Embodiment of Character String Selecting Process>

Figure 10:
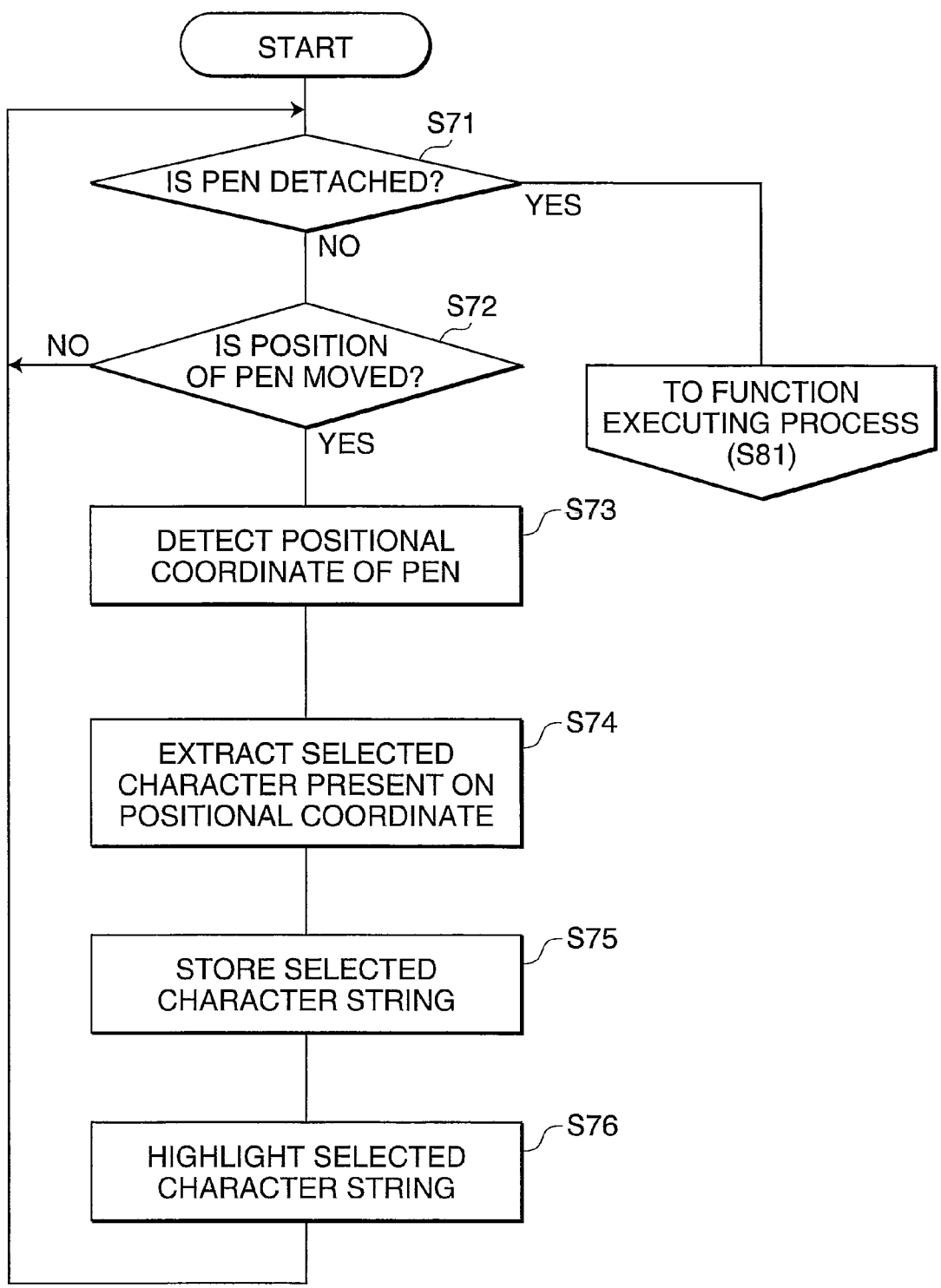
FIG. 10 is a flowchart illustrating a character string selecting process according to a second embodiment of the present invention.

FIG. 10 illustrates a flowchart of the character string selecting process according the second embodiment.

In this process, different from the process in FIG. 7, the character string selected by the user is stored as the selected character string 33, and in the state in which the character string is selected, all selected character strings are displayed as being highlighted.

FIG. 13 is an explanatory view describing the operation and the display screen in the second embodiment.

The processes from steps S71 to S74 in FIG. 10 are the same as the processes from steps S41 to S44 in FIG. 7. In step S71, it is checked whether the pen is detached or not.

Figure 11:
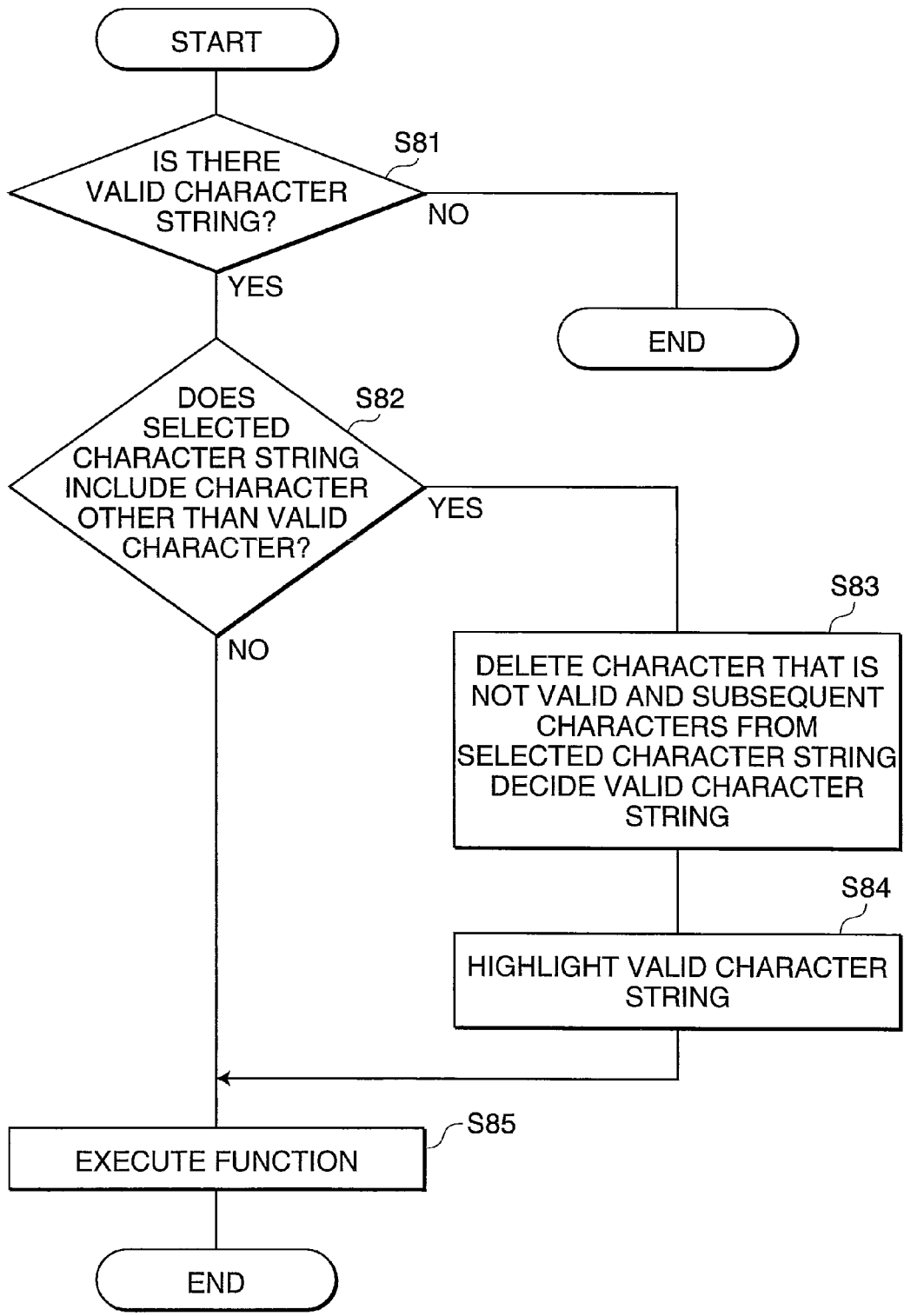
FIG. 11 is a flowchart illustrating a function executing process executed after the process in FIG. 10 according to the present invention.

When the detachment of the pen is detected, the CPU proceeds to step S81 (function executing process) in FIG. 11.

On the other hand, when the pen has not yet been detached, the CPU proceeds to step S72.

In step S72, it is checked whether the position of the pen is moved or not. When the pen does not move, the CPU returns to step S71, and when the pen moves, the CPU proceeds to step S73.

In step S73, the positional coordinate of the pen after the movement is detected.

In step S74, a character present on the detected positional coordinate is extracted.

In step S75, the extracted character is stored in the selected character string 33.

When the selected character string 33 has already been stored, the extracted character is stored as being added to the character that has already been stored. In the present embodiment, the valid character string 34 is decided later, so that the character same as the selected character string 33 is temporarily stored as the valid character string 34.

In step S76, the display control unit 60 highlights the selected character string 33, and then, returns to step S71.

When the "アニメ。動画" is selected by the pen as illustrated in FIG. 13(a), the "アニメ。動画" that is the whole selected character string is stored as the selected character string 33, and highlighted. In this case, even when the character (period "。") to which the selected "S jump function" cannot be executed is contained, the character string including the character "。" is highlighted, so long as the pen is not detached, since the character string is now being selected.

Specifically, in the state in which the character string is selected with the pen in the process in FIG. 10, the character string selected by the user is all highlighted.

FIG. 11 illustrates a flowchart of the function executing process that is executed after the pen is detached in FIG. 10. In this process, the valid character string to which the selected function can be executed is determined in the highlighted selected character strings, after the pen is detached, and then, the function is executed to the valid character string 34. Further, the character to be highlighted is changed to the valid character string.

In step S81, it is checked whether the valid character string 34 is stored in the memory unit 30 or not as in step S61 in FIG. 9. When it is not stored, the CPU ends the process, and when it is stored, the CPU proceeds to step S82.

In step S82, it is checked by the character identification unit 40 whether the character other than the valid character is included in the stored selected character string 33 or not. Specifically, it is checked by using the information 32 whether the character having the character type to which the selected function 36 cannot be executed is included in the selected character string 33 or not.

When it is not included, the selected character string 33 is the same as the valid character string 34. Therefore, the valid character string decision unit 50 decides the selected character string 33 as the valid character string 34 without any change. Then, the CPU proceeds to step S85 where the function execution unit 70 executes the selected function to the valid character string 34.

When the pen is detached at the position illustrated in FIGS. 3(*c*), 12(*a*) and 12(*b*), for example, the CPU proceeds to step S85 after step S82 so as to execute the selected function.

On the other hand, when the character that is not valid is included in the selected character string 33, the CPU proceeds to step S83. In this case, the selected character string 33 stored in the memory unit 30 and the valid character string 34 are different from each other.

In step S83, the characters, including the invalid characters, after the character that is not valid are deleted from the selected character string 33. Specifically, the valid character string decision unit 50 decides the character string, from which the characters after the character that is not valid are deleted from the selected character string 33, as the valid character string 34.

In step S84, the display control unit 60 highlights only the portion of the valid character string 34. Thereafter, the function execution unit 70 executes the selected function to the valid character string 34 in step S85.

When the pen is moved to select the "ア ニ メ。動画" in FIG. 13(*a*), for example, the "ア ニ メ。動画" is stored as the selected character string 33, and is highlighted. It is supposed that, with this state, the pen is detached from the display screen at the optional position as illustrated in FIG. 13(*b*). Here, the position where the pen is detached may be at the position of the displayed selected character string, or may be on the region where there is no displayed character. In this case, the selected character string includes the period "。" that is not the valid character, so that the valid character string 34 is the string of "ア ニ メ".

When the pen is detached with the state in FIG. 13(*b*), the character "。" that is not valid is included in the selected character string 33. Therefore, from the determination in step S82 in FIG. 11, the CPU proceeds to steps S83 and S84, so that the display state becomes the one illustrated in FIG. 13(*c*).

Specifically, the portion of "。動画" is excluded from the selected character string 33, and is not highlighted. On the other hand, only the valid character string "ア ニ メ" is highlighted. Thereafter, the function is executed to the valid character string "ア ニ メ".

In the second embodiment, even when the selected character string selected by the user includes characters to which the selected function cannot be executed, only the character string (valid character string) to which the function can be executed is highlighted, and the function is executed to this character string. Therefore, even when the user erroneously selects the character string containing the character to which the function cannot be executed, or even when the user unconsciously selects a character to which the function cannot be executed, the valid character string is automatically determined. Accordingly, the function intended by the user can be executed to the valid character string, which provides a simple and easy-to-understand operation, whereby the operation burden of the user can be reduced.

When the position where the pen is detached is not on the selected character string, i.e., the position where the pen is detached is on the region where characters are not displayed, as illustrated in FIG. 13(*b*), only the valid character string is highlighted, and the function is executed to the valid character string, which can reduce the operation burden of the user.

There may be the case in which the user erroneously detaches the pen from the display screen unconsciously. Therefore, the function may be executed when the user detaches the pen at the position of the selected character string as illustrated in FIG. 13(*a*), when the user detaches the pen on the other displayed character string as illustrated in FIG. 12(*b*), or when the user detaches the pen on the valid character string as illustrated in FIG. 12(*a*). In the case of FIG. 12(*c*) or FIG. 13(*b*), an alarm display indicating the erroneous detachment of the pen may be issued without executing the function.

According to the present invention, the function is selected, and then, it is determined whether the selected character string includes the character having the character type to which the selected function can be executed or not so as to decide the valid character string that is the subject to which the function is executed. Therefore, the present invention facilitates the user's operation of selecting the character string. Even when the user erroneously selects the character string including the character having the invalid character type, the function intended by the user can be executed to the valid character string, whereby the burden of the operation on the user for selecting the character string can be reduced.

Information processing apparatus in which character string is selected first

An information processing apparatus will be described below, the apparatus having a character string selecting function in which a desired character string is selected first, and a function that can be executed to the selected character string is automatically selected, in order to be capable of enhancing operability for executing the function desired by the user.

This invention provides an information processing apparatus including: a character string display unit that displays content information including a character string; a memory unit that stores a character type-function correspondence information in which executable functions and a character type of a character that is a subject to which the corresponding function is executed are associated with each other; a character selection unit that selects a desired character string from the content information displayed on the character string display unit; a character type acquiring unit that acquires a character type of a first character in the selected character string; a function acquiring unit that acquires the executable function associated with the acquired character type from the character type-function correspondence information after the character string is selected by the character selection unit; a valid character string decision unit that decides, for each of the acquired executable functions, a valid character string to which the function is executed from the selected character string selected by the character selection unit; and a function selecting unit that selects the function to be executed from the acquired executable functions.

With this apparatus, after the selected character string is selected, the executable function is acquired, and then, the valid character string to which the function is executed is determined. Therefore, this invention provides a simple and easy-to-understand operation, can reduce an erroneous operation, and can enhance operability of a user.

The information processing apparatus may further include a function selecting screen display unit that displays items of the executable functions acquired by the function acquiring unit, wherein the character string display unit and the function selecting screen display unit may be displayed on different screens in one display device, or may be displayed on the respective screens of different display devices. With this configuration, the user can easily confirm the executable functions.

The function selection unit selects the desired executable functions from the items displayed on the function selecting screen display unit.

Further, the character string selected by the character selection unit may be displayed on the character string display unit in a display form different from that of a character string that is not selected.

When the acquired character type is a space, the character type acquiring unit may acquire the character type of the character, which appears first and which is not a space, from the character string selected by the character selection unit. With this configuration, even when the user selects a character string including a space at its head through the user's erroneous operation, the function intended by the user can be executed.

The information processing apparatus further includes a function execution unit that executes the function, which is selected by the function selection unit and which is to be executed, to the valid character string, which is determined by the valid character string decision unit, for the function that is to be executed.

The executable functions stored in the memory unit include, for example, a voice reproduction function, an S jump function, a reading function, and a marker function.

The character types stored in the memory unit include an alphabet, and Japanese character, wherein one or plural character types of characters to which the function is executed are set beforehand.

The valid character string decided by the valid character string decision unit is one or plural character strings included in the selected character string.

When the decided valid character string is one, the valid character string may be specified as the character string including the first character.

When the decided valid character string is plural, the information processing apparatus may further include a valid character string selecting screen display unit that displays items of the plural valid character strings so as to be selectable, wherein the valid character string selecting screen display unit may be displayed on a screen different from another display screen in one display device.

The present invention provides a program of an information processing apparatus, the program allowing a computer to execute as: a character string display unit that displays content information including a character string; a memory unit that stores a character type-function correspondence information in which executable functions and a character type of a character that is a subject to which the corresponding function is executed are associated with each other; a character selection unit that selects a desired character string from the content information displayed on the character string display unit; a character type acquiring unit that acquires a character type of a first character in the selected character string; a function acquiring unit that acquires an executable function associated with the acquired character type from the character type-function correspondence information, after the character string is selected by the character selection unit; a valid character string decision unit that decides a valid character string, to which the function is executed, from the selected character string selected by the character selection unit, for each of the acquired executable functions; and a function selection unit that selects the executable function from the acquired executable functions.

The present invention also provides a selecting method of a character string and a function for an information processing apparatus including a character string display unit that displays content information including a character string; a memory unit that stores a character type-function correspondence information in which executable functions and a character type of a character that is a subject to which the corresponding function is executed are associated with each other; a character selection unit; a character acquiring unit; a function acquiring unit; a valid character string decision unit; and a function execution unit, wherein the character selection unit selects a desired character string in the content information displayed on the character string display unit, the character type acquiring unit acquires a character type of a first character of the selected character string, the function acquiring unit acquires an executable function associated with the acquired character type from the character type-function correspondence information, after the character string selection unit selects a character string, the valid character string decision unit decides a valid character string, to which the function is executed, from the selected character strings selected, for each of the acquired executable functions, and the function selection unit selects the executable function from the acquired executable functions.

An embodiment of the present invention will be described with reference to the drawings. It is to be noted that the present invention is not limited to the description of the embodiments below.

<Structure of Information Processing Apparatus According to the Present Invention>

Figure 14:
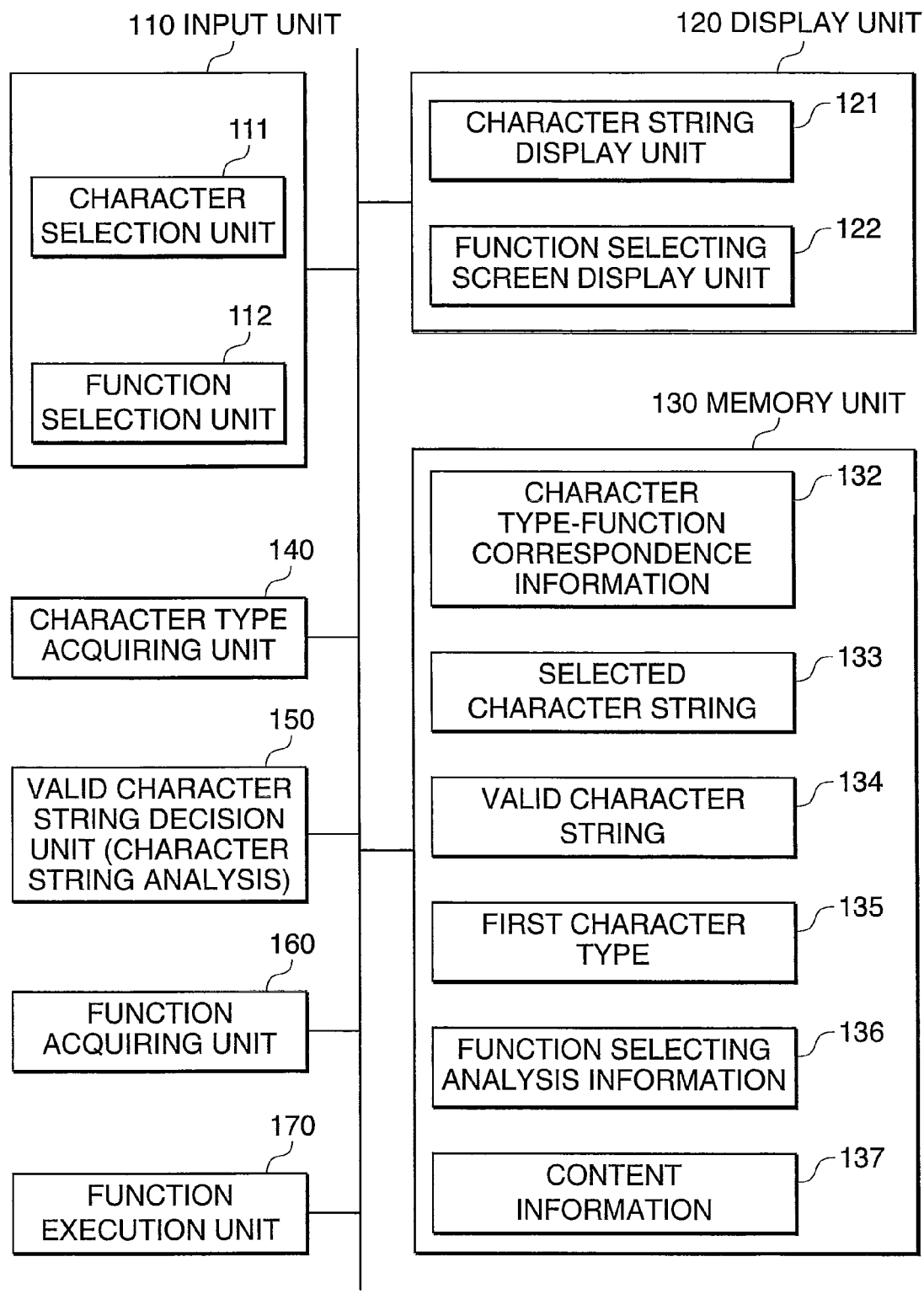
FIG. 14 is a structural block diagram illustrating an information processing apparatus according to one embodiment of the present invention.

FIG. 14 is a block diagram illustrating a structure of an information processing apparatus according to one embodiment of the present invention.

In FIG. 14, the information processing apparatus according to the present invention includes an input unit 110, a display unit 120, a memory unit 130, a character type acquiring unit 140, a valid character string decision unit 150, a function acquiring unit 160, and a function execution unit 170.

Here, the information processing apparatus is realized by a microcomputer including a CPU, a ROM, a RAM, an I/O controller, and a timer, wherein the function of each function block is executed by the CPU that allows various hardware to be operated based upon a control program stored in the ROM. The CPU corresponds to an unillustrated control unit that operates each of the function blocks in FIG. 14, and allows the respective function blocks to execute a process in a flowchart illustrated in FIG. 17.

The information processing apparatus is incorporated into an electronic apparatus such as an electronic dictionary, a PDA, a cellular phone, or a notebook-type personal computer for use.

The input unit 110 is a section for inputting characters, graphics, and symbols, and for selecting a function, wherein a keyboard or a pointing device such as a mouse or a pen is used.

From the viewpoint of an input function, the input unit 110 in the present invention includes a character selection unit 111 for selecting desired character strings from displayed content information, and a function selection unit 112 for selecting a function, which is to be executed, among executable functions acquired by the function acquiring unit 160.

The functions of both the character selection unit 111 and the function selection unit 112 are executed with the use of the keyboard or pen. For example, the character selection unit 111 is a function block that selects a portion of "abc" in the character strings displayed on a display screen 101 in FIG. 16(*a*) with the use of the pen. The selected character string "abc" is stored in the memory unit 130 as a selected character string 133.

The function selection unit 112 is a section for selecting an item (S jump function, etc.) of the desired function that should be executed from the function items displayed on a "function selecting screen 102" illustrated in FIG. 16(*b*) with the use of a pen.

The display unit 120 is a section for displaying character strings, graphics, and symbols, and it may include a single display screen or plural display screens.

The display unit 120 is provided with a touch panel overlaid on the display screen, wherein information displayed on the position of the display screen where the pen is touched is inputted.

From the viewpoint of the display function, the display unit 120 of the present invention includes a character string display unit 121 for displaying content information containing a character string, and a function selecting screen display unit 122 for displaying items of the executable functions.

For example, a numeral 101 in FIG. 16(*a*) corresponds to the character string display unit 121, and a numeral 102 in FIG. 16(*b*) corresponds to the function selecting screen display unit 122. The function selecting screen 102 is not always displayed on the screen, but it is preferable that the function selecting screen is automatically displayed after the desired character string is selected from the content information displayed on the character string display unit, from the viewpoint of enhancing operability of a user.

As for the items of the functions displayed on the function selecting screen 102, a great number of items are not always displayed, but it is preferable that the executable function items are selectably displayed as being associated with the type (character type) of the selected character string.

The items displayed on the function selecting screen display unit 122 are the items of the "executable functions" acquired by the function acquiring unit 160, and the name of the function that is set beforehand may be used as the displayed content.

The content information displayed on the character string display unit 121 includes various information pieces such as symbols, graphics, and photographs, in addition to the character strings. In the present invention, information including the character strings is mainly displayed.

Two display units (121, 122) may be displayed on the same screen of one display device such as LCD or CRT, but they may be displayed on different screens (windows) in the display device in order to clearly identify two display units for easy understanding for the user. Alternatively, when the information processing apparatus according to the present invention has two different display devices, the character string display unit 121 and the function selecting screen display unit 122 may independently be displayed on the respective screens of the respective display devices.

It is preferable that the selected character string selected by the character selection unit is displayed in a display form different from that of a character string that is not selected, in order that the user can easily recognize visually. For example, the selected character string may be highlighted.

As described later, when plural valid character strings are decided by the valid character string decision unit, a valid character string selecting screen display unit on which the items of the plural valid character strings are selectably displayed is provided.

This display unit is, for example, a screen denoted by 103 illustrated in FIG. 25(*d*), wherein it is displayed on a screen (window) different from the other display screens (101, 102) in one display device.

The character type acquiring unit 140 is a section for acquiring a type (character type) of a character of the character string selected by the character selection unit 112. The character type means an alphabet (alphabetical character), Japanese character (kanji, hiragana, katakana), and symbol, and character of other languages, for example.

When "abc" is selected on the display screen illustrated in FIG. 16(*a*), a value of a character code of the character is identified so as to determine that the character type of the selected character string is alphabet. The information of the acquired character type is used to acquire the executable function.

There may be the case in which the selected character string includes plural character types. In the present invention, the character type of the first character in the selected character string is acquired, in principle.

When "def あいうえお" is selected in FIG. 16(*a*), the "alphabet" that is the character type of the first character "d" is acquired as a first character type 135.

When "あいうえお gh" is selected, the "hiragana" that is the character type of the first character "あ" is acquired.

The valid character string decision unit 150 is a section for analyzing the selected character string selected by the character selection unit 111, and for deciding the valid character string that is the subject to which the executable function acquired by the function acquiring unit as a selection candidate is executed. Here, the valid character string to which the function is executed is decided for each of the acquired executable functions.

When the selected character string is "abc", for example, the character type is determined to be only alphabet, so that the valid character string to which a specific function is executed is determined to be "abc".

When the selected character string is "def あいう", it is necessary to decide which one should be acquired as the valid character string, since this character string includes two character types, which are the alphabet and hiragana. In this case, it is necessary to determine that only the "def" is specified as the valid character string, that only the "あい う" is specified as the valid character string, that two strings of "def" and ""あいう" are specified as the valid character string, or that the whole "def あいう" is specified as the valid character string. This is because the executable function is different depending upon the decided valid character string.

The valid character string decided by the valid character string decision unit is one or plural character strings included in the selected character string.

When the decided valid character string is one, the character string including the first character may be specified as the valid character string.

When the selected character string is "def あいうえお" starting with an alphabet, for example, four functions, which are the voice reproduction function, S jump function, reading function, and marker function, can be executed. If the "voice reproduction function" is the function executed only to an alphabet, the valid character string to which the function can be executed is determined to be "def". In this case, "あいうえお" in the selected character string is excluded from the valid character string.

The valid character string to which the "marker function" can be executed is determined to be the whole "def あいうえお".

The functions that can be executed in an electronic dictionary are not limited to the above-mentioned four functions, but many functions can be executed. It is to be noted that, in the embodiments described below according to the present invention, the above-mentioned four functions are focused for description.

The function acquiring unit 160 is a section for acquiring the executable function associated with the character type based upon the character type acquired by the character type acquiring unit 140.

When the "alphabet" is acquired as the character type, for example, four functions that are the "voice reproduction", the "S jump", the "reading", and the "marker" are acquired as the executable functions.

When "hiragana" is acquired as the character type, two functions that are the "S jump" and the "marker" are acquired as the executable functions, and the "voice reproduction" function and the "reading" function are not acquired, so that they are not executed.

The function is acquired by referring to character type-function correspondence information 132 illustrated in FIG. 15, for example. The function acquiring process is executed after the character selection unit selects a character string.

FIG. 15 is an explanatory view of the character type-function correspondence information 132 indicating the valid character types for four functions according to one embodiment. The character type-function correspondence information is the one in which executable functions and the character type of the character, which is the subject to which the respective functions are executed, are associated with each other.

In FIG. 15, when the character type of the portion selected as the valid character string is "alphabetical character (alphabet)", for example, it is found that the voice reproduction function, the S jump function, the reading function, and the marker function are the executable functions.

When the valid character string is "katakana", two functions, which are the S jump function and the marker function, are the executable functions.

In the present invention, the "voice reproduction function" is a function for outputting a voice reading a single English word that is a character string, including only selected alphabets (alphabetical characters).

The "S jump function" is a function in which a single word containing only selected alphabetical characters or selected Japanese character string (e.g., a character string containing kanji, hiragana, or katakana) is specified as a direction word, and information corresponding to the direction word is searched from an installed Japanese dictionary.

The selected character string is not limited to the Japanese character. The other languages can be selected, so long as they are character strings displayed. In this case, content information corresponding to the language can be searched.

The "reading function" is a function for outputting a synthesized voice reading the selected sentence including plural English words.

The "marker function" is a function for displaying a background of all selected characters or symbols as painting with a color different from a display color for the character.

When a dictionary for a language (e.g., Chinese) other than English is installed in an electronic dictionary, a function that can be executed to not only English words or English sentences but also words or sentences of the other languages is determined beforehand, and a specific function is executed corresponding to the selected character string.

In the embodiments described below, an alphabetical character and Japanese character are focused.

One or plural functions are acquired by the function selection unit 160. For example, when the acquired function is one, the function that can be executed to the selected character string is determined to this function. Therefore, when a decision key is depressed afterward, this function can immediately be executed.

On the other hand, when plural functions can be executed, the function selecting screen 102 including the names of the items of the plural functions is automatically displayed onto the display unit 120 immediately after the user selects the character string (see FIG. 16(b)).

The user seeing the function selecting screen 102 finds which is the executable function to the character string that he/she selects.

Thereafter, the user touch-inputs the display portion of the function, from the displayed plural functions, which he/she intends to execute with a pen, the touched function is executed.

When there is a function that cannot be executed to the selected character string, the item of this function is not displayed onto the function display screen 102, or the display (painted display or display in a light color) by which the user finds that the function cannot be selected as illustrated in FIG. 16(c) may be made.

The function execution unit 170 is a section that executes the function selected by a user.

Specifically, it is a section that allows the function, which is selected by the function selection unit and which should be executed, to be executed to the valid character string, which is decided by the character string decision unit, for the function that should be executed.

When the "S jump" is selected and inputted by the user on the selecting screen 102 illustrated in FIG. 16(b), the S jump function is executed to the valid character string of the selected character string to which the S jump function can be executed. When the valid character string is "abc", a dictionary search is performed with "abc" being used as a direction word, and the information stored as being associated with the "abc" is displayed.

The memory unit 130 is a section for storing various information pieces, wherein a RAM, a ROM, a semiconductor memory such as a flash memory, a memory device such as a hard disk, or a memory medium such as a CD-R can be used for the memory unit 130.

The memory unit 130 stores, for example, the character type-function correspondence information 132, a selected character string 133, a valid character string 134, a first character type 135, function selecting analysis information 136, and content information 137.

Figure 23:
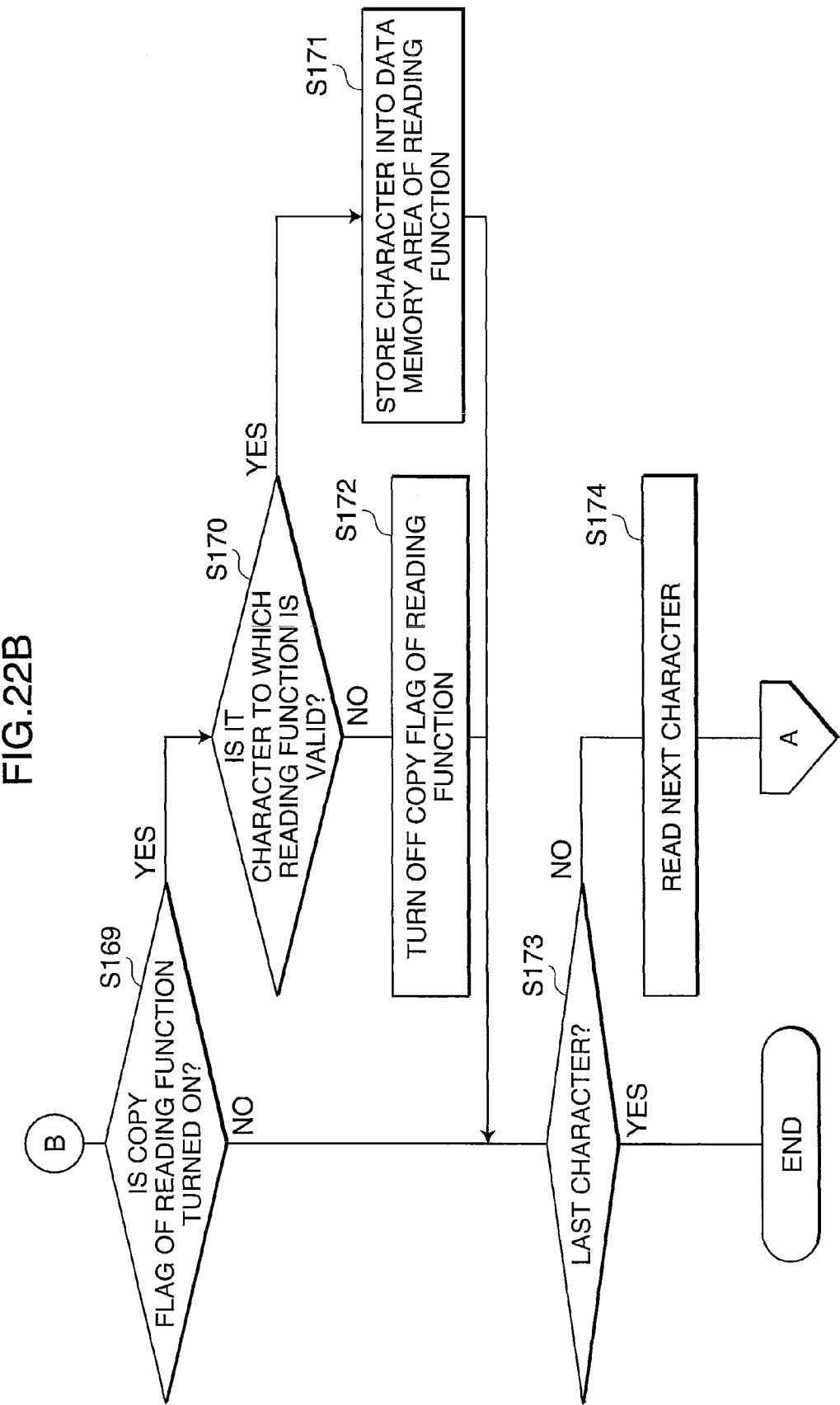
FIG. 23 is an explanatory view illustrating function selecting analysis information according to the embodiment 1 of the present invention.

The function selecting analysis information 136 is information illustrated in FIG. 23, for example, and utilized for acquiring an executable function to the selected character string and decide the valid character string. The content information 137 means information included in Japanese dictionary or English-Japanese dictionary.

The memory unit 130 also stores a control program that allows a computer to function in order to realize the respective blocks in the information processing apparatus. The control program is provided as being stored in various memory devices or memory mediums, or provided as being downloaded through network.

<Description of Outline of Character String and Function Selecting Process>

FIG. 16 illustrates a schematic explanatory view of the selection of the character string and the selection of the function according to one embodiment of the present invention.

FIG. 16(a) illustrates the state in which a character string "abc def あいうえお" of certain content information 137 is displayed onto the display screen 101 of the display unit 120.

The user makes an operation of tracing (character string selecting operation) on the display screen 101 with a pen with this state so as to select a character. The selected character is highlighted in order to be distinguished from the other non-selected characters.

FIGS. 16(b) and FIG. 16(c) illustrate the examples in which the selected character string is displayed as being distinguished from the others through the character string selecting operation described above.

FIG. 16(b) illustrates the case in which "abc def あいうえお" is selected, while FIG. 16(c) illustrates the case in which "あいうえお" is selected.

In FIG. 16(b), when the user traces the display screen to select the character string from "a" to "お", and then detaches the pen from the screen, a character string analyzing process is performed. In this case, the character type of the first character of the selected character string is identified so as to decide the valid character string, the executable function is acquired, and then, the function selecting screen 102 is displayed.

In the case of FIG. 16(b), the first character "a" of the selected character string is an alphabet (alphabetical character), so that it is determined from the character type-function correspondence information 132 illustrated in FIG. 15 that there are four executable functions. Therefore, the item names (function items) of these four functions are displayed on the function selecting screen 102. The function selecting screen 102 may be displayed on the other display region as another window in order not to cover the selected character string in the display screen 101.

When the user sees the function selecting screen 102, and touches, with a pen, the display portion of the function that the user intends to execute among the four function items, the touched function is executed to the valid character string.

When the executable function is acquired, the valid character string for each function is also decided in FIG. 16(b). For example, the "voice reproduction function" is acquired as the executable function, it is decided that only "abc" is valid in the selected character string "abc def あいうえお" as the valid character string to which this function is executed. As for the "S jump function", only "abc" is similarly specified as the valid character string.

When the "reading function" is acquired, "abc def" is specified as the valid character string as the subject to which this function is executed. When the "marker function" is acquired, the whole selected character string "abc def あいうえお" is specified as the valid character string. Specifically, the decided valid character string to which the function is executed is different depending upon the executable function.

Thereafter, when the user designates the function to be executed with a touch input, the function is executed to the decided valid character string associated with the designated function.

In FIG. 16(c), the character type of the first character "あ" is hiragana with respect to the selected character string "あいうえお gh", so that only two functions, which are the "S jump function" and "marker function", are acquired as the executable functions with reference to the character type-function correspondence information 132.

Then, the function selecting screen 102 has a display in which only two functions, i.e., the "S jump" and "marker", can be selected.

As for the "S jump function" acquired as the executable function, the portion of "あいうえお" of the selected character string "あいうえお gh" is decided to be the valid character string as the valid character string to which the function is executed.

As for the "marker function", the whole selected character string "あいうえお gh" is decided to be the valid character string. In this case, only the "gh", which is not at the head, is not selected as the valid character string, and the voice reproduction function and the reading function cannot be selected.

As described above, in the present invention, the user selects the character string on his/her own will, and then, the function that can be executed to this selected character string is acquired. The acquired function item is automatically displayed. Accordingly, the user's operation for selecting the function can be made simple and easy-to-understand, and the erroneous operation can be reduced.

The executable function is acquired from the character type of the first character of the selected character string, and the valid character string to which this function should be executed is decided. Therefore, when the user's character string selecting operation is unsuitable, i.e., when the selected character string includes unintended characters, the appropriate function intended by the user can be selected, so long as the first character has the intended character type, whereby the operability of the user can be enhanced.

<Embodiment 1 of Character String Selection and Function Selection>

Figure 17:
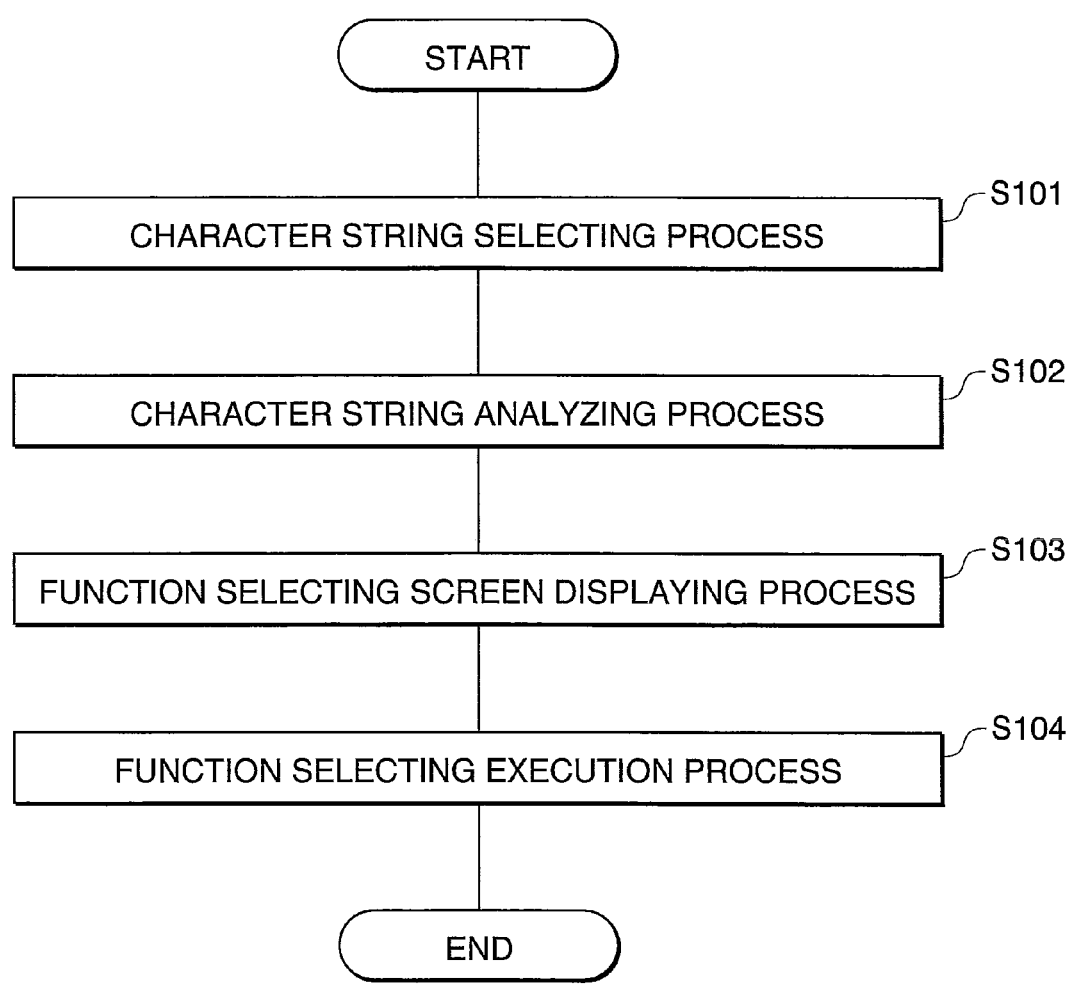
FIG. 17 is a whole flowchart of the character string selecting process and the other processes according to the present invention.

FIG. 17 illustrates a whole flowchart of the information processing apparatus according to one embodiment.

In FIG. 17, it is supposed that the user has already selected the content information 137 that the user intends to use, and the desired information (e.g., character string) of the content information 137 has already been displayed on the display screen 101.

In step S101, the character string selecting process is executed.

Here, when the user selects the desired character string of the displayed character strings by using the character selection unit 111 such as a pen in the display state illustrated in FIG. 16(a), the character string 133 is stored in the memory unit 130, and displayed on the character string display unit 121 as being distinguished (e.g., being highlighted).

When it is detected that the user detaches the pen from the screen after the selection of the character string, the character string analyzing process is executed in step S102. After the character type is acquired by the character type acquiring unit 140 for the selected character string, the function corresponding to the character type is acquired by the function acquiring unit 160, whereby the valid character string is decided by the valid character string decision unit 150.

In step S103, the function selecting screen displaying process is executed.

Here, the function selecting screen 102 having a list of the item names (function items) of the acquired functions is displayed.

When the user then designates the function to be executed with a touch input from the function items displayed onto the function selecting screen, the function selecting process and the function selecting execution process is executed in step S104. The function of the touched portion is selected, and the selected function is executed to the valid character string in the selected character string by the function execution unit 170.

The description above is the outline of the flow of the whole process involved with the present invention.

Figure 18:
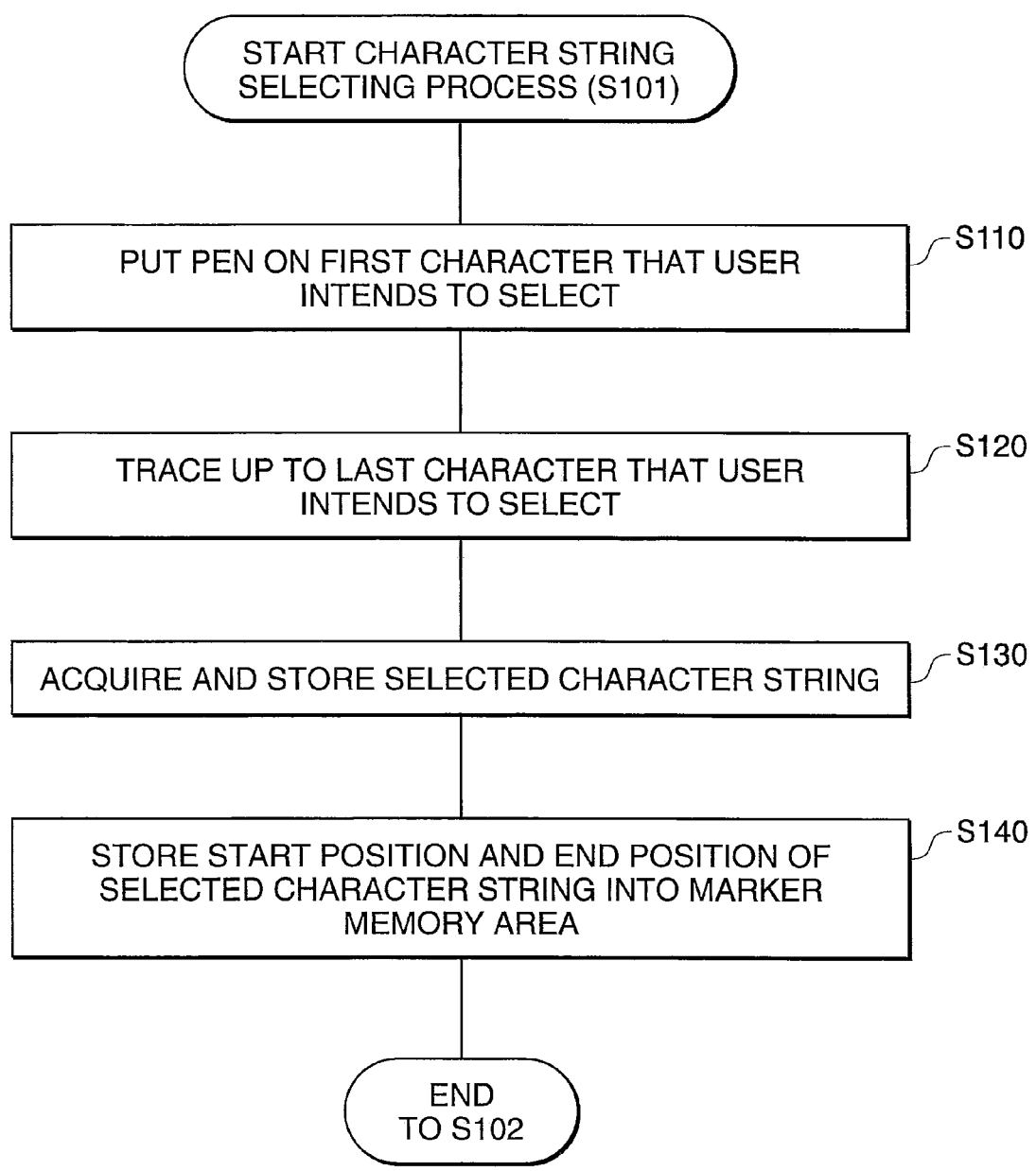
FIG. 18 is a flowchart illustrating the character string selecting process according to the present invention.

FIG. 18 illustrates a flowchart of the character string selecting process in step S101 according to one embodiment.

In step S110, it is supposed that the user puts a pen on a character that the user intends to select. In this case, the character selection unit 111 in the input unit 110 detects the input coordinate of the pen, and the input coordinate is stored in the memory unit 130 as the start position of the selected character string.

It is supposed that the user traces the character string up to the last character that the user intends to select in step S120. In this case, the positional information from the start position to the coordinate of the end position of the last character is stored in the memory unit 130.

In step S130, the character displayed on the position is identified from the stored positional information so as to acquire the selected character string 133, and the resultant is stored in the memory unit 130.

In step S140, the information involved with the start position and the end position of the pen inputted by the user is stored as the information of the marker function. This information is utilized for executing the marker function.

When the pen is then detached from the screen, the CPU proceeds to the character string analyzing process in step S102.

Figure 19:
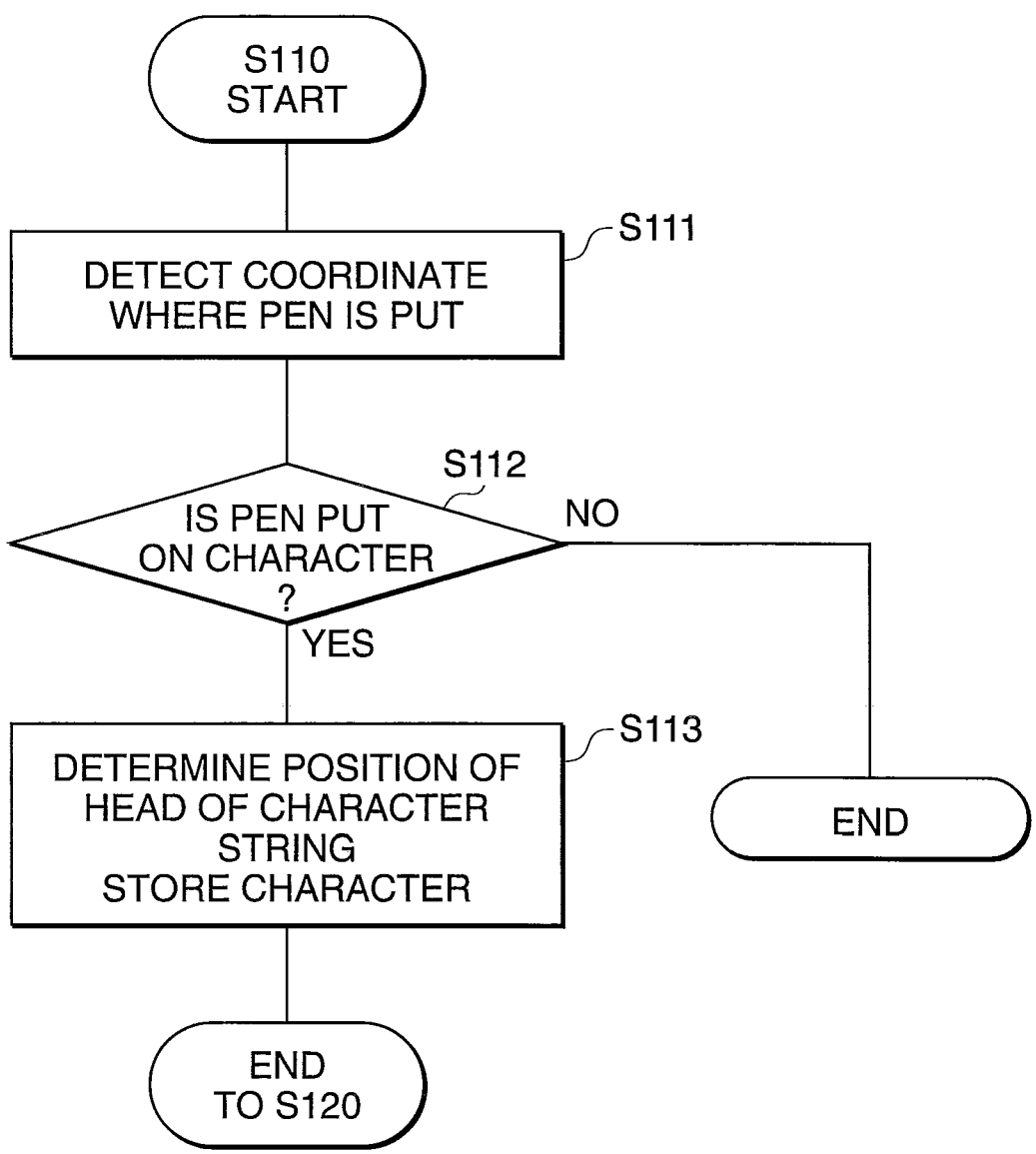
FIG. 19 is a flowchart of a pen coordinate detecting process according to the present invention.

FIG. 19 illustrates a flowchart of a process of acquiring the start position of the character designated by the pen in step S110 in FIG. 18 according to one embodiment.

In step S111, the coordinate where the pen is put is detected. This detection can be made by a method of detecting the coordinate with a resistance film, or by a method of calculating an absolute coordinate at the touched position on the screen.

In step S112, it is checked whether the detected coordinate is on the character displayed on the display screen or not. When the position where the pen is put is not on the character, the process is ended.

On the other hand, when the pen is put on the character, the CPU proceeds to step S113 to decide the character displayed on this position as the first character of the selected character string 133, and store this character. In this case, the character type (first character type 135) of the first character may be stored by the character type acquiring unit 140.

This character may be displayed as being distinguished from the other characters (e.g., highlighted) in order that the user recognizes this character is selected.

Then, the CPU proceeds to step S120.

Figure 20:
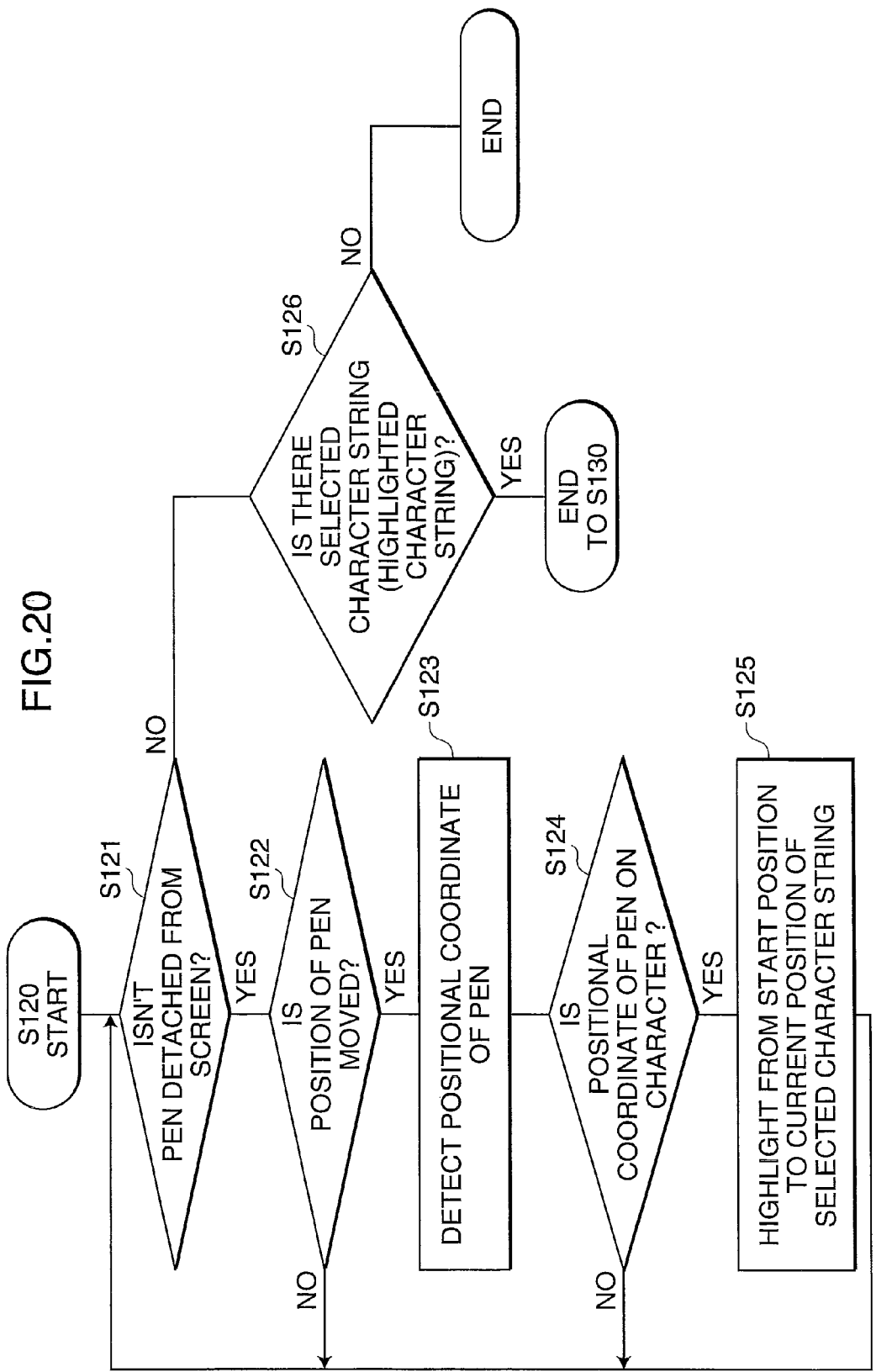
FIG. 20 is a flowchart of a character string selecting process with a pen movement according to the present invention.

FIG. 20 illustrates a flowchart of a process when the character in step S120 in FIG. 18 is traced according to one embodiment.

In step S121, it is checked whether the pen is detached from the display screen or not. If it is detached, it is determined that the input for the selection is ended, so that the CPU proceeds to step S126.

On the other hand, when it is not detached, the CPU proceeds to step S122.

In step S122, it is checked whether the position of the pen is moved or not. When it is not moved, the CPU returns to step S121. When it is moved, the CPU proceeds to step S123 so as to detect the positional coordinate of the pen after the movement.

In step S124, it is checked whether the detected positional coordinate of the pen is on the displayed position of the displayed character or not. If it is not on the character, the CPU returns to step S121. If it is on the character, the CPU proceeds to step S125 so as to highlight the character region present from the coordinate at the position of the first character to the current positional coordinate of the pen, and then, returns to step S221.

On the other hand, when the pen is detached from the screen, it is checked in step S126 whether or not there is the selected character string 133, i.e., whether or not there is the highlighted character string.

If there is no character string, the process is ended. When there is the selected character string 133, the CPU proceeds to the character string acquiring process and storing process in step S130.

After step S101 is ended, and when there is the selected character string 133 in step S126, this character string is stored in the memory unit 130, and further, the character type 135 of the first character is stored in the memory unit 130.

Figure 21:
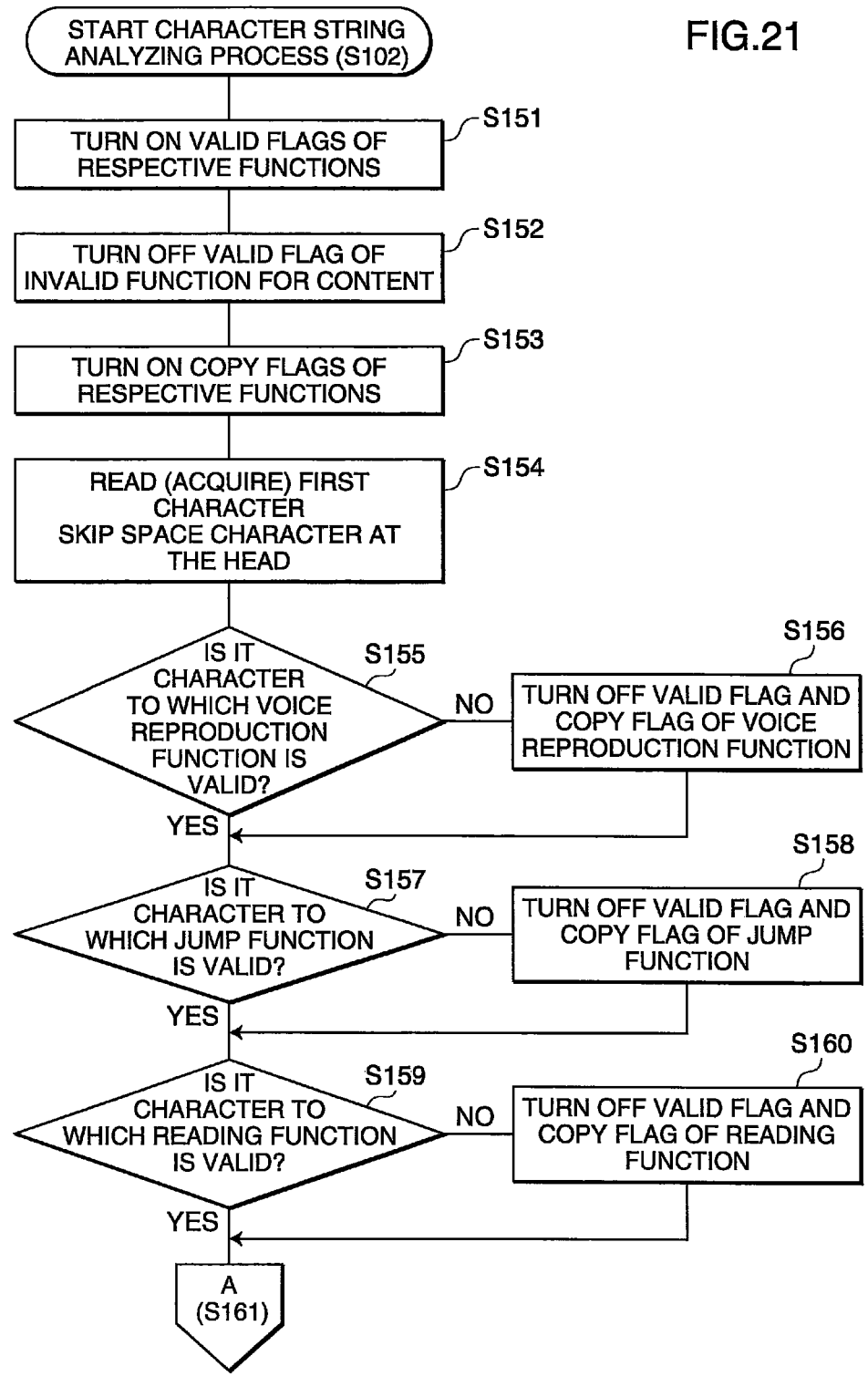
FIG. 21 is a flowchart illustrating a character string analyzing process according to the embodiment 1 of the present invention.
Figure 22:
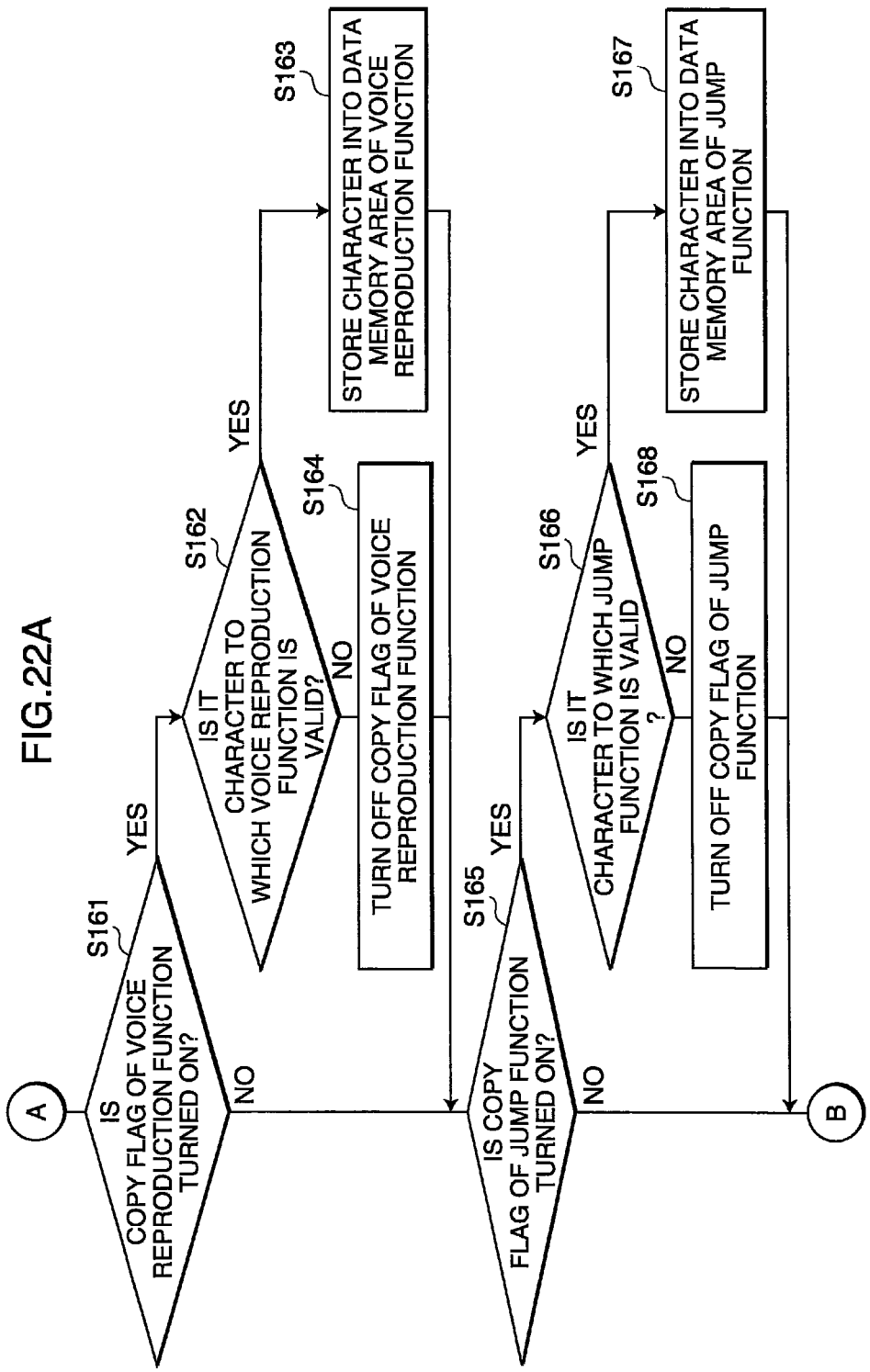
FIG. 22 is a flowchart illustrating the character string analyzing process according to the embodiment 1 of the present invention.

FIGS. 21 and 22 illustrate flowcharts of the character string analyzing process indicated in step S102 of the present invention.

In the character string analyzing process, the process of acquiring the executable function by the function acquiring unit 160 and the process of deciding the valid character string, by the valid character string decision unit 150, for the acquired function are mainly executed. In this process, a "valid flag" and a "copy flag" set for each function are utilized.

The valid flag is a flag indicating whether the corresponding function is executable or not, wherein its "on state" indicates that the function is executable, while its "off state" indicates that the function cannot be executed.

The copy flag is a flag indicating whether the valid character string that is the subject to which the corresponding function is executed can be stored or not when the corresponding function is executed. Its "on state" indicates that the valid character string can be stored, while its "off state" indicates that the valid character string cannot be stored.

FIG. 23 illustrates the function selecting analysis information 136 including these flags according to one embodiment.

FIG. 23 illustrates the information stored for four functions. The information includes the valid flag, the copy flag, and a data memory area that stores the valid character string for one function. It is supposed here that one valid character string can be stored as the valid character string. The number of the valid character string is not limited to one.

In FIG. 23, the initial value of all valid flags is set to be "on", and the initial value of all copy flags is set to be "on".

As for the marker function, the whole selected character string is the subject to which the marker function can be executed. Therefore, the copy flag is not set, but the information about the start position and the end position of the selected character string (e.g., an order number of the character from the start position of a certain line) is stored.

When the character string analyzing process is started in FIG. 21, the valid flags of the respective functions are all initially set to be on in step S151.

In step S152, the valid flags of the invalid functions set beforehand for the currently utilized content are set to be off.

For example, in the case of the content that makes the marker function invalid, the marker function cannot be executed. Therefore, the valid flag of the marker function is set to be off.

In step S153, the copy flags of the respective functions are initially set to be on.

In step S154, the first character is read from the selected character string 133. In this case, the character type acquiring unit 140 acquires the character type of the first character.

When a space character is present at the head, the space character is skipped, since the acquired character type becomes a space. Then, a character that is other than the space and that appears first after the space is read to acquire the character type that is not the space. This is because, when the first character is the space, this space is not specified as the valid character upon executing the function, and therefore, it is considered that the user makes an erroneous selection.

In step S155, it is checked whether the acquired first character is the valid character to which the voice reproduction function can be executed or not. The character type-function correspondence information 132 illustrated in FIG. 15 is used to check whether or not the character type of the first character is the valid character type corresponding to the voice reproduction function.

When it is not the valid character to which the voice reproduction function cannot be executed, the CPU proceeds to step S156 to turn off the valid flag of the voice reproduction function and to turn off the copy flag thereof.

After step S156 or when it is the valid character to which the voice reproduction function can be executed, the CPU proceeds to step S157.

It is checked in step S157 whether or not the first character is the valid character to which the S jump function can be executed. In this step, it is checked by using the character type-function correspondence information 132 as in step S155. When it is not the valid character, the CPU proceeds to step S158 so as to turn off both the valid flag and the copy flag of the S jump function.

Next, it is checked in step S159 whether or not the first character is the valid character to which the reading function can be executed. If it is not the valid character, the CPU proceeds to step S160 to turn off both the valid flag and the copy flag of the reading function.

When the selected character string is "abc def あいうえお" in FIG. 16(a), the function selecting analysis information 136 becomes the state illustrated in FIG. 23(a) upon the completion of the process described above, since the first character "a" is an alphabet.

When the selected character string is "あいうえお gh", the first character "あ" is "hiragana", so that the function selecting analysis information 136 becomes the state illustrated in FIG. 23(b).

In the case of FIG. 23(a), all valid flags are turned on, and all of four functions are acquired as the executable functions. However, in the case of FIG. 23(b), only two functions (s jump and marker) whose valid flag is turned on are acquired as the executable functions.

After steps S159 and S160 in FIG. 21, the CPU proceeds to step S161 in FIG. 22A.

In step S161, it is checked whether or not the copy flag of the voice reproduction function is turned on. When the copy flag is turned on, the CPU proceeds to step S162 so as to check whether the currently read character is the valid character to which the voice reproduction function is valid or not.

When it is not the character to which the voice reproduction function is valid, the CPU proceeds to step S164 so as to turn off the copy flag corresponding to the voice reproduction function.

When it is the character to which the voice reproduction function is valid, the CPU proceeds to step S163 so as to store the currently read character into the data area of the voice reproduction function in the function selecting analysis information 136. For example, when the read character is "a", it is an alphabet and it is the character to which the voice reproduction function can be executed, so that "a" is stored in the data memory area of the voice reproduction function.

Even after any one of the processes in steps S161, S163, and S164 is executed, the CPU proceeds to step S165.

In step S165, it is checked whether or not the copy flag of the S jump function is turned on. If the copy flag is turned on, the CPU proceeds to step S166, and when it is not turned on, it proceeds to step S169.

In step S166, it is checked whether or not the currently read character is the character to which the S jump function is valid. If it is the valid character, the CPU proceeds to step S167 so as to store this character into the data memory area of the S jump function.

On the other hand, if it is not the valid character, the CPU turns off the copy flag of the S jump function.

Thereafter, it is checked whether or not the copy flag of the reading function is turned on. If it is turned on, the CPU proceeds to step S170, and when it is not turned on, the CPU proceeds to step S173.

When the currently read character is the character to which the reading function can be executed in step S170, the CPU proceeds to step S171, and when it is not the character to which the reading function cannot be executed, the CPU proceeds to step S172.

In step S171, the currently read character is stored in the data memory area of the reading function. In step S172, the copy flag of the reading function is set to be off.

After step S169, S171, or S172 is executed, it is checked in step S173 whether or not the currently read character is the last character in the selected character string.

When it is the last character, the process is ended. When it is not the last character, the CPU proceeds to step S174 so as to read the next character in the selected character string, and then, returns to step S161.

When the character analysis for all characters in the selected character string is executed as described above, the valid character string that is the subject to which the executable function is executed is stored in the respective data memory areas. When the selected character string is "abc def あいうえ" for example, the information 136 is decided as in FIG. 23(c).

When the S jump function is focused, the "abc" is stored as the valid character string to which this function is executed. When the voice reproduction function is focused, the "abc" is specified as the valid character string.

In the case of the reading function, the character string of "abc def" is stored as the valid character string.

When the selected character string is "あいうえお gh", the information 136 is set as illustrated in FIG. 23(d).

The marker data illustrated in FIG. 23(e) is set when step S104 is executed. FIG. 23(e) illustrates the case in which the selected character string is "abc def あいうえ".

A "10" in a "Word No" means a number allocated one-to-one to each direction word, and this means that the position of the first character of the selected character string is "the first" character, the position of the last character is "the twelfth" character, and the background color colored as the marker is set to be "red".

After the character string analyzing process (step S102) described above, the processes in steps S103 and S104 are executed, so that the function that the user designates after the selection of the character is executed.

Figure 24:
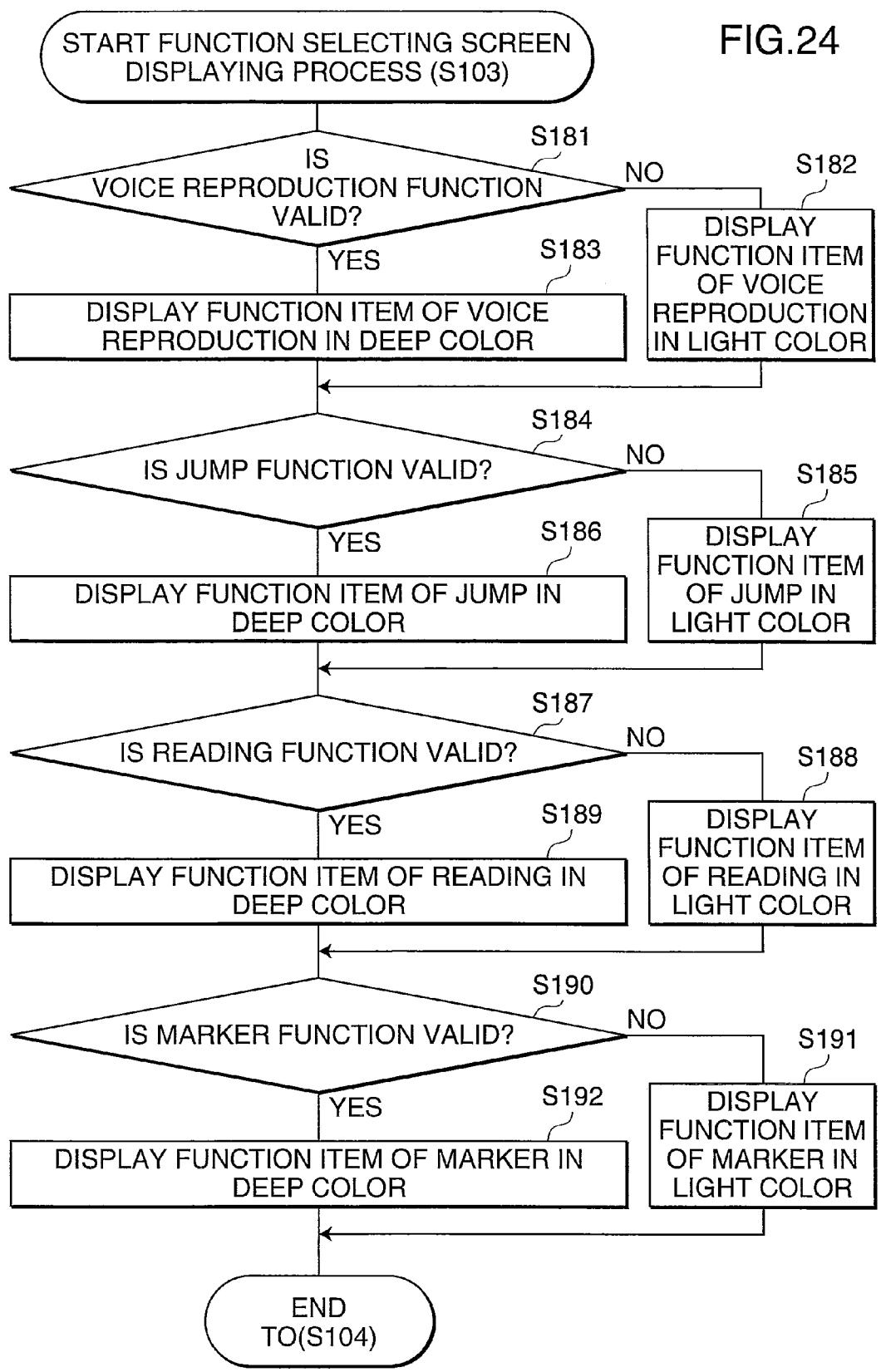
FIG. 24 is a flowchart illustrating a function selecting screen displaying process according to the embodiment 1 of the present invention.

FIG. 24 illustrates a flowchart of the function selecting screen displaying process (step S103) according to one embodiment.

In step S181, it is checked whether the voice reproduction function is valid or not. Here, it is also checked whether the valid flag of the voice reproduction function in the information 136 is turned on or not. If it is on, the CPU proceeds to step S183 so as to display the function item of the voice reproduction in the function selecting screen 102 in a deep color.

On the other hand, when it is not turned on, the CPU proceeds to step S182 so as to display the function item of the voice reproduction in a light color. The display in a light color allows the user to know that this function cannot be selected. Alternatively, the function item itself of the voice reproduction may not be displayed, or other identification display indicating that this function cannot be selected may be made.

Next, it is checked in step S184 whether the S jump function is valid or not. If it is valid, the CPU proceeds to step S186 so as to display the function item of the S jump in a deep color. If it is not valid, the CPU proceeds to step S185 so as to display the function item of the S jump in a light color.

Similarly, in steps S187 and S190, it is checked whether the reading function and the marker function are valid or not respectively. If they are valid, the CPU proceeds to step S189 or S192 so as to display the function item of the reading or the marker in a deep color.

When they are not valid, the CPU proceeds to step S188 or S191 so as to display the corresponding function item in a light color. With this process, the function selecting screen illustrated in FIG. 16(b) or 16(c) is displayed. Thereafter, the CPU proceeds to step S104.

In the present invention, the user needs to perform the character string selecting operation and the function selecting operation after the character string selecting operation. After the user performs the character string selecting operation, the function selecting screen 102 is automatically displayed as illustrated in FIG. 16(b) or FIG. 16(c), wherein only the executable functions corresponding to the character type of the first character in the selected character string are displayed on this screen so as to be capable of being selected. Therefore, the user's operation before performing the desired function is easy, and it is more easy-to-understand than the case in which the function is selected first. The function, which cannot be executed to the selected character string, cannot be selected. This prevents an unintended function from being executed, whereby the erroneous operation by the user can be reduced.

<Embodiment 2 of Character String Selection and Function Selection>

FIGS. 25 and 26 illustrate schematic explanatory views according to the embodiment 2 of the present invention.

In this embodiment, the character string selecting process is the same as that in the embodiment 1, but the character string analyzing process to the selected character string is different. Specifically, in the embodiment 1, the valid character string to which the executable function is executed is limited to one. However, in the embodiment 2, when the selected character string includes plural character strings separated with a space character, not only the first character string but also the plural character strings are specified as the subject of the valid character string.

It is supposed that "abc def あいうえ" illustrated in FIG. 25(b) is selected for the character string (abc def あいうえお gh) displayed on the display screen 101 illustrated in FIG. 25(a).

In this case, the first character "a" is an alphabet, so that four functions are all acquired as the executable functions, and the function items of four functions are displayed on the function selecting screen 102.

Since "abc", "def", and "'あいうえ" in the selected character string is considered to be the independent character strings separated with a space character, these character strings can be specified as candidates of the valid character string.

In the embodiment 2, plural valid character strings can be stored in the data memory area for each function as illustrated in FIG. 25(c).

For example, the character strings "abc" and "def" starting with the alphabet are set to be the valid character string for the voice reproduction function in FIG. 25(c).

For the S jump function, three character strings including "あい うえ" starting with hiragana are set to be the valid character string. For the reading function, one character string "abc def" is set to be the valid character string.

For the marker function, one character string "abc def あいうえ" is set to be the valid character string.

It is supposed that the user selects and inputs the "voice reproduction function" with a pen in the state illustrated in FIG. 25(b).

In this case, as illustrated in FIG. 25(c), there are two character strings "abc" and "def" as the valid character string to which the "voice reproduction function" is executed. Therefore, as illustrated in FIG. 25(d), the valid character string selecting screen 103 is further displayed in order that the user selects to which valid character string the "voice reproduction function" should be executed.

When the user selects either one of the display regions of "abc" and "def" with the pen after the valid character string selecting screen 103 is displayed, the valid character string to which the voice reproduction function is executed is determined. Then, the voice reproduction function is executed to the determined valid character string.

In this process, the selecting operation by the user with the selecting screen 103 being displayed is added. However, the user selects the valid character string from the character strings that have already been selected. Therefore, it is considered that a series of operation is easy-to-understand and simple for the user, compared to the case in which the user reselects the selected character string.

FIG. 26 illustrates the case in which the "あいうえお gh" is selected as the selected character string. In this case, four functions are displayed on the function selecting screen 102 so as to be capable of being selected as illustrated in FIG. 26(b), as in FIG. 16(c).

However, in the embodiment 2, the valid character string is determined for each function as illustrated in FIG. 26(c). For example, two character strings "あいうえお" and "gh" are specified as the valid character string for the S jump function.

Accordingly, when the S jump function is selected on the display screen 102, a screen for selecting which one of the valid character strings "あいうえお" and "gh" is selected is further displayed.

Figure 27A:
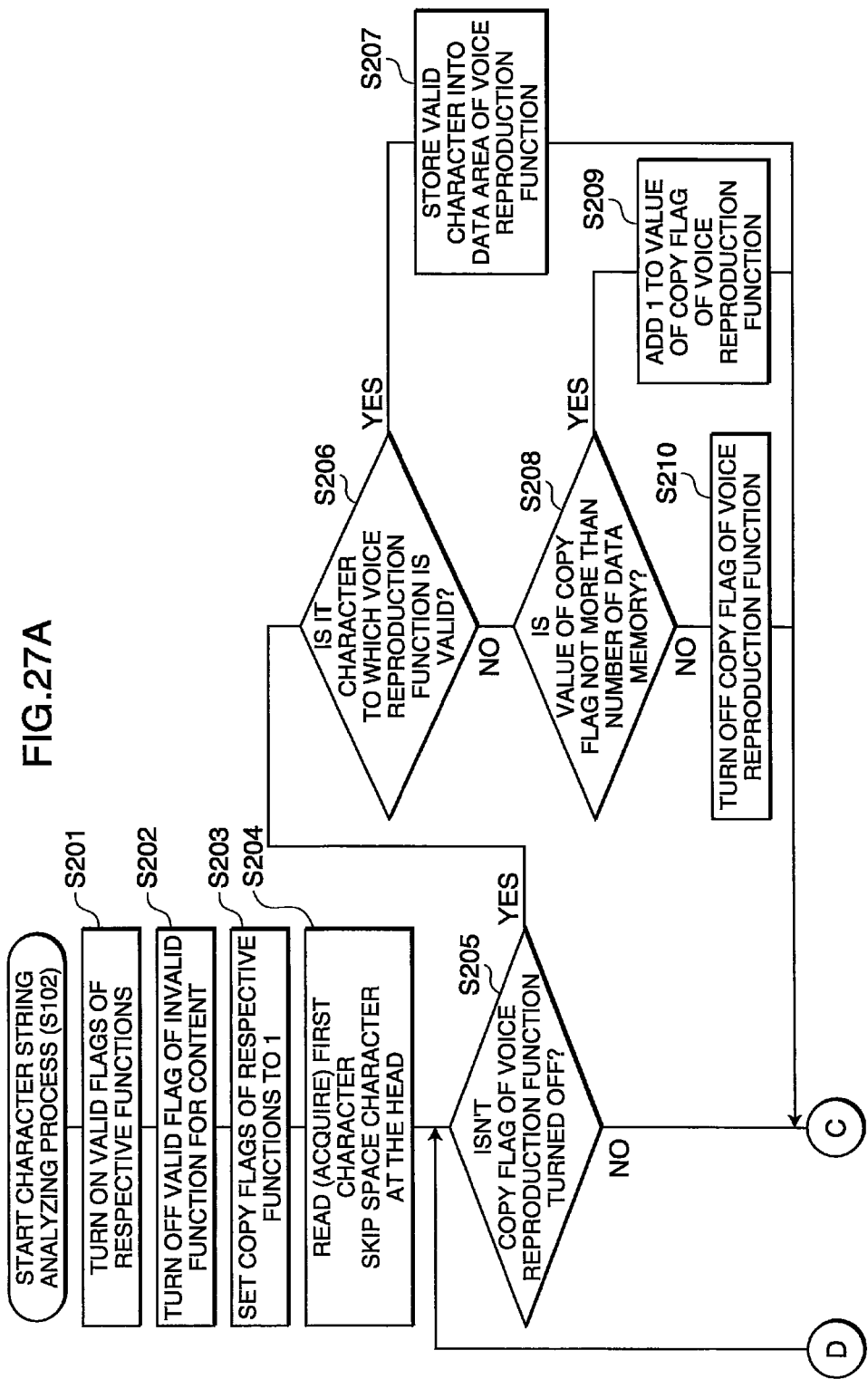
FIG. 27 is a flowchart illustrating a character string analyzing process according to the embodiment 2 of the present invention.
Figure 28:
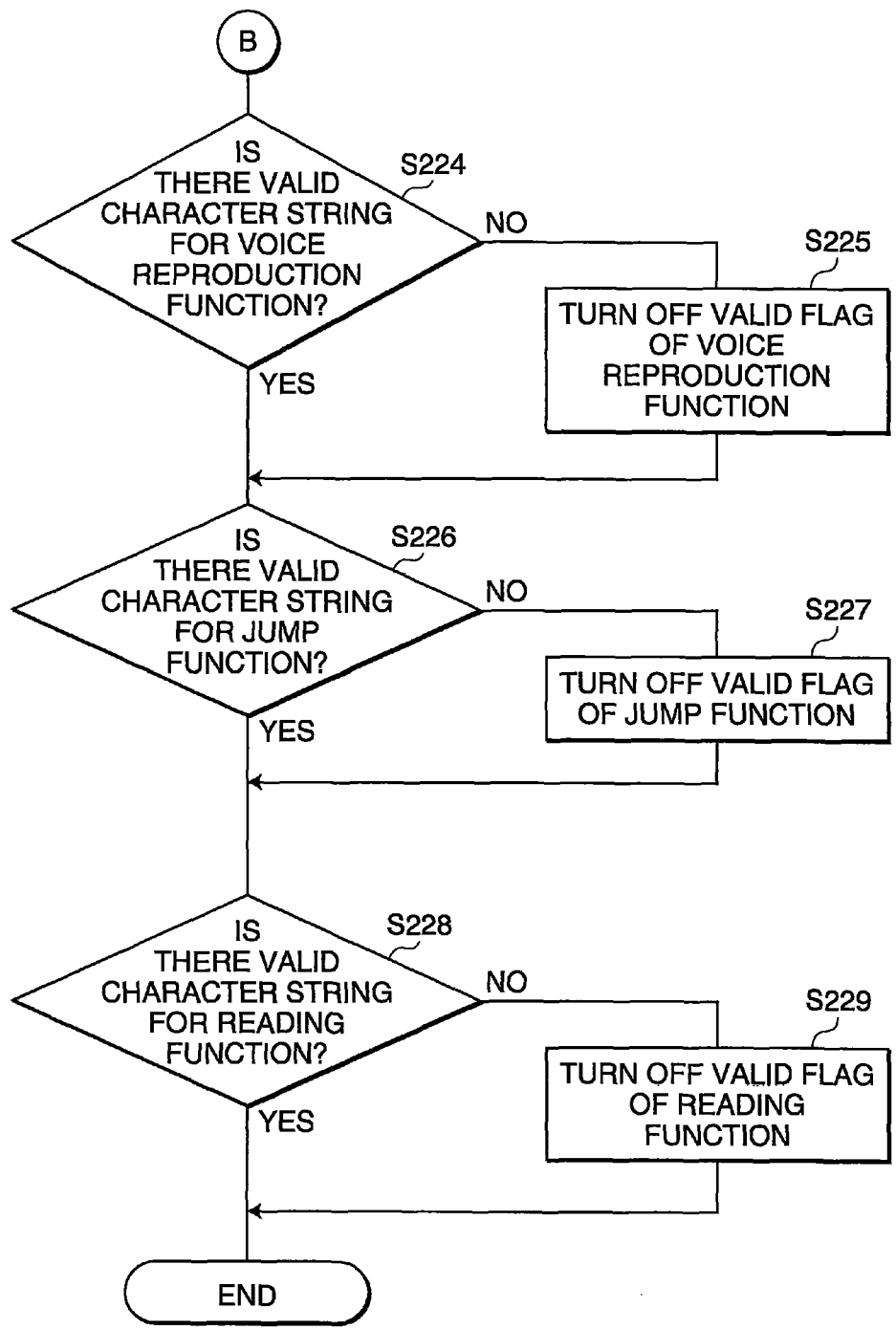
FIG. 28 is a flowchart illustrating the character string analyzing process according to the embodiment 2 of the present invention.

FIGS. 27A, 27B and 28 illustrate a flowchart of a character string analyzing process (S102) in the embodiment 2 of the present invention.

Steps S201 and S202 are the same as steps S151 and S152 in FIG. 21.

In step S203, copy flags of the respective functions are initially set to "1". In the embodiment 2, the copy flag is not merely be turned on or off, but it is utilized as a flag indicating a position of a data memory area to which the valid character string can be copied.

FIG. 29 illustrates one embodiment of function selecting analysis information 136 in the embodiment 2.

FIG. 29(a) illustrates the state after step S203.

There are five data memory areas for storing the valid character string, and up to five valid character strings can be stored for each function. It is to be noted that the data memory area is not limited to five, but may be two, or may be six or more. It may be changed according to the memory capacity.

Therefore, the case in which the copy flag is "1" means that the valid character string, which should be stored next, is stored in the first data memory area.

In step S204, the first character is read to acquire the character type thereof as in step S154.

When the first character is a space character, it is skipped, and a character, which appears first in the subsequent character string and which is not a space, is read to acquire the character type thereof.

In step S205, it is checked whether the copy flag of the voice reproduction function is turned off or not. If the copy flag is not turned off, the CPU proceeds to step S206, and when it is turned off, the CPU proceeds to step S211.

In step S206, it is checked whether the currently read character is the character to which the voice reproduction function is valid or not. The character type of the read character is checked by using the character type-function correspondence information 132.

If it is the valid character, the CPU proceeds to step S207 where the currently read character is stored in the data memory area of the voice reproduction function in the information 136 as the valid character. Here, the position of the data area for storing the character is the position of a numerical value set in the copy flag.

If it is not the valid character, the CPU proceeds to step S208 so as to check whether the current value of the copy flag of the voice reproduction function is not more than the number of the data memory area or not.

If it is not more than the number of the data memory area, the CPU proceeds to step S209 so as to add 1 to the copy flag. If it exceeds the number of the data memory area, the CPU proceeds to step S210 so as to turn off the copy flag of the voice reproduction function, in order that the copy is not made to the data memory area for the voice reproduction function.

After any one of steps S207, S209, and S210 is executed, or when the copy flag is turned off in step S205, the CPU proceeds to step S211.

In step S211, it is checked whether the copy flag of the S jump function is turned off or not. If the copy flag is not turned off, the CPU proceeds to step S212, and when it is turned off, the CPU proceeds to step S217.

The processes from steps S212 to S216 are the same as the processes from steps S206 to S210 in the voice reproduction function. Therefore, the voice reproduction function may be changed to the S jump function.

When the read character is the valid character, this character is stored in the data memory area of the S jump function.

After any one of steps S213, S215, and S216 is executed, the CPU proceeds to step S217.

In step S217, it is checked whether the copy flag of the reading function is turned off or not.

When the copy flag is not turned off, the CPU proceeds to step S218, and when it is turned off, the CPU proceeds to step S223.

The processes from steps S218 to S222 are the same as the processes from steps S206 to S210 in the voice reproduction function. Therefore, the voice reproduction function may be changed to the reading function.

When the read character is the valid character, this character is stored in the data memory area of the reading function.

After any one of steps S219, S221, and S222 is executed, the CPU proceeds to step S223.

In step S223, it is checked whether the currently read character is the last character or not. If it is not the last character, the CPU proceeds to step S230 so as to read the next character in the selected character string, and then, returns to step S205. If it is the last character, the CPU proceeds to step S224 in FIG. 28.

In case where the character has already been stored when the valid character is to be stored in steps S207, S213, and S219, the character is not overwritten, but is stored as being continuously added to the character that has already been stored.

If there is the valid character string when the processes from steps S205 to S223 are performed up to the last character in the selected character string, the valid character string is stored in the data memory area for the corresponding function.

In step S224, it is checked whether or not the valid character string of the voice reproduction function is not stored in the information 136. When the valid character string is not stored in the data memory area of the voice reproduction function, the CPU proceeds to step S225 so as to set the valid flag of the voice reproduction function to be off.

When the valid character string is stored in step S224, or after the process in step S225, the CPU proceeds to step S226.

In step S226, it is checked whether or not the valid character string of the S jump function is not stored. If it is not stored, the CPU proceeds to step S227, and when it is stored, the CPU proceeds to step S228.

In step S227, the valid flag of the S jump function is set to be off.

In step S228, it is checked whether or not the valid character string of the reading function is not stored. When it is not stored, the CPU proceeds to step S229 so as to set the valid flag of the reading function to be off. When it is stored, or after the process in step S229 is performed, the CPU ends the character string analyzing process.

FIG. 29(a) illustrates the function selecting analysis information 136 in case where the selected character string is "abc def あいうえ", while FIG. 29(b) illustrates the function selecting analysis information 136 in case where the selected character string is "あいうえお gh". These figures illustrate the state after step S203 is executed.

FIG. 29(c) illustrates the state of the information 136 after all processes in FIGS. 27A, 27B and 28 are executed to the selected character "abc def あいうえ".

In FIG. 29(c), the voice reproduction function is the executable function, and two character strings "abc" and "def" are stored as the valid character string to which the function is executed.

Three character strings are stored for the S jump function, while one character string "abc def" is stored for the reading function, as the valid character string.

FIG. 29(*d*) illustrates the information 136 when the selected character string is "あいうえお". In the S jump function, two character strings that are "あいうえお" and "gh" are stored as the valid character string, for example.

Marker data in FIG. 29(*e*) is the same as that in FIG. 23(*e*).

Figure 30:
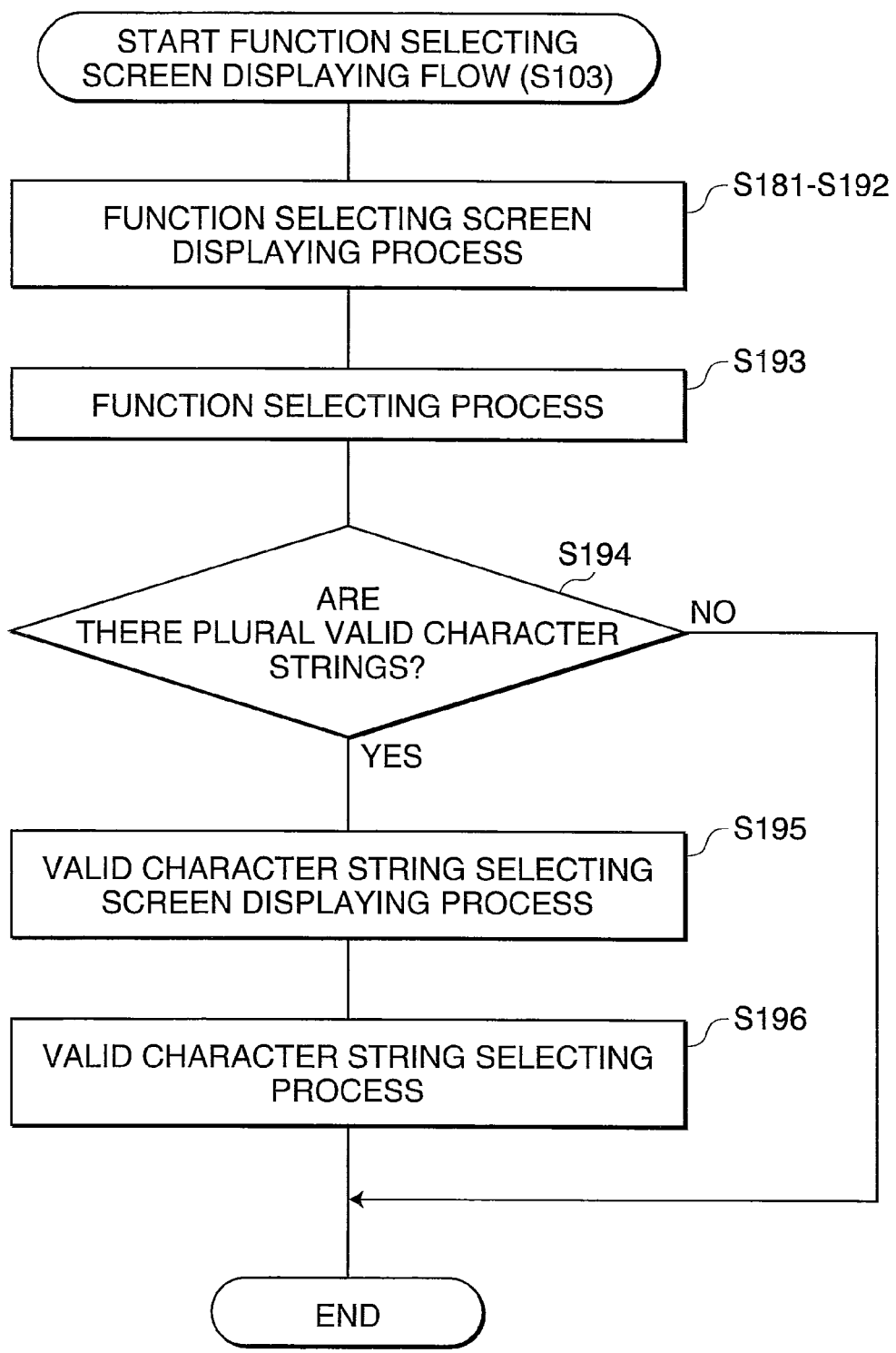
FIG. 30 is a flowchart illustrating a function selecting screen displaying process according to the embodiment 2 of the present invention.

FIG. 30 illustrates a flowchart of the function selecting screen display in the embodiment 2 of the present invention.

Firstly, the function selecting screen displaying process same as that from steps S181 to S192 illustrated in FIG. 24 is executed. With this process, the function selecting screen 102 illustrated in FIG. 25(*b*) is displayed.

In step S193, the function selecting process is executed.

Here, the user touch-inputs any one of the function items among the function items displayed on the function selecting screen, wherein the function of the touch-inputted function item is selected as the function that should be executed.

Next, in step S194, it is checked whether there are plural stored valid character strings for the selected function. When there are not plural valid character strings, i.e., when there is one valid character string, the process is ended.

When there are plural valid character strings, the CPU proceeds to step S195 so as to execute a process of displaying a screen for selecting the valid character string (e.g., the valid character string selecting screen 103 in FIG. 25(*d*)). By this screen 103, the user can find that there are plural character strings to which the function is to be executed. Therefore, the user touch-inputs with a pen which one of the character strings is specified as the subject to which the function is executed.

In step S196, when the touch-input of the valid character string to which the function should be executed is made by the user, the process of selecting the touch-inputted valid character string is performed.

Thereafter, the function selecting execution process in step S104 is executed. In step S104, the function selected in step S193 is executed to the valid character string selected in step S196.

As described above, in the embodiment 2, the user needs to perform the function selecting operation using the function selecting screen and the valid character string selecting operation using the selecting screen for the valid character string. However, the user does not have to perform the character string selecting operation as being conscious of which function can be executed to the selected character string that the user selects first. Therefore, even when the user erroneously selects the character string including the space character at the head, he/she can execute the desired function. Accordingly, the operation made by the user is simple and easy-to-understand. When the selected character string includes plural valid character strings, not only the first character string, but also the other subsequent character strings can be selected as the candidates of the valid character string. Therefore, the operation made by the user is simple and easy-to-understand, compared to the case in which the user selects again the character string.

According to the present invention, after the desired character string is selected, the function that can be executed to the selected character string is selected. Therefore, the operation is simple and easy-to-understand for the user, whereby the erroneous operation can be reduced, and the operability of the user can be enhanced.

The electronic apparatus according to the present invention displays the operation function that can be executed to the character string whose range is selected, in order to enhance the operability and reduce erroneous operation by the user.

Figure 31A:
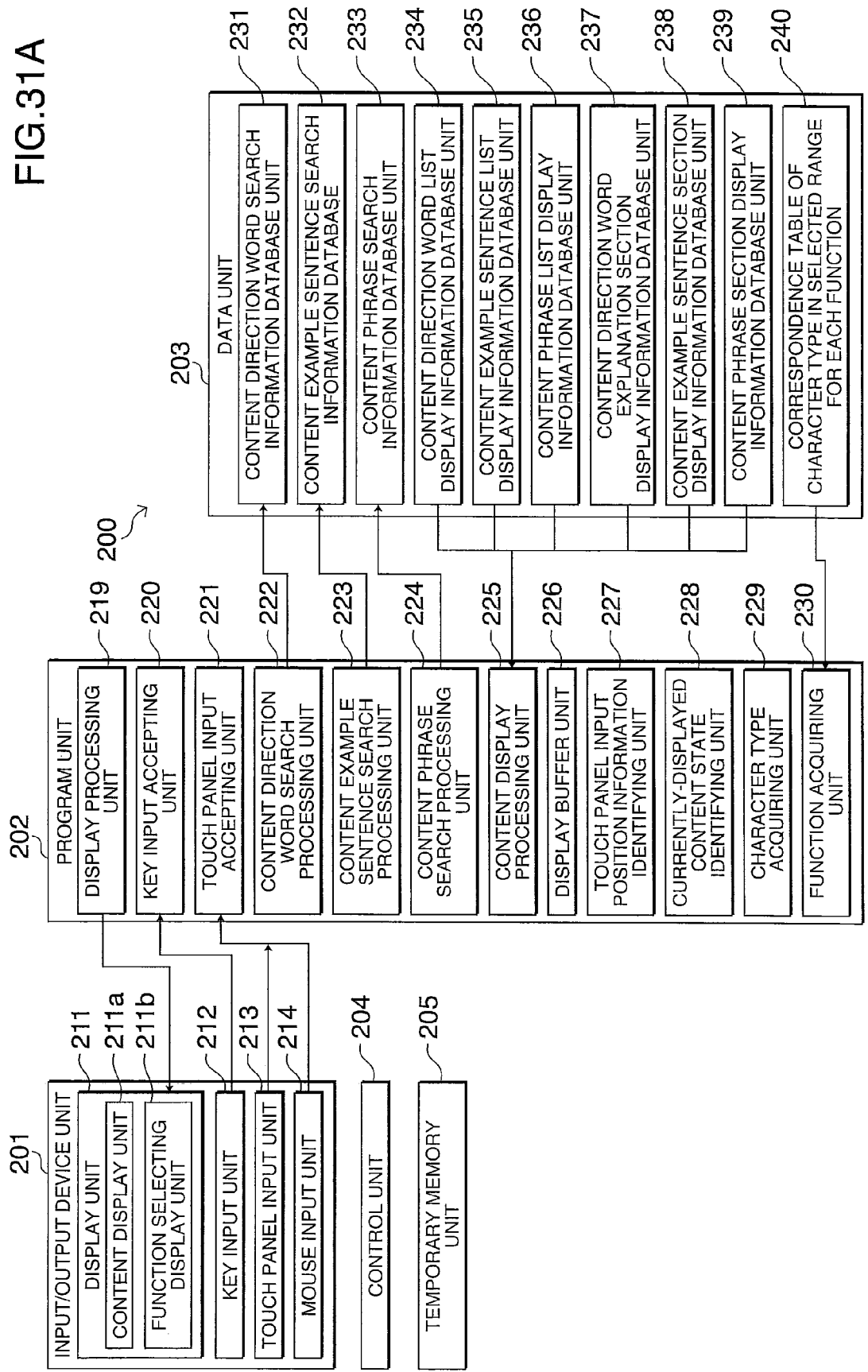
FIG. 31 is a block diagram illustrating an electronic apparatus according to the present invention.

FIGS. 31A and 31B are a block diagram illustrating an electronic apparatus 200 according to the present invention.

The electronic apparatus 200 according to the present invention is embodied as a compact portable electronic apparatus such as an electronic dictionary. The electronic apparatus is divided into an upper body and a lower body, wherein the upper body and the lower body are bonded so as to be foldable with a hinge mechanism. A display unit is provided to the upper body, while a control unit of the electronic apparatus is provided to the lower body. The display unit provided to the upper body has a large screen occupying most of the area of the upper body for displaying various information pieces. For example, when the electronic apparatus is an electronic dictionary, it displays an inputted direction word, instruction, and command. It also displays a translation (word meaning), related information, pronunciation symbol, and example sentence, corresponding to the direction word. The electronic apparatus 200 according to the present invention makes a display control of the display unit provided to the upper body. The structure in which the electronic apparatus is divided into the upper body and the lower body, and they are bonded with the hinge mechanism so as to be foldable is not essential in the present invention. The electronic apparatus may have an integral structure.

A keyboard is arranged, and a touch panel having a small-sized screen is arranged on the surface of the lower body. The touch panel having the small-sized screen is used as a handwritten character input unit, a designating unit with a pen or with a finger, or a command unit. In the present invention, the touch panel having the small-sized screen may not be provided on the surface of the lower body.

In the description below, an electronic dictionary will be described as one example, but the control device of the electronic apparatus in the present invention is applicable to a PDA, a cellular phone, and a notebook personal computer.

The electronic apparatus 200 according to the present invention includes an input/output device unit 201, a program unit 202, a data unit 203, a control unit 204, and a temporary memory unit 205.

The input/output device unit 201 includes a display unit 211, a key input unit 212, a touch panel input unit 213, and a mouse input unit 214.

The display unit 211 is a liquid crystal display device as a representative, but an organic EL device, a plasma display device, a display device such as an electronic paper can be used. When the electronic apparatus has the upper body and the lower body that can be bonded so as to be foldable, the display unit 211 is arranged at the upper body, and has a display screen having an area equal to that of the upper body. The display unit 211 has a content display unit 211*a* and a function selecting display unit 211*b*. The content display unit 211*a* and the function selecting display unit 211*b* may be displayed as a window in the display screen of the display unit 211.

The content display unit 211*a* displays a direction word inputted by the key input unit 212, and also displays the translation (word meaning), explanatory text, related information, pronunciation symbol, or example sentence, which are search results of the direction word. The content display unit 211*a* displays not only the character string but also a symbol, graphics, table, photograph, or moving image, but in the present invention, the character string is mainly displayed.

The function selecting display unit 211*b* is a section that displays an item of an operation function that can be executed, after the user selects the character range. It is preferable that it is automatically displayed. It is also preferable that only the executable function items are displayed on the function selecting display unit 211b based upon the character type-function correspondence information.

The key input unit 212 includes a QWERTY keyboard, and is arranged on the surface of the lower body. A direction word such as a character or number is inputted by using this keyboard. Further, an instruction or command is inputted to the electronic dictionary by using the keyboard. The keyboard is not limited to the above-mentioned QWERTY keyboard. An "あいうえお keyboard" having hiragana arranged in Japanese syllabary or dedicated keyboard corresponding to the other languages may be used.

The touch panel input unit 213 is a section to which an input is made with a pen or finger on the touch panel arranged on the front surface of the display unit 211 as being overlaid, and is used as the handwritten input unit, a position designating unit, a screen selecting unit, and a range selecting unit. The touch panel can employ an analog resistance film system, ultrasonic surface acoustic wave system, infrared ray shielding system, electrostatic capacitance system, electromagnetic induction system, or image recognition system. These systems can be used, but here, the analog resistance film system is used. The touch panel input unit may also be provided to the display unit arranged in the vicinity of the keyboard unit arranged at the lower body so as to be used as the handwritten input unit, position designating unit, screen selecting unit or range selecting unit. It is to be noted that, in the present invention, the touch panel input unit may not be provided on the surface of the lower body.

Instead of the touch panel input unit 213, or together with the touch panel input unit 213, a mouse input unit 214 is provided. By using the mouse input unit 214, an optional position can be designated, a screen can be selected, and a region such as a character range can be designated.

The program unit 202 includes a display processing unit 219, a key input accepting unit 220, a touch panel input accepting unit 221, a content direction word search processing unit 222, a content example sentence search processing unit 223, a content phrase search processing unit 224, a content display processing unit 225, a display buffer unit 226, a touch panel input position information identifying unit 227, a currently-displayed content state identifying unit 228, a character type acquiring unit 229, and a function acquiring unit 230. In addition to these, it also includes a control program, a document creating program, or a table creating program for the electronic dictionary, which are not illustrated.

The display processing unit 219 is a section that processes the display data of the display unit 211.

The key input accepting unit 220 accepts the input of the key input unit 212 so as to process information of a key operation.

The touch panel input accepting unit 221 is a section that accepts the input of the touch panel input unit 213 operated with the pen or finger so as to detect an input coordinate or an input coordinate region. It also accepts an input of the touch panel input unit of the display unit 211 arranged near the keyboard so as to detect the input coordinate or input coordinate region. When the mouse input unit 214 is provided, it accepts the input operation of the mouse input unit 214, thereby processing operation information of the mouse, such as information by a designating operation for designating an optional position, a screen selecting operation for selecting a screen, or a region operation for designating a region.

The key input unit 212 for inputting a keyword, or the touch panel input unit 213 for designating a range of a keyword, or the mouse 214 for designating the range of the keyword forms the character selection unit.

The content direction word search processing unit 222 is a section that searches a direction word in a content direction word search information database unit 231 stored in the data unit 203 by using the keyword inputted by the key input unit 212, the keyword whose range is designated by the touch panel input unit 213, or the keyword whose range is designated by the mouse 214. The content direction word search processing unit 222 is used, when one English word is inputted as a keyword. It searches the content direction word search information database unit 231 by using one English word as the keyword.

The content example sentence search processing unit 223 is a section that searches a content example sentence search information database unit 232 stored in the data unit 203, when the keyword inputted by the key input unit 212, the keyword whose range is designated by the touch panel input unit 213, or the keyword whose range is designated by the mouse 214 includes plural English words. The content phrase search processing unit 214 is a section that searches a content phrase search information database unit 233 stored in the data unit 203, when the keyword inputted by the key input unit 212, the keyword whose range is designated by the touch panel input unit 213, or the keyword whose range is designated by the mouse 214 includes plural English words.

The content display processing unit 225 is connected to a content direction word list display information database unit 234, a content example sentence list display information database unit 235, a content phrase list display information database unit 236, a content direction word explanation section display information database unit 237, a content example sentence section display information database unit 238, and a content phrase section display information database unit 239. It is a section that processes the content display information.

The display buffer unit 226 is a section that temporarily stores display data processed by the display processing unit 219.

The touch panel input position information identifying unit 227 is a section that identifies an input position from the input coordinate information accepted by the touch panel input accepting unit 221. The touch panel input position information identifying unit 227 determines whether a character is present or not at the input position.

The currently-displayed content state identifying unit 228 is a section that identifies the display state of the currently-displayed content from the display data temporarily stored in the display buffer unit 226. For example, it identifies whether one screen is displayed or plural screens are displayed. It also identifies whether the position designated by the pen or the mouse is the display portion or non-display portion of the content.

The character type acquiring unit 229 is a section that identifies and acquires the character type of the character string inputted by the key input unit 212, the character string whose range is designated by the touch panel input unit 213, or the character string whose range is designated by the mouse input unit 214. For example, it identifies a sentence including English word, plural English words, Japanese, languages of two or more types such as Japanese and English, or a sentence including symbols other than language, so as to acquire the character type. The character of two or more languages means a character of two or more languages that are used in the dictionary installed in this electronic dictionary.

The function acquiring unit 230 is a section that acquires a function corresponding to the character type as the character type-function correspondence information from a correspondence table 240 of a character type in selected range for each function illustrated in FIG. 33.

The data unit 203 includes the content direction word search information database unit 231, the content example sentence search information database unit 232, the content phrase search information database unit 233, the content direction word list display information database unit 234, the content example sentence list display information database unit 235, the content phrase list display information database unit 236, the content direction word explanation section display information database unit 237, the content example sentence section display information database unit 238, the content phrase section display information database unit 239, and the correspondence table 240 of character type in selected range for each function.

The content direction word search information database unit 231 includes a direction word search information memory unit 231a for a content 1, a direction word search information memory unit 231b for a content 2, and a direction word search information memory unit 231c for a content 3, . . . . The content direction word search information database unit 231 stores search information in which the searched keyword is a single English word. When the keyword is a single English word, the search information is searched by the keyword in the content direction word search information database unit 231 by the content direction word search processing unit 222. The content means a language dictionary such as Japanese dictionary, Kanji dictionary, English dictionary, German dictionary, French dictionary, and Chinese dictionary, or a jargon dictionary such as a dictionary for electric terminology, a dictionary for mechanical terminology, or a chemical dictionary. The content also includes an encyclopedia, a modern term dictionary, law term dictionary, other dictionaries and wordbooks. These contents are only illustrative, and all of these do not have to be provided. They are appropriately selected. The same is true for the description below. The direction word of the information content direction word search information database unit 231 is searched by the content direction word search processing unit 222.

The content example sentence search information database unit 232 includes an example sentence search information memory unit 232a for the content 1, an example sentence search information memory unit 232b for the content 2, and an example sentence search information memory unit 232c for the content 3, . . . . The content example sentence search information database unit 232 stores search information of an example sentence in which the searched keyword includes plural English words. When the keyword includes plural English words, an example sentence is searched by the keyword in the content example sentence search information database unit 232 by the content example sentence search processing unit 223.

The content phrase search information database unit 233 includes a phrase search information memory unit 233a for the content 1, a phrase search information memory unit 233b for the content 2, and a phrase search information memory unit 233c for the content 3, . . . . The content phrase search information database unit 233 stores search information of a phrase in which the searched keyword includes plural English words. When the keyword includes plural English words, phrase search information is searched by the keyword in the content phrase search information database unit 233 by the content phrase search processing unit 224.

The phrase search will be described. When the phrase search is made with two keywords that are the first keyword "a" and the second keyword "lot", the phrase search information memory unit 233b for the content 2 illustrated in FIG. 2(a) is searched, since the searched keyword includes plural English words. Firstly, it is searched whether or not there is a list having the first keyword "a" in the list of the content phrase search information memory unit 233b with the first keyword. As a result, phrase information No. 1 and No. 3 having "a" are searched in the content phrase search information memory unit 233b. Next, it is searched whether the second keyword "lot" is present or not for the searched phrase information No. 1 and No. 3. As a result, the phrase information No. 1 is searched.

The above example is the case in which the phrase is searched with the two keywords. If the third keyword is present, the above-mentioned search is repeated until there is no keyword. The information in the content phrase section display information memory unit 239b corresponding to the phrase information, which is left until last, in the content phrase search information memory unit 233b is the result of the phrase search. In this example, "a lot of たくさんの" of the phrase information No. 1 is displayed on the display unit 211.

The content direction word list display information database unit 234 includes a direction word list display information memory unit 234a for the content 1, a direction word list display information memory unit 234b for the content 2, and a direction word list display information memory unit 234c for the content 3, . . . . The content direction word list display information database unit 234 stores direction word list display information of contents 1 to n. When the direction word list display information of the content k is searched with the keyword, the searched direction word list display information is outputted.

The content example sentence list display information database unit 235 includes an example sentence list display information memory unit 235a for the content 1, an example sentence list display information memory unit 235b for the content 2, and an example sentence list display information memory unit 235c for the content 3, . . . . The content example sentence list display information database unit 235 stores example sentence list display information of the contents 1 to n. When the example sentence list display information of the content k is searched with the keyword, the searched example sentence list display information is outputted.

The content phrase list display information database unit 236 includes a phrase list display information memory unit 236a for the content 1, a phrase list display information memory unit 236b for the content 2, and a phrase list display list information memory unit 236c for the content 3, . . . . The content phrase list display information database unit 236 stores phrase list display information of the contents 1 to n. When the phrase list display information of the content k is searched with the keyword, the searched phrase list display information is outputted.

The content direction word explanation section display information database unit 237 includes a direction word explanation section display information memory unit 237a for the content 1, a direction word explanation section display information memory unit 236b for the content 2, and a direction word explanation section display information memory unit 237c for the content 3, . . . . The content direction word explanation section display information database unit 237 stores direction word explanation section display information of the contents 1 to n. The content direction word explanation section display information database unit 237 may store related data or link information related to the content direction word explanation section display information database unit 237, in addition to the direction word explanation section display information of the contents 1 to n. The content direction word explanation section display information database unit 237 stores the direction word explanation section display information of the contents 1 to n. When the explanation section display information of the content k is searched with the keyword, the searched direction word explanation section display information is outputted.

The content example sentence section display information database unit 238 includes an example sentence section display information memory unit 238a for the content 1, an example sentence section display information memory unit 238b for the content 2, and an example sentence section display information memory unit 238c for the content 3, . . . . The content example sentence section display information database unit 238 stores example sentence information of the contents 1 to n. For the content having no example sentence, the example sentence section display information memory unit can be eliminated. The example sentence is represented as related data corresponding to the explanation section display information, so that it may store the related data. The content example sentence section display information database unit 238 stores example sentence section information of the contents 1 to n. When the example sentence section display information of the content k is searched with the keyword, the searched example sentence section display information is outputted.

The content phrase section display information database unit 239 includes a phrase section display information memory unit 239a for the content 1, a phrase section display information memory unit 239b for the content 2, and a phrase section display list information memory unit 239c for the content 3, . . . . The content phrase section display information database unit 239 stores phrase information of the contents 1 to n. For the content having no phrase information, the phrase section display information memory unit can be eliminated. The content phrase section display information database unit 239 stores phrase section display information of the contents 1 to n. When the phrase section display information of the content k is searched with the keyword, the searched phrase section display information is outputted.

The control unit 204 reads the control program, the document creating program, and the table creating program for the electronic dictionary provided to the program unit 202, and allows the respective units to be sequentially operated according to each program so as to realize the display control method according to the present invention.

The temporary memory unit 205 is a section that temporarily stores various data pieces.

FIGS. 32A and 32B are a diagram illustrating one example of the content direction word search information database unit 231, the content direction word list display information database unit 234, the content direction word explanation section display information database unit 237, the content phrase search information database unit 233, the content phrase list display information database unit 236, the content phrase section display information database unit 239, the content example sentence search information database unit 232, the content example sentence list display information database unit 235, and the content example sentence section display information database unit 238.

In FIG. 2, the content direction word search information database unit 231, the content direction word list display information database unit 234, and the content direction word explanation section display information database unit 237 constitute one set of database for the search of a direction word. The content phrase search information database unit 233, the content phrase list display information database unit 236, and the content phrase section display information database unit 239 constitute one set of database for the search of a phrase. The content example sentence search information database unit 232, the content example sentence list display information database unit 235, and the content example sentence section display information database unit 238 constitute one set of database for the search of an example sentence.

FIG. 32A-(a) illustrates only a part of one example of the direction word search information memory unit 231a for the content 1, the direction word list display information memory unit 234a for the content 1, and the direction word explanation section display information memory unit 237a for the content 1, when the content 1 is a Japanese dictionary. FIG. 32A-(a) also illustrates only a part of an example of the phrase search information memory unit 233a for the content 1, the phrase list display information memory unit 236a for the content 1, and the phrase section display information memory unit 239a for the content 1.

There is no example sentence information present in the content 1, so that the example sentence search information memory unit, the example sentence list display information memory unit, and the example sentence section display information memory unit are eliminated.

FIG. 32B-(b) illustrates only a part of one example of the direction word search information memory unit 231b for the content 2, the direction word list display information memory unit 234b for the content 2, and the direction word explanation section display information memory unit 237a for the content 2, when the content 2 is an English dictionary. FIG. 32B-(b) also illustrates only a part of an example of the phrase search information memory unit 233b for the content 2, the phrase list display information memory unit 236b for the content 2, and the phrase section display information memory unit 239b for the content 2. FIG. 32B-(b) also illustrates only a part of an example of the example sentence search information memory unit 232b for the content 2, the example sentence list display information memory unit 235b for the content 2, and the example sentence section display information memory unit 238b for the content 2.

The direction word search information memory unit 231k for the content k, the direction word list display information memory unit 234k for the content k, the direction word explanation section display information memory unit 237k for the content k, the phrase search information memory unit 233k for the content k, the phrase list display information memory unit 236k for the content k, the phrase section display information memory unit 239k for the content k, the example sentence search information memory unit 232k for the content k, the example sentence list display information memory unit 235k for the content k, and the example sentence section display information memory unit 238k for the content k are provided each for n contents. However, they are not illustrated in the figure.

As illustrated in FIG. 32A-(a), in the present invention, the direction word search information memory unit 231k for the content k, the direction word list display information memory unit 234k for the content k, the direction word explanation section display information memory unit 237k for the content k, the phrase search information memory unit 233k for the content k, the phrase list display information memory unit 236k for the content k, the phrase section display information memory unit 239k for the content k, the example sentence search information memory unit 232k for the content k, the example sentence list display information memory unit 235k for the content k, and the example sentence section display information memory unit 238k for the content k are referred to as a related content. The contents stored in FIGS. 32A-(a), 32B-(b), . . . are referred to as unrelated contents.

Specifically, the direction word search information, the direction word list display information, the direction word explanation section display information, the phrase search information, the phrase list display information, the phrase section display information, the example sentence search information, the example sentence list display information, and the example sentence section display information, which have the same content number, are related contents, while the direction word search information, the direction word list display information, the direction word explanation section display information, the phrase search information, the phrase list display information, the phrase section display information, the example sentence search information, the example sentence list display information, and the example sentence section display information, which have the different content number, are unrelated contents.

With respect to the direction word search information memory units 231a, 231b, . . . for the content k illustrated in FIGS. 32A and 32B, when a single word is a keyword, a direction word is searched with this keyword. When there are one or plural search results, the corresponding direction words are outputted from the direction word list display information memory units 234a, 234b, . . . , and displayed on the display unit 211. When there is one search result, the explanation information corresponding to the direction word is read from the direction word explanation section display information memory units 237a, 237b, . . . , and displayed on the display unit 211. However, when there are plural search results, plural direction words are displayed on the display unit 211. When one of the plural direction words is selected, the corresponding explanation information is read from the direction word explanation section display information memory units 237a, 237b, . . . , and displayed on the display unit 211.

In the phrase search, when plural words are the keyword, the direction word in the phrase search information memory units 233a, 233b, . . . for the content k is searched with this keyword. When there are one or plural search results, the corresponding phrases are outputted from the phrase list display information memory units 236a, 236b, . . . , and displayed on the display unit 211. When there is one search result, the phrase information corresponding to the phrase is read from the phrase section display information memory units 239a, 239b, . . . , and displayed on the display unit 211. However, when there are plural search results, plural phrases are displayed on the display unit 211. When one of the plural phrases is selected, the corresponding phrase information is read from the phrase section display information memory units 239a, 239b, . . . , and displayed on the display unit 211.

In the search of the example sentence, when plural words are the keyword, an example sentence in the example sentence search information memory units 232a, 232b, . . . for the content k is searched with this keyword. When there are one or plural search results, the corresponding example sentences are outputted from the example sentence list display information memory units 235a, 235b, . . . , and displayed on the display unit 211. When there is one search result, the example sentence information corresponding to the example sentence is read from the example sentence section display information memory units 238a, 238b, . . . , and displayed on the display unit 211. However, when there are plural search results, plural example sentences are displayed on the display unit 211. When one of the plural example sentences is selected, the corresponding example sentence information is read from the example sentence section display information memory units 238a, 239b, . . . , and displayed on the display unit 211.

FIG. 33 illustrates the character type-function correspondence information, in which the operation function that can be executed by the electronic apparatus and the character type of the character that is the subject to which each operation function is executed are associated with each other, in a form of a table. It illustrates the correspondence table 240 of character type in selected range for each function. In the present invention, the operation function is selected based upon this table.

As illustrated in FIG. 33, the electronic apparatus has MP3 voice reproduction function, TTS sentence reading function, S jump function (English-word search, phrase search, and example sentence search), and marker function as the operation functions for the electronic dictionary. In the present invention, the "MP3 voice reproduction function" is a function in which the selected character string includes only English words of alphabet (alphabetical character), and a single English word is outputted with a voice reading the single English word. The "TTS sentence reading function" is a function in which the selected character string includes plural English words, and plural English words are outputted with synthesized voice. The "S jump function" is a function for searching the explanation section display information, the phrase section display information, and the example sentence section display information corresponding to the direction word from the English dictionary or Japanese dictionary installed in the electronic dictionary by using the selected English word (word search), selected plural English words (phrase search), or selected Japanese (e.g., the character string including kanji, hiragana, or katakana) as the direction word. The selected character string is not limited to the character string including the English words or the character string including the Japanese. The languages other than English or Japanese can be selected, so long as they are displayed. In this case, the information of the content corresponding to this language is searched. The "marker function" is a function for displaying all of the selected characters and symbols with a color different from the character display color. Alternatively, it is a function of adding an underline to all of the selected characters and symbols.

When the electronic dictionary has installed therein a dictionary for a language (e.g., Chinese) other than Japanese, and English, an executable function is determined beforehand not only for the Japanese, English word and English sentence, but also for a word or sentence of the other language, wherein a specific function is executed to the selected character string.

The character type included in the selection of the range with respect to the operation function is restricted as described below. The MP3 voice reproduction function can be executed, when an English word (1 word) is selected. The TTS sentence reading function can be executed, when an English word (1 word) or plural English words (English word including plural words) are selected. The plural English words are determined by the determination as to whether a space is present between the English words. The S jump function can be executed, when an English word (1 word) or plural English words or Japanese words are selected. When an English word (1 word) is selected, the word search is executed, while when the plural English words are selected, the phrase search and the example sentence search are executed. The marker function can be executed, when an English word, plural English words, Japanese, or a character including two or more languages, are selected, or when a symbol is selected. The character including two or more languages may be the character including two or more languages used in the dictionary installed to the electronic dictionary.

In the present embodiment, the MP3 voice reproduction function can be executed to an English word. However, if the word voice reproduction can be executed to the other languages, this function can be executed when the corresponding language is selected. Similarly, the TTS sentence reading function can be executed to an English word (1 word) or English sentence (English word including plural words). However, if the reading voice reproduction can be executed to the other languages, this function can be executed when the corresponding language is selected.

In other words, when the character included in the selected range is an English word (1 word), the MP3 voice reproduction function, the TTS sentence reading function, the S jump function (word search), and the marker function can all be executed. When the character in the selected range is plural English words (English word including plural words), the TTS sentence reading function, the S jump function (phrase search and example sentence search), and the marker function can be executed. When the character in the selected range is Japanese, the S jump function and the marker function can be executed. When the character in the selected range includes two or more characters used in the dictionary installed to the electronic dictionary, or with respect to a symbol, the marker function can be executed.

In the present invention, the range of the character string is selected, and the character type included in the range of the character string is detected, whereby the operation function that can be executed to the character type is acquired.

FIG. 34 is an explanatory view for selecting the operation function of the electronic apparatus in the present invention.

As illustrated in FIG. 34(a), the user starts to select a desired character range from a direction word inputted by the key input unit 212 or a meaning or an example sentence of a direction word obtained through the search of the direction word. FIG. 34(a) illustrates the case in which a desired character range is selected from an example sentence of "言う". The user can optionally select the character range, regardless of the character type. FIG. 34(b) illustrates the state in which the user selects the desired character range. FIG. 34(b) illustrates the state in which an English word "That" is selected as the first character of the selected range, and then, an English word "without" is selected as the end of the selected range. The selected range is displayed to a user with the black and white display of the character being inverted.

When the user selects the desired character range as described above, the electronic dictionary analyzes the character type included in the selected range by the character type acquiring unit 229. The function acquiring unit 230 acquires the executable function from the table illustrated in FIG. 33 based upon this analysis. The "That goes without" is selected in FIG. 34(b), which means that plural English words are selected. Therefore, the executable operation functions in this case are the TTS sentence reading function, the S jump function (phrase search and example sentence search), and the marker function from the table in FIG. 33. Accordingly, as illustrated in FIG. 34(d), the function window is automatically displayed so as to display the executable operation functions (TTS sentence reading function, the S jump function (phrase search and example sentence search) and the marker function) onto the display unit. The function window is displayed at the position near the character string whose range is selected in order to allow the user to easily recognize and to provide a simple operation. The operation function (i.e., the MP3 voice reproduction function) other than the executable operation functions (TTS sentence reading function, S jump function, and marker function) displayed on the function window may be grayed out in order to prevent the user from selecting this function. When the user selects the desired operation function from the displayed operation functions, the selected operation function is started, and executed.

In FIG. 34(d), the window is opened, and the respective operation functions of the TTS sentence reading function, the S jump function, and the marker function are displayed. However, as illustrated in FIG. 34(e), the display screen may be divided into an upper part and a lower part, wherein the executable functions which are the TTS sentence reading function, the S jump function, and the marker function may be displayed on the lower screen.

If the user erroneously selects the character range, the user may select again the character range without selecting the operation function displayed in the function window or on the lower screen.

The operation described above is executed even when the selected character is an English word, Japanese sentence, or a character including two or more languages used in the dictionary installed to the electronic dictionary, or when a symbol is selected. When the selected character includes a character including two or more languages used in the dictionary installed to the electronic dictionary, the executable function is only the marker function. Therefore, as illustrated in FIG. 34(d) or 34(e), the executable function may not be displayed, and the marker function may automatically be executed without allowing the user to perform the selecting operation. Specifically, when the selected character includes a character including two or more languages used in the dictionary installed to the electronic dictionary, or when a symbol is selected, a marker is immediately added to the selected character, which can reduce the operation made by the user, whereby the usability of the electronic apparatus is enhanced.

This means that, when the executable operation function is only one, regardless of the case including a character of two or more languages, the operation function is automatically executed.

FIG. 34 illustrates the case in which plural words such as "That goes without" are selected. The S jump function in the present invention makes a different operation between the case in which one word is selected and the case in which plural words are selected. This will be described next. Specifically, the S jump function includes a one-word search and a phrase search. In the present invention, the one-word search is executed in the case of one word, and the phrase search is executed in the case of plural words. The plural words means a number of words included in one sentence, and generally, two, three, four, or five words are included.

FIG. 35 is an explanatory view of the S jump function (phrase search or example sentence search) in the present invention, wherein FIG. 35(a) illustrates a screen selected when the user uses the English dictionary to select the desired character range. In this case, the state in which "look at" is selected from the English dictionary. When plural English words are selected as described above, the executable functions are the TTS sentence reading function, the S jump function (phrase search and example sentence search), and the marker function as described above.

FIG. 35(b) illustrates the state in which the executable operation functions (TTS sentence reading function, S jump function (phrase search and example sentence search), and marker function) are displayed on the display unit, and the MP3 voice reproduction function is grayed out. When the S jump is selected, the phrase search is executed, since the plural words are selected. FIG. 35(c) illustrates the result of the display of the phrase search.

FIG. 35(d) illustrates the result of the search when the example sentence is selected in S jump function. Specifically, "Look at the time! We're going to be late. Can't you look where you're going?" and "That books looks interesting." are displayed.

FIGS. 36 and 37 illustrate explanatory views of the S jump function different from FIG. 35.

FIG. 36(a) illustrates the case where the selected English word is one word, and "look" is selected. When one word is selected, the one-word search is to be executed. Therefore, the one-word search is executed, and the search result is outputted as illustrated in FIG. 36(b). However, plural English words are selected as illustrated in FIG. 37(a) ("look at"), the phrase search and the example sentence search are to be executed. Therefore, the phrase search or the example sentence search is executed, and the search result is outputted. FIG. 37(b) illustrates the result of the phrase search, while FIG. 37(c) illustrates the result of the example sentence search.

In the present invention, the S jump function (word search and the phrase search or the example sentence search) can be executed as illustrated in FIG. 35 or in FIGS. 36 and 37, but it is preferable that the executable operation functions are displayed on the display unit as illustrated in FIG. 35.

Figure 38A:
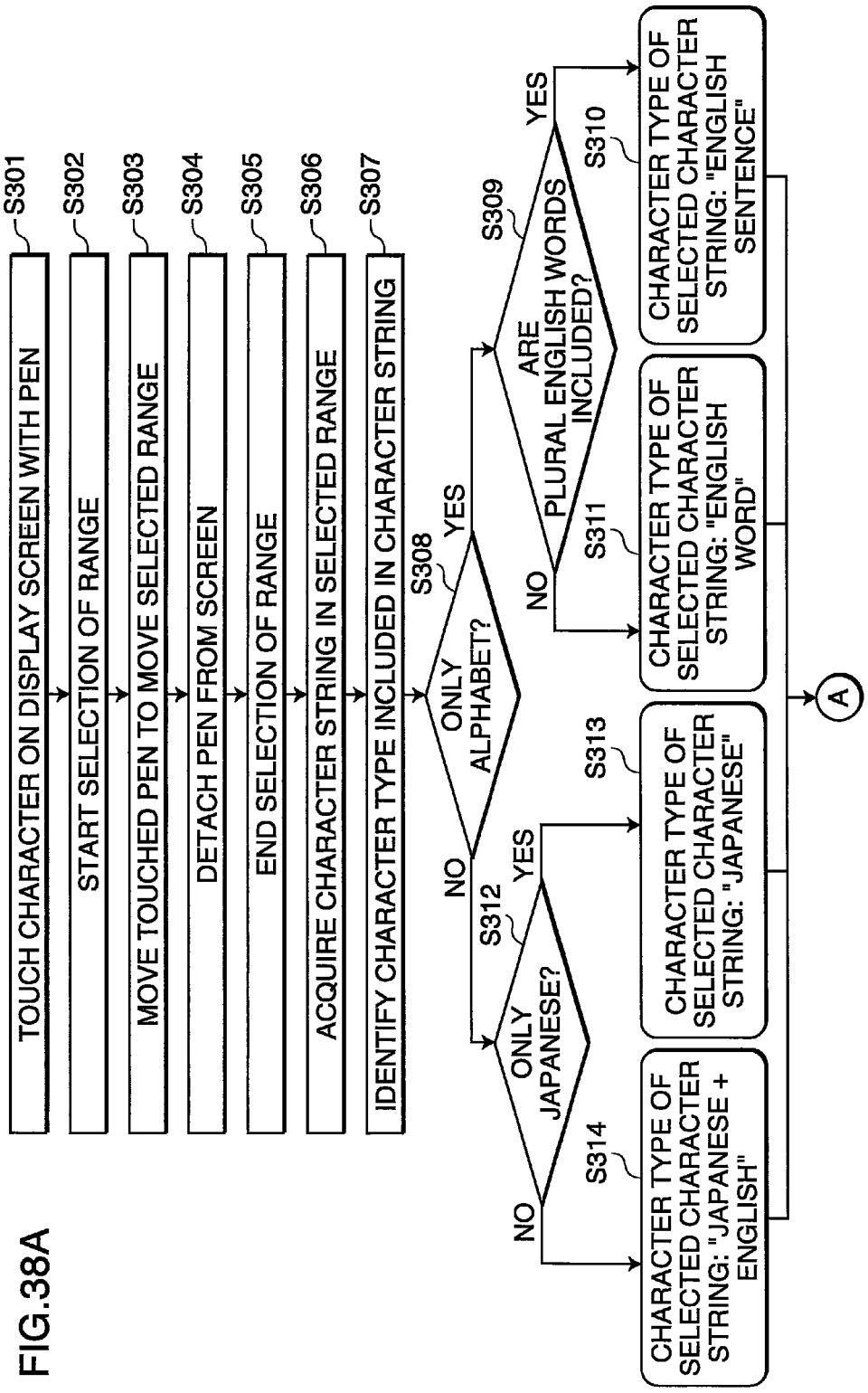
FIG. 38 is a flowchart of the electronic apparatus according to the present invention.
Figure 38B:
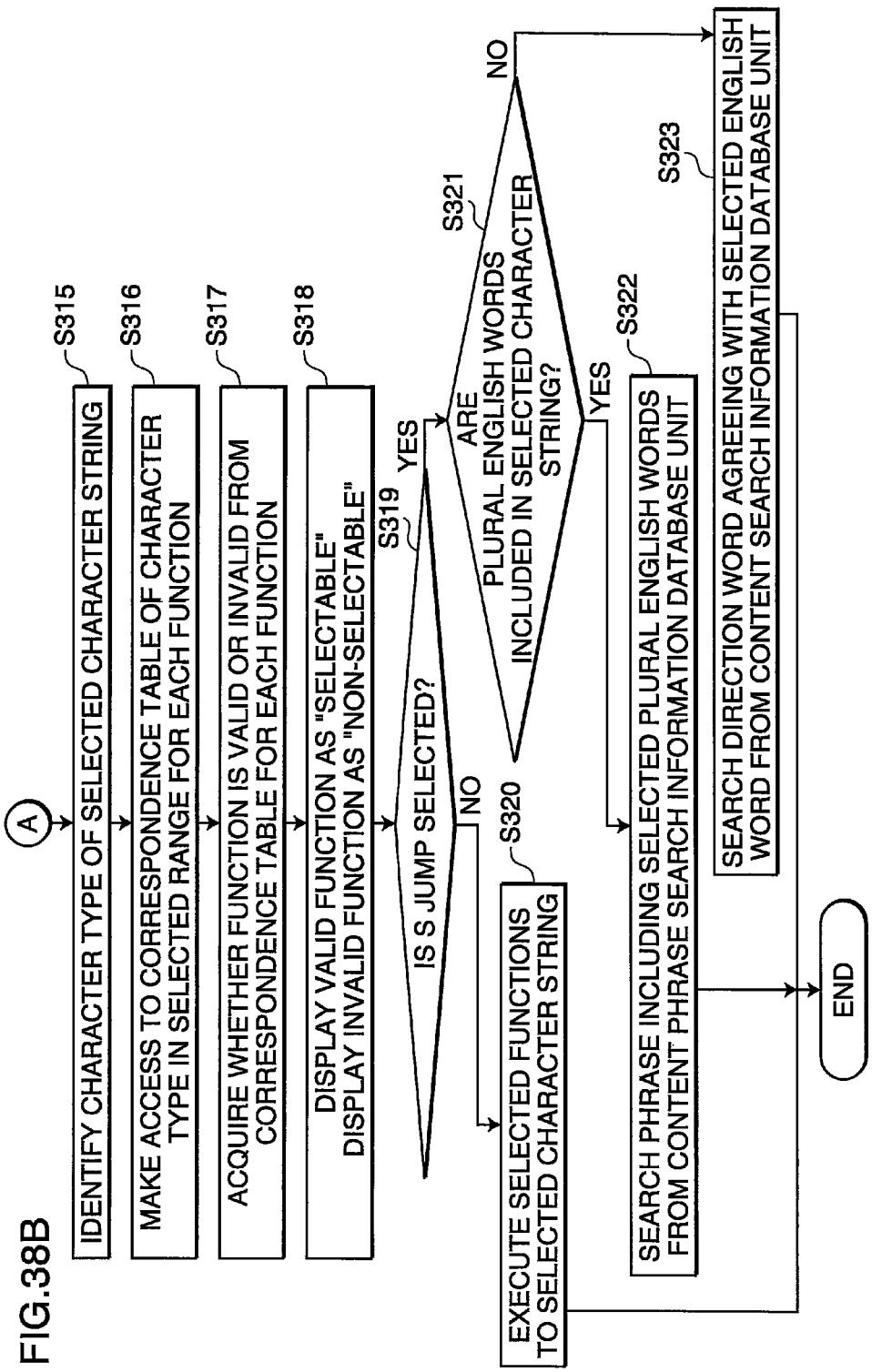
Figure 39:
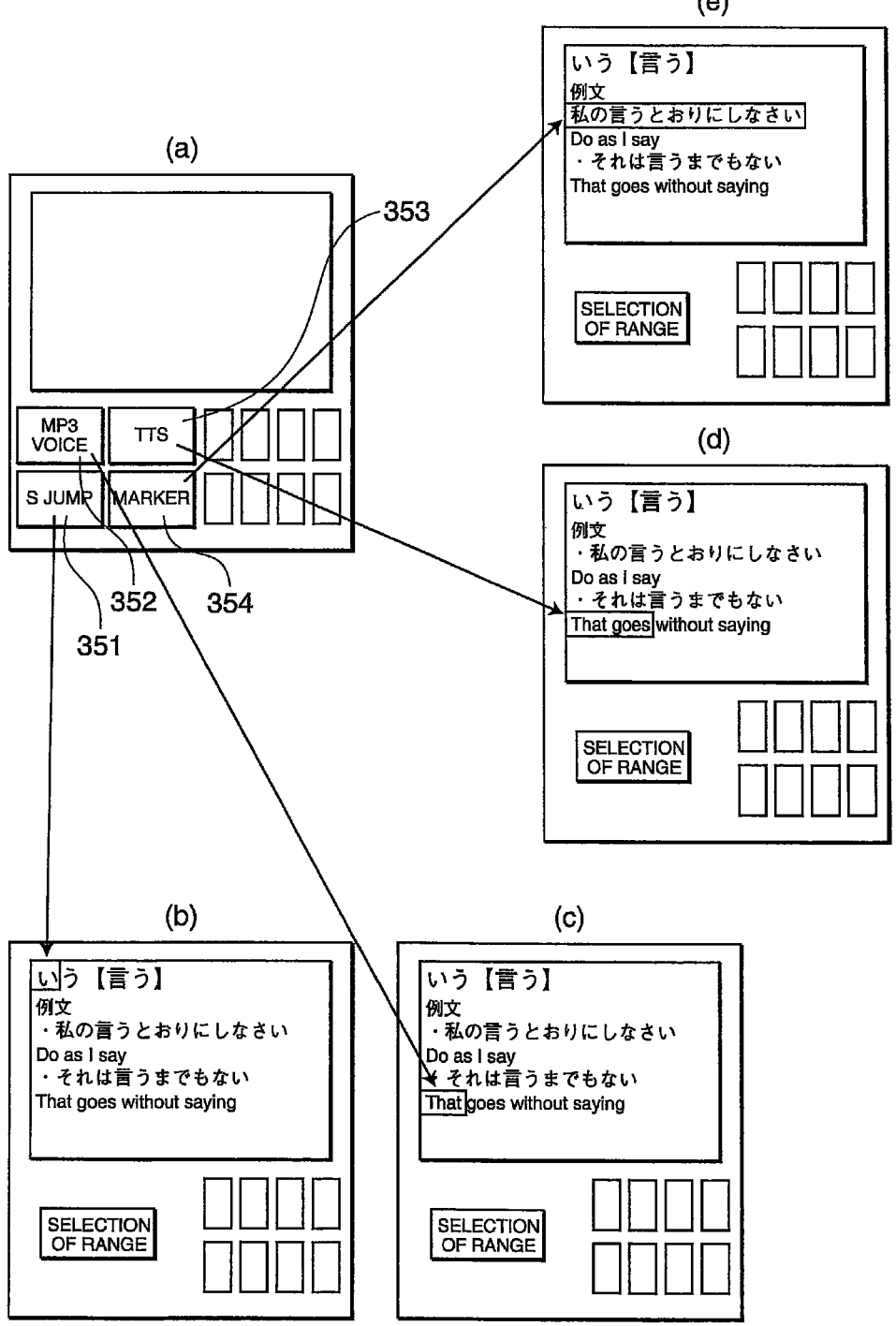
FIG. 39 is an operation explanatory view of a conventional electronic dictionary.

FIGS. 38A and 38B illustrate a flowchart of the control device according to the present invention.

In the flowchart in FIGS. 38A and 38B, the user touches a desired character on the display screen with a touch pen in step S301 with the state in which a direction word or content is displayed on the display screen of the display unit. The touch operation is inputted from the touch panel input unit 213, and processed by the touch panel input accepting unit 221 so as to detect the position on the display screen by the display buffer 226. The operation using the touch pen is described here, but the similar operation can be made by using the key input unit 212 or the mouse input unit 214. The same is true for the operation described below. With this process, the selection of range is started in step S302. Next, in step S303, the user moves the touch pen to move the selected range. When the user selects the desired character range, the user makes an operation of detaching the touch pen from the display screen (step S304). With this operation, the selected range is determined, and the range selecting operation is ended (step S305).

In step S306, the electronic dictionary acquires he character string in the selected range by the display buffer unit 226 and the touch panel input position information identifying unit 227. In step S307, the character type acquiring unit 229 identifies the character type included in the character string so as to acquire the character type. In step S308, it is determined whether the result of the identification in step S307 is only alphabet or not. If it is only alphabet (Yes), the control device proceeds to step S309 so as to determine whether plural English words are included or not. Whether one English word is included or plural English words are included is determined by the determination as to whether a space is present between the English words or not. When plural English words are included (Yes), the control device proceeds to step S310 so as to determine that the character type of the selected character string is an "English sentence". When plural English words are not included (No) in step S309, the control device proceeds to step S311 so as to determine that the character type of the selected character string is an "English word".

When the character string in the selected range is not only alphabet in step S308 (No), the control device proceeds to step S312 so as to determine whether the character string includes only Japanese or not. If it includes only Japanese (Yes), the control device proceeds to step S313 so as to determine that the character type of the selected character string is "Japanese". However, if the character in the character string is not only Japanese (No) in step S312, the control device proceeds to step S314 so as to determine that the character type of the selected character string is "two or more characters used in the dictionary installed to the electronic dictionary, or symbol". For example, it is determined that the character type is Japanese and English.

When the language (e.g., Chinese) other than English and Japanese is determined, a step for determining the other languages may be inserted between steps S312 and S314.

When the character string in the selected range is determined to be the "English sentence", "English word", "Japanese", or "two or more characters used in the dictionary installed to the electronic dictionary, or symbol", the character type of the selected character string is identified in step S315. In step S316, the function acquiring unit 230 makes an access to the correspondence table of character type in the selected range for each function illustrated in FIG. 33. Then, in step S317, whether each function is valid or invalid is acquired from the correspondence table in FIG. 3. In step S318, the window is opened, or the screen is divided into the upper and lower screens. In the window or lower screen, the valid function is displayed as being "selectable", while the invalid function is displayed as "non-selectable". Specifically, the display is made as illustrated in FIGS. 34(d) or (e). When the selectable operation function is one in step S318, i.e., when it is determined in step S314 that "two or more characters used in the dictionary installed to the electronic dictionary, or symbol", the selectable operation function (i.e., the marker function) may immediately be executed without opening the window.

In step S319, it is determined whether the S jump is selected or not from the functions that are displayed as "selectable". When the S jump function is not selected (No), the selected function, e.g., the MP3 voice reproduction function, in step S320, the TTS function or the marker function is executed to the selected character string, and then, this flow is ended.

When the S jump function is selected in step S319 (Yes), it is determined in step S321 whether the selected character string includes plural English words or not. If plural English words are included (Yes), the control device proceeds to step S322 so as to display that the phrase search and the example sentence search can be selected. The display form is as illustrated in FIG. 34(d) or 34(e). In step S322, it is determined whether the phrase search is selected or not from the displayed phrase search and the example sentence search. When the phrase search is selected, the control device proceeds to step S323 so as to search the content phrase search information memory unit 333b, the content phrase list display information memory unit 336b, and the content phrase section display information memory unit 339b by using the selected plural English words as the keyword. The search result is displayed on the display unit 311, and then, this flow is ended.

However, when the example sentence search is selected in step S322 instead of the phrase search, the control device proceeds to step S324 so as to search the content example sentence search information memory unit 332b, the content example sentence list display information memory unit 235b, and the content example sentence section display information memory unit 238b by using the selected plural English words as the keyword. The search result is displayed on the display unit 211, and then, this flow is ended.

When plural English words are not included in the selected character string in step S321, the control device proceeds to step S325 so as to search a direction word, which agrees with the selected English word, from the direction word search information database unit 231. The search result is displayed on the display unit 11, and then, this flow is ended.

EXPLANATION OF NUMERALS

10 Input unit
11 Character selection unit
12 Function selection unit
20 Display unit
30 Memory unit
32 Character type-function correspondence information
33 Selected character string
34 Valid character string
35 Acquired character type
36 Selected function
37 Content information
40 Character identification unit
50 Valid character string decision unit
60 Display control unit
70 Function execution unit
110 Input unit
111 Character selection unit
112 Function selection unit
120 Display unit
121 Character string display unit
122 Function selecting screen display unit
130 Memory unit
132 Character type-function correspondence information
133 Selected character string
134 Valid character string
135 First character type
136 Function selecting analysis information
137 Content information
140 Character type acquiring unit
150 Valid character string decision unit
160 Function acquiring unit
170 Function execution unit
201 Input/output device unit
202 Program unit
203 Data unit
204 Control unit
205 Temporary memory unit
211 Display unit
212 Key input unit
213 Touch panel input unit
229 Character type acquiring unit
230 Function acquiring unit
231 Content direction word search information database unit
232 Content example sentence search information database unit
233 Content phrase search information database unit
234 Content direction word list display information database unit
235 Content example sentence list display information database unit
236 Content phrase list display information database unit
237 Content direction word explanation section display information database unit
238 Content example sentence section display information database unit
239 Content phrase section display information database unit
240 Correspondence table of character type in selected range for each function

What is claimed is:

1. An information processing apparatus comprising:
a character string display unit that displays content information including a character string;
a memory unit that stores a character type-function correspondence information in which executable functions and a character type of a character that is a subject to which the corresponding function is executed are associated with each other;
a character selection unit that selects a desired character string in the content information displayed on the character string display unit;
a character type acquiring unit that acquires a character type of a first character of the selected character string;
a function acquiring unit that acquires executable functions associated with the acquired character type from the character type-function correspondence information, after a character string is selected by the character selection unit;
a valid character string decision unit that decides a valid character string, to which the function is executed, from the selected character string selected by the character selection unit, for each of the acquired executable functions; and
a function selection unit that selects the executable function from the acquired executable functions.

2. An information processing apparatus according to claim 1, further comprising a function selecting screen display unit that displays an item of an executable function acquired by the function acquiring unit, wherein the character string display unit and the function selecting screen display unit are displayed on different screens in one display device, or displayed on respective screens of different display devices.

3. An information processing apparatus according to claim 2, wherein the function selection unit selects a desired function, which should be executed, from the items displayed on the function selecting screen display unit.

4. An information processing apparatus according to claim 1, wherein the character string selected by the character selection unit is displayed in a display form different from a display form of a character string that is not selected on the character string display unit.

5. An information processing apparatus according to claim 1, wherein the character type acquiring unit acquires a character type of a character, which appears first, and which is not a space, in the character string selected by the character selection unit, when the acquired character type is a space.

6. An information processing apparatus according to claim 1, further comprising a function execution unit that executes the function, which is selected by the function selection unit and which should be executed, to the valid character string, which is decided by the valid character string decision unit, for the function which should be executed.

7. An information processing apparatus according to claim 1, wherein the character type stored in the memory unit includes an alphabet, and Japanese character, wherein one or plural character types of a character to which the corresponding function is executed are set beforehand for each function.

8. An information processing apparatus according to claim 7, wherein the function stored in the memory unit includes a voice reproduction function, an S jump function, a reading function, and a marker function.

9. An information processing apparatus according to claim 1, wherein the valid character string decided by the valid character string decision unit is one or plural character strings included in the selected character string.

10. An information processing apparatus according to claim 9, further comprising a valid character string selecting screen display unit that displays items of plural valid character strings so as to be selectable, when the decided valid character string is plural, wherein the valid character string selecting screen display unit is displayed on a display screen and the character string display unit is displayed on another display screen that is different from the display screen, the display screen and the another display screen in one display device.

11. A non-transitory computer-readable storage medium storing a program of an information processing apparatus, the program when executed by a computer, causes the computer to execute as:
- a character string display unit that displays content information including a character string;
- a memory unit that stores a character type-function correspondence information in which executable functions and a character type of a character that is a subject to which the corresponding function is executed are associated with each other;
- a character selection unit that selects a desired character string from the content information displayed on the character string display unit;
- a character type acquiring unit that acquires a character type of a first character in the selected character string;
- a function acquiring unit that acquires an executable function associated with the acquired character type from the character type-function correspondence information, after the character string is selected by the character selection unit;
- a valid character string decision unit that decides a valid character string, to which the function is executed, from the selected character string selected by the character selection unit, for each of the acquired executable functions; and
- a function selection unit that selects the executable function from the acquired executable functions.

12. A character string and function selecting method for an information processing apparatus including a character string display unit that displays content information including a character string; a memory unit that stores a character type-function correspondence information in which executable functions and a character type of a character that is a subject to which the corresponding function is executed are associated with each other; a character selection unit; a character type acquiring unit; a function acquiring unit; a valid character string decision unit; and a function execution unit, wherein the method comprising;
- selecting, by the character selection unit, a desired character string in the content information displayed on the character string display unit,
- acquiring, by the character type acquiring unit, a character type of a first character of the selected character string,
- acquiring, by the function acquiring unit, executable functions associated with the acquired character type from the character type-function correspondence information, after the character string selection unit selects a character string;
- deciding, by the valid character string decision unit, a valid character string, to which the function is executed, from the selected character string selected, for each of the acquired executable functions; and
- selecting, by the function selection unit, the executable function from the acquired executable functions.

\* \* \* \* \*